US012774632B2

(12) United States Patent
Özden et al.

(10) Patent No.: US 12,774,632 B2
(45) Date of Patent: *Oct. 27, 2026

(54) FRAME PROVIDING RESTRICTION OF THERMAL DEFLECTION OF A VIG UNIT EDGE

(71) Applicant: VKR HOLDING A/S, Hørsholm (DK)

(72) Inventors: Utku Ahmet Özden, Hørsholm (DK); Jacob Christian Molbo, Hørsholm (DK); Jens Troels Plesner Kristensen, Hørsholm (DK)

(73) Assignee: VKR HOLDING A/S, Horsholm (DK)

( * ) Notice: Subject to any disclaimer, the term of this patent is extended or adjusted under 35 U.S.C. 154(b) by 152 days.

This patent is subject to a terminal disclaimer.

(21) Appl. No.: 18/771,217

(22) Filed: Jul. 12, 2024

(65) Prior Publication Data

US 2024/0368937 A1 Nov. 7, 2024

Related U.S. Application Data

(63) Continuation of application No. 17/422,844, filed as application No. PCT/DK2020/050013 on Jan. 13, 2020, now Pat. No. 12,110,736.

(30) Foreign Application Priority Data

Jan. 14, 2019 (DK) ............................ PA201970020
Jan. 14, 2019 (DK) ............................ PA201970021
(Continued)

(51) Int. Cl.
*E06B 3/54* (2006.01)
*E04D 13/03* (2006.01)
(Continued)

(52) U.S. Cl.
CPC ............ *E06B 3/6612* (2013.01); *E04D 13/03* (2013.01); *E04D 13/031* (2013.01);
(Continued)

(58) Field of Classification Search
CPC ........ E06B 3/54; E06B 3/5409; E06B 3/5454; E06B 3/5481; E06B 3/62; E06B 3/6608; E06B 3/6612; E06B 3/677
See application file for complete search history.

(56) References Cited

U.S. PATENT DOCUMENTS 2,595,927 A 5/1952 Chapin
2,617,159 A * 11/1952 Leighton ............... E06B 3/5409 52/204.593
(Continued)

FOREIGN PATENT DOCUMENTS

CN 2835403 Y 11/2006
CN 106760122 A 5/2017
(Continued)

OTHER PUBLICATIONS

International Search Report for corresponding application PCT/DK2020/050008 filed Jan. 13, 2020; Mail date Apr. 3, 2020.
(Continued)

*Primary Examiner* — Ryan D Kwiecinski
(74) *Attorney, Agent, or Firm* — CANTOR COLBURN LLP

(57) ABSTRACT

A vacuum insulated glass (VIG) unit frame assembly is disclosed comprising: a rectangular vacuum insulated glass unit comprising two glass sheets separated by a sealed gap, wherein a plurality of support structures are distributed in the gap, and a frame arrangement comprising elongated frame profile arrangements which frames the vacuum insulated glass unit in a frame opening, and wherein the frame arrangement comprises a fixation system fixating the
(Continued)

vacuum insulated glass unit at the frame arrangement, wherein the frame is arranged so as to allow edges of the vacuum insulated glass unit to thermally deflect in a deflection direction perpendicular to the frame opening plane due to a temperature difference ($\Delta T = T\mathbf{1} - T\mathbf{2}$) between the two glass sheets, and to provide a restriction of the thermal deflection of the edges, so as to reduce the magnitude of the thermal deflection compared to an unrestricted thermal deflection of the edges at the temperature difference ($\Delta T = T\mathbf{1} - T\mathbf{2}$).

20 Claims, 19 Drawing Sheets

(30) Foreign Application Priority Data

| | | |
|---|---|---|
| Jan. 14, 2019 | (DK) | PA201970022 |
| Jan. 14, 2019 | (DK) | PA201970023 |
| Jan. 14, 2019 | (DK) | PA201970024 |
| Jan. 14, 2019 | (DK) | PA201970025 |
| Jan. 14, 2019 | (DK) | PA201970026 |

(51) Int. Cl.

| | |
|---|---|
| ***E04D 13/035*** | (2006.01) |
| ***E06B 3/02*** | (2006.01) |
| ***E06B 3/14*** | (2006.01) |
| ***E06B 3/56*** | (2006.01) |
| ***E06B 3/62*** | (2006.01) |
| ***E06B 3/66*** | (2006.01) |
| ***E06B 3/677*** | (2006.01) |
| ***E06B 7/23*** | (2006.01) |

(52) U.S. Cl.

CPC ....... *E04D 13/0315* (2013.01); *E04D 13/035* (2013.01); *E04D 13/0351* (2013.01); *E04D 13/0354* (2013.01); *E06B 3/025* (2013.01); *E06B 3/14* (2013.01); *E06B 3/5427* (2013.01); *E06B 3/5454* (2013.01); *E06B 3/5481* (2013.01); *E06B 3/56* (2013.01); *E06B 3/62* (2013.01); *E06B 3/6621* (2013.01); *E06B 3/677* (2013.01); *E06B 7/2301* (2013.01); *E06B 7/2305* (2013.01); *E06B 2003/6208* (2013.01); *E06B 2003/6229* (2013.01); *E06B 2003/6238* (2013.01); *E06B 2003/6291* (2013.01); *Y02A 30/249* (2018.01); *Y02B 80/22* (2013.01)

(56) References Cited

U.S. PATENT DOCUMENTS

| | | | | | |
|---|---|---|---|---|---|
| 2,781,561 | A | | 2/1957 | Gifford | |
| 3,686,795 | A | | 8/1972 | La Barge | |
| 3,861,085 | A | | 1/1975 | Jacob | |
| 4,134,234 | A | | 1/1979 | Auger | |
| 4,134,238 | A | * | 1/1979 | Auger | E06B 3/5409<br>52/656.5 |
| 4,193,236 | A | * | 3/1980 | Mazzoni | E06B 3/66342<br>52/204.593 |
| 5,216,855 | A | * | 6/1993 | Richter | E06B 3/5821<br>52/204.593 |
| 5,373,672 | A | | 12/1994 | Schulz | |
| 5,657,607 | A | * | 8/1997 | Collins | E06B 3/66304<br>52/786.13 |
| 5,891,536 | A | * | 4/1999 | Collins | E06B 3/6612<br>52/786.13 |
| 6,263,623 | B1 | | 7/2001 | Weiss | |
| 6,295,774 | B1 | * | 10/2001 | Lindgren | E04D 13/031<br>52/204.1 |
| 6,435,360 | B1 | | 8/2002 | Anin | |
| 6,676,786 | B1 | * | 1/2004 | Collins | E06B 3/6775<br>156/286 |
| 7,588,653 | B2 | * | 9/2009 | Crandell | E06B 3/24<br>52/204.5 |
| 7,845,142 | B2 | * | 12/2010 | Theios | E06B 1/26<br>52/204.6 |
| 7,950,192 | B2 | * | 5/2011 | Glover | B29C 66/72523<br>52/204.593 |
| 8,181,405 | B2 | * | 5/2012 | Nash | E04F 11/1851<br>52/800.18 |
| 9,447,627 | B2 | * | 9/2016 | Thompson | E06B 3/5454 |
| 10,415,302 | B2 | * | 9/2019 | Vander Bent, Jr. | E06B 3/5409 |
| 10,597,933 | B2 | * | 3/2020 | Abe | E06B 3/6612 |
| 10,704,320 | B2 | * | 7/2020 | Sønderkær | C03C 27/06 |
| 10,919,236 | B2 | * | 2/2021 | Vaccari | E06B 3/5454 |
| 11,060,341 | B1 | * | 7/2021 | Sprague | E06B 3/549 |
| 11,187,027 | B2 | * | 11/2021 | Hasegawa | E06B 3/663 |
| 11,285,703 | B2 | * | 3/2022 | Jørgensen | B32B 17/10761 |
| 11,767,704 | B2 | * | 9/2023 | Özden | E06B 3/14<br>52/200 |
| 11,802,435 | B2 | * | 10/2023 | Özden | E06B 3/14 |
| 11,834,895 | B2 | * | 12/2023 | Özden | E06B 3/62 |
| 11,891,853 | B2 | * | 2/2024 | Özden | E04D 13/0354 |
| 11,959,331 | B2 | * | 4/2024 | Özden | E06B 3/5427 |
| 12,012,800 | B2 | * | 6/2024 | Özden | E06B 3/54 |
| 12,037,837 | B2 | * | 7/2024 | Özden | E04D 13/0354 |
| 12,110,736 | B2 | * | 10/2024 | Özden | E04D 13/031 |
| 12,168,906 | B2 | * | 12/2024 | Özden | E06B 3/6612 |
| 12,215,540 | B2 | * | 2/2025 | Özden | E04D 13/0315 |
| 12,270,245 | B2 | * | 4/2025 | Özden | E04D 13/0351 |
| 12,320,184 | B2 | * | 6/2025 | Özden | E06B 3/6612 |
| 2003/0037493 | A1 | * | 2/2003 | Guhl | E06B 3/24<br>52/786.13 |
| 2005/0126093 | A1 | * | 6/2005 | Wagner | E04D 13/0305<br>52/200 |
| 2007/0032972 | A1 | * | 2/2007 | Glover | B29C 65/7841<br>702/77 |
| 2009/0324858 | A1 | * | 12/2009 | Jaeger | E06B 3/6612<br>156/107 |
| 2012/0137607 | A1 | | 6/2012 | Kristensen | |
| 2013/0101759 | A1 | * | 4/2013 | Jones | E06B 3/6612<br>428/34 |
| 2014/0007396 | A1 | | 1/2014 | Jones | |
| 2014/0069034 | A1 | * | 3/2014 | Jones | E06B 3/585<br>52/204.593 |
| 2015/0345207 | A1 | * | 12/2015 | Thompson | E06B 3/677<br>52/204.6 |
| 2017/0002599 | A1 | * | 1/2017 | Thompson | E06B 3/5454 |
| 2017/0268285 | A1 | * | 9/2017 | Abe | C03C 27/10 |
| 2022/0065026 | A1 | * | 3/2022 | Özden | E06B 3/54 |

FOREIGN PATENT DOCUMENTS

| | | | | | |
|---|---|---|---|---|---|
| DE | 3202639 | A1 | | 8/1983 | |
| DE | 102006020455 | A1 | | 6/2007 | |
| DE | 202009016113 | U1 | | 5/2011 | |
| DE | 202012006687 | U1 | * | 10/2013 | E05C 17/48 |
| DE | 10201400186 | A1 | | 2/2016 | |
| EP | 0418461 | A1 | * | 3/1991 | A47F 3/00 |
| EP | 0421239 | A2 | | 4/1991 | |
| EP | 0472109 | A2 | | 2/1992 | |
| EP | 1298100 | A1 | | 4/2003 | |
| EP | 1908914 | A1 | | 4/2008 | |
| EP | 2169172 | A2 | * | 3/2010 | E04D 13/0354 |
| EP | 2921632 | A1 | | 9/2015 | |
| EP | 3101195 | A1 | | 12/2016 | |
| EP | 3124733 | A1 | | 2/2017 | |
| EP | 3170799 | A1 | * | 5/2017 | E06B 3/64 |
| ES | 2169172 | T3 | * | 7/2002 | A47L 15/4229 |
| FR | 2514057 | A1 | * | 4/1983 | E06B 3/645 |
| FR | 2823789 | A1 | | 10/2002 | |
| FR | 2942843 | A1 | | 9/2010 | |
| FR | 3075245 | A1 | * | 6/2019 | E06B 3/72 |
| GB | 2264742 | A | * | 9/1993 | E06B 3/5481 |
| GB | 2492380 | A | | 1/2013 | |
| GB | 2521419 | A | | 6/2015 | |
| JP | 2000064732 | A | * | 2/2000 | E06B 3/6205 |

(56) References Cited

FOREIGN PATENT DOCUMENTS

| | | | | | |
|---|---|---|---|---|---|
| JP | 2001031449 | A | * | 2/2001 | |
| JP | 2001146881 | A | | 5/2001 | |
| JP | 2002021437 | A | | 1/2002 | |
| JP | 2002255593 | A | * | 9/2002 | |
| JP | 2007132637 | A | | 5/2007 | |
| KR | 20100062076 | A | * | 6/2010 | E06B 3/54 |
| KR | 20180128659 | A | | 12/2018 | |
| WO | WO-9914169 | A1 | * | 3/1999 | E06B 3/56 |
| WO | WO-2011048559 | A1 | * | 4/2011 | E04B 2/82 |
| WO | 2014039642 | A1 | | 3/2014 | |
| WO | WO-2014183606 | A1 | * | 11/2014 | E06B 3/585 |
| WO | 2015183863 | A1 | | 12/2015 | |
| WO | 2017210701 | A1 | | 12/2017 | |
| WO | WO-2020147903 | A1 | * | 7/2020 | E06B 7/2305 |
| WO | WO-2020147906 | A1 | * | 7/2020 | E06B 7/2305 |
| WO | WO-2020147907 | A1 | * | 7/2020 | E06B 7/2305 |
| WO | WO-2021228713 | A1 | * | 11/2021 | E06B 7/2318 |

OTHER PUBLICATIONS

International Search Report for corresponding application PCT/DK2020/050009 filed Jan. 13, 2020; Mail date Mar. 30, 2020.

International Search Report for corresponding application PCT/DK2020/050010 filed Jan. 13, 2020; Mail date Mar. 25, 2020.

International Search Report for corresponding application PCT/DK2020/050011 filed Jan. 13, 2020; Mail date Apr. 7, 2020.

International Search Report for corresponding application PCT/DK2020/050012 filed Jan. 13, 2020; Mail date Apr. 9, 2020.

International Search Report for corresponding application PCT/DK2020/050013 filed Jan. 13, 2020; Mail date Mar. 19, 2020.

International Search Report for corresponding application PCT/DK2020/050014 filed Jan. 13, 2020; Mail date Apr. 14, 2020.

International Search Report for corresponding application PCT/DK2020/050015 filed Jan. 13, 2020; Report dated Mar. 27, 2020.

International Search Report for corresponding application PCT/DK2020/050016 filed Jan. 13, 2020; Mail date Apr. 1, 2020.

International Search Report for corresponding application PCT/DK2020/050017 filed Jan. 13, 2020; Mail date Feb. 18, 2020.

International Search Report for corresponding application PCT/DK2020/050018 filed Jan. 13, 2020; Mail date Feb. 18, 2020.

Written Opinion for corresponding application PCT/DK2020/050008 filed Jan. 13, 2020; Mail date Apr. 3, 2020.

Written Opinion for corresponding application PCT/DK2020/050009 filed Jan. 13, 2020; Mail date Mar. 30, 2020.

Written Opinion for corresponding application PCT/DK2020/050010 filed Jan. 13, 2020; Mail date Mar. 25, 2020.

Written Opinion for corresponding application PCT/DK2020/050011 filed Jan. 13, 2020; Mail date Apr. 7, 2020.

Written Opinion for corresponding application PCT/DK2020/050012 filed Jan. 13, 2020; Mail date Apr. 9, 2020.

Written Opinion for corresponding application PCT/DK2020/050013 filed Jan. 13, 2020; Mail date Mar. 19, 2020.

Written Opinion for corresponding application PCT/DK2020/050014 filed Jan. 13, 2020; Mail date Apr. 14, 2020.

Written Opinion for corresponding application PCT/DK2020/050015 filed Jan. 13, 2020; Report dated Mar. 27, 2020.

Written Opinion for corresponding application PCT/DK2020/050016 filed Jan. 13, 2020; Mail date Apr. 1, 2020.

Written Opinion for corresponding application PCT/DK2020/050017 filed Jan. 13, 2020; Mail date Feb. 18, 2020.

Written Opinion for corresponding application PCT/DK2020/050018 filed Jan. 13, 2020; Mail date Feb. 18, 2020.

* cited by examiner

FRAME PROVIDING RESTRICTION OF THERMAL DEFLECTION OF A VIG UNIT EDGE

CROSS REFERENCE TO RELATED APPLICATIONS

This is a continuation of U.S. patent application Ser. No. 17/422,844 which was filed on Jul. 14, 2021 as the national stage of International Patent Application Number PCT/DK2020/050013 which was filed on Jan. 13, 2020 claiming priority to Denmark Patent Application Numbers PA201970020, PA201970021, PA201970022, PA201970023, PA201970024, PA201970025, and PA201970026, all filed on Jan. 14, 20219, all of which said applications are herein incorporated by reference in their entirety.

TECHNICAL FIELD

The present disclosure relates to a vacuum insulated glass unit frame assembly, a retrofitting system and a vacuum insulated glass unit.

BACKGROUND

Vacuum insulated glass (VIG) units provides several advantages such as good insulated properties and reduced thickness. A VIG unit may typically comprise glass sheets kept separated by support structures arranged in an airtight and evacuated gap between the glass sheets. To provide an airtight gap, an edge sealing is applied along the glass sheet edges so as to enclose the gap between the glass sheets. This edge seal may be made from e.g. a glass frit material such as low melting point glass frit material which is applied along the edges of a glass sheet and then subsequently heated in order to melt the glass material to provide an airtight and strong edge sealing.

Patent document U.S. Pat. No. 9,447,627B2 discloses a window frame unit for vacuum insulated glass unit. A base member and a glazing member of a frame provides a recess wherein a distal edge of a VIG unit is arranged. The recess is disclosed to be designed to accommodate distortion of the VIG unit rather than constraining the VIG unit at the distal edge of the VIG unit. This is obtained by a resilient, flexible tab of a glazing member that is/are snapped into engagement with a base member of the frame, so that the tabs may allow the glazing member to pivot to accommodate distortion of the VIG unit.

Patent documents U.S. Pat. No. 6,435,630 B1 and JP2007132637 discloses other solutions for holding a VIG unit.

Patent document EP2169172 B1 discloses a further solution where a frame holds a VIG unit by means of an adhesive at a surface facing a part of the frame.

It however appears that problems still exists when arranging a VIG unit in a frame to provide a window or door for e.g. covering building apertures.

The present disclosure provides one or more solutions where a VIG unit is arranged in a frame, which may e.g. help to improve or ensure the lifetime, such as the estimated lifetime, of the VIG unit, provide a more simple and/or, mechanical solution for holding a VIG unit in/at a frame, provide a solution that may be used under varying climatic conditions, and/or provide a solution which is advantageous from a manufacturing point of view.

BRIEF SUMMARY

VIG units are normally made from glass sheets kept separated by support structures such as pillars arranged in an airtight and evacuated gap between the glass sheets. To provide the airtight gap, an edge sealing is provided along the glass sheet edges so as to enclose the gap between the glass sheets. This edge seal may be made from e.g. a glass frit material such as low melting point glass frit material which is applied along the edges of a glass sheet and then subsequently heated in order to melt the glass material to provide an airtight and strong edge sealing. The edge seal may alternatively be made from a metal seal which is heated to a melting point and then cooled to cure.

The gap(s) between the glass sheets are normally evacuated by means of an evacuation cup connected to an evacuation pump, and the evacuation cup is arranged to cover an evacuation hole in one of the glass sheets for the VIG unit, which is then sealed after the evacuation of the gap. Alternatively, the gap may be evacuated in an evacuation chamber enclosing the entire VIG unit. The gap is normally evacuated to below $10^{-3}$ bar, such as below $10^{-4}$ bar, e.g. to about or below $10^{-3}$ mbar.

The VIG unit is normally subjected to significant temperature differences DT between the VIG unit glass sheets due to the good insulation capabilities of the VIG unit. As the edge seal for sealing the gap between the VIG unit glass sheets is normally very stiff in nature, the temperature difference DT between the glass sheets causes the VIG unit to deflect (also known as thermal bending, thermal deflection or thermal distortion), as the hotter glass sheet of the VIG unit will expand compared to the colder of the glass sheets.

VIG units according to aspects of the present disclosure may in aspects of the present discourse provide a Ug-value below 0.7 W/($m^2$K), such as below 0.6 W/($m^2$K), e.g. below 0.5 W/($m^2$K) such as below 0.4 W/($m^2$K), and such VIG units may suffer from increased thermal deflection due to the good insulation provided by means of the VIG unit. This low Ug-value may be obtained by means of the evacuation of the gap between the VIG glass sheets, e.g. in combination with one or more one or more of

- One or more low-e coatings such as thin tin dioxide or thin silver layers or any other suitable low e-coating layers at e.g. the inner surface(s) of the glass sheets of the VIG unit facing the VIG unit gap,
- a larger/increased support structure distance, such as above 3 or above 4 centimeters between neighboring support structures in the VIG unit gap to reduce the number of potential "cold-bridges" provided by the support structures,

- by using support structures of a material having a low thermal conductivity and/or a small size,
- By providing a 3-layer VIG unit (i.e. with two evacuated gaps placed between a middle glass sheet and a glass sheets arranged at and parallel to opposite surfaces of the middle glass sheet)

- By providing a Hybrid VIG unit.

The present disclosure relates in a first aspect to a vacuum insulated glass (VIG) unit frame assembly comprising:

- a rectangular vacuum insulated glass unit comprising two glass sheets separated by a gap between said glass sheets, wherein a plurality of support structures are distributed in said gap and wherein said gap is sealed, and
- a frame arrangement comprising elongated frame profile arrangements which frames said vacuum insulated glass unit in a frame opening extending in a frame opening plane defined between the elongated frame profile arrangements, and wherein said frame arrangement comprises a fixation system fixating the vacuum insulated glass unit at the frame arrangement, wherein said frame is arranged so as to allow edges of said vacuum insulated glass unit to thermally deflect in a deflection direction perpendicular to said frame opening plane due to a temperature difference between the two glass sheets, and to provide a restriction of said thermal deflection of the edges, so as to reduce the magnitude of the thermal deflection compared to an unrestricted thermal deflection of the edges at said temperature difference.

This may e.g. be tested by placing a VIG unit in a test arrangement comprising an insulated wall having a frame opening for receiving the VIG unit frame assembly. The temperature difference between the outer glass sheets of the VIG unit may be set to 0° C., and the positions of one or more measuring points of the VIG unit is then determined by a measuring system such as an optical distance measuring system, hereby giving a reference measuring. The temperature difference between glass sheets of the VIG unit enclosing the evacuated gap is then changed to a predefined temperature difference such as e.g. 40° C., and the position of the VIG unit at the measuring points is then determined again, giving a first measuring. By determining the difference between the reference measuring and the first measuring, the restricted, thermal deflection of the edge or edges can be determined.

Then the VIG unit is either removed from the frame (relatively fast to maintain the temperature difference between the VIG unit glass sheets) and a second measuring at the measuring points is provided to determine the unrestricted thermal deflection of the edges 8*a*-8*d* at the temperature difference DT=T1−T2 relative to the reference measuring, and hence, the unrestricted thermal deflection of the edges at the temperature difference DT=T1−T2 may be compared to the restricted, thermal deflection of the edge or edges.

Alternatively, the unrestricted, thermal deflection may be determined by providing a weakening of one or more holding structures of the frame while the VIG unit is in the frame, such as by cutting or melting one or more slits in holding members or walls of the frame, e.g. at corner and/or centre parts of these walls, so as to reduce or remove the restriction of the thermal edge deflection provided by the frame. This may be provided at one or more edges of the VIG unit. Hence, if the thermal deflection of the VIG unit edge is restricted by the frame, the VIG unit edges will hereby deflect further without changing the temperature difference between the glass sheets of the VIG unit. Hence, the second measuring at the measuring points may be provided to determine the unrestricted thermal deflection of the edges 8*a*-8*d* at the temperature difference DT=T1−T2 relative to the reference measuring, and hence, the unrestricted thermal deflection of the edges at the temperature difference DT=T1−T2 may be compared to the restricted, thermal deflection of the edge or edges.

It is generally understood that a temperature difference between the outer, major surfaces of the VIG glass sheets may provide the thermal deflection of the VIG unit edges, and the amount of thermal deflection is dependent on the magnitude of the temperature difference DT=T1−T2, where T1 is the temperature at one outer major/main surface of the VIG, and the temperature T2 is the temperature at the other outer major/main surface of the VIG. The operational sign of the resulting temperature difference DT determines to which side of the VIG unit assembly, the VIG unit's edges deflects relative to the frame opening plane due to the temperature difference. Hence, the VIG unit will tend to thermally deflect over time due to a temperature difference between the outer major surfaces of the VIG glass sheets.

This temperature difference may change over time, and may induce varying stresses in the VIG unit.

Computer simulations indicate that an inappropriate constraining of the VIG unit's thermal deflection along the VIG unit edges by the frame assembly may induce a larger stress at the VIG unit edges or corner areas, such as in an edge sealing the VIG unit gap of the VIG unit at the glass sheet edges. This may increase the risk that the VIG unit is damaged over time, so that the reduced pressure in the gap of the VIG unit is released to be that of the ambient pressure of the VIG unit, and this requires a replacement of the entire VIG unit.

At the same time, the VIG unit should be kept sufficiently in the frame assembly so that it does not permanently displace to an undesired position due to gravity or outer forces such as wind gusts (in case it is e.g. used for a door or a window), hails or other objects such as birds, balls or the like provides impacts such as sudden impacts on the VIG unit surface. Also, an unrestricted or constrained VIG unit may due to the free thermal deflections experience stresses that can cause fatigue in particular at the edge seal area that may cause reduction or loss of the insulating vacuum in the gap of the VIG unit.

As the fixation system is configured so as to allow the edges of the VIG unit to thermally deflect, this may help to reduce stresses in the VIG unit and hence help to improve the lifetime of the VIG unit frame assembly, and/or help to provide a solution that may be used in varying conditions such as in varying climatic conditions.

Providing a restriction of said thermal deflection of the edges so as to reduce the magnitude of the thermal deflection compared to an unrestricted thermal deflection of the edges at said temperature difference may e.g. help to provide a more space saving frame solution. Moreover or alternatively, it may help to reduce the risk of the VIG unit self-destructing at larger temperature differences and/or help to provide a VIG unit that may be used in an increased range of climatic conditions.

The present inventors have seen indications that allowing a full and un-restricted thermal deflection of the VIG unit edges may increase the risk of the thermally deflecting VIG unit so to say self-destructing due to large stresses in e.g. the edge sealing of the VIG unit, hence increasing the pressure in the evacuated gap to the atmospheric pressure.

The VIG unit frame assembly may in one or more aspects of the present disclosure e.g. be a building aperture cover such as a window such as a roof window, or a door.

VIG units may generally provide good heat insulation and/or other advantages when compared to windows or doors comprising gas insulated glass units.

The present inventors have found that computer simulations revealed that in certain situations when a VIG unit is arranged in a roof window so that the major outer surfaces are not completely vertical, gravity acts on the VIG unit and may tend to cause a further deflection of the edges of the VIG unit. This may in some situations add on to the already present thermal deflection of the VIG unit edges due to a temperature difference between the VIG units. Hence a "worse case" scenario may be if the hotter surface of the VIG unit is the interior VIG unit glass sheet surface (often a surface of a lamination glass sheet in roof windows), as both gravity and thermal deflection acts in the same deflection direction. The present solution may be advantageous in order to also cope with such worse case scenarios.

The restriction of the VIG unit edge's thermal deflection may also help to reduce undesired optical distortions when looking through the VIG unit.

The largest total edge deflection of the edges is preferably at least 10% smaller, such as at least 20% smaller, such as at least 30% smaller than the largest total edge deflection of the unrestricted vacuum insulated glass (VIG) unit at a temperature difference of at least 40° C., such as 65° C.

This may e.g. provide a sufficient restriction of the thermal deflection of the edges of the VIG unit, hence helping to e.g. reduce stresses in the edge seal.

The magnitude of the restricted thermal deflection may in aspects of the present disclosure be between 10% and 85% smaller, such as between 20% and 70%, smaller, e.g. between 20% and 60% smaller than the magnitude of the largest unrestricted edge deflection of any of the edges of the VIG unit at a temperature difference (DT=T1−T2) of 40° C. and/or 65° C.

The thermal deflection of the edges is in particular a thermal deflection configured to vary along the edge between the corners where the respective edge terminates.

The present inventors have in steady state simulations of a rectangular VIG unit's thermal deflection seen that that the VIG edges tend to describe an "edge deflection curve" when the VIG unit is subjected to temperature differences, and this may be caused by the properties of the VIG unit such as the rigidity of the edge sealing solution for sealing the VIG gap along the edges of the VIG unit. Tests have approved that the edge deflection curve occurs.

Reducing/restricting this type of edge deflection by means of the frame may e.g. help to reduce the optical distortions of the VIG unit. Also or alternatively, it may help to reduce the stress conditions in the VIG unit edge seal, and thus help to provide a VIG unit that may be used in a wider range of climatic conditions.

It is advantageous that the fixation system is configured to provide said restriction of the thermal deflection of the edges.

This may e.g. be advantageous as it may help to reduce the complexity of the frame solution. Alternatively, the restriction may be provided by means of other parts of the frame arrangement.

In a preferred aspect of the present disclosure, the largest edge deflection in said deflection direction of any of the edges of the vacuum insulated glass unit at a temperature difference between the two glass sheets of 65° C. as compared to the vacuum insulated glass unit at a temperature difference of 0° C. is at least 1 mm, such as in the range of 2 mm to 50 mm, preferably in the range of 3 mm to 15 mm, more preferred in the range of 3 to 10 mm.

Alternatively or additionally, the largest total edge deflection in said deflection direction of any of the edges of the vacuum insulated glass unit at a temperature difference between the two glass sheets of 65° C. as compared to the vacuum insulated glass unit at a temperature difference of 0° C. is at least 2 mm, such as in the range of 2 to 40 mm, such as in the range of 5 to 35, mm, preferably in the range of 8 to 20 mm.

By the term "total edge deflection" is herein understood the largest distance in the direction perpendicularly to the frame opening plane between the any two positions of an edge of the vacuum insulated glass unit, which in some embodiments will be the sum of the largest distances of positions of the edge in question from the frame opening plane in e.g. each their direction from that plane, or towards or away from that plane.

In the same or other embodiments, the largest total edge deflection in said deflection direction of any of the edges of the vacuum insulated glass unit at a temperature difference between the two glass sheets of 40° C. as compared to the vacuum insulated glass unit at a temperature difference of 0° C. is at least 1 mm, in the range of 1 to 25 mm, such as in the range of 3 to 15 mm, preferably in the range of 4 to 12 mm.

It may be advantageous to allow an edge deflection in one or both of the above ranges, as it may help to reduce the stress in the VIG unit over time, and also, it may help to provide a space saving, such as more narrow, frame solution.

It is understood that in aspects, the edge may be configured to deflect (total edge deflection DIS1−DIS2) at least 3 mm such as at least 5 mm such as at least 8 mm at a 40° C. or 65° C. Temperature difference, compared to a temperature difference of substantially 0° C.

According to a further aspect of the present disclosure, the largest total edge deflection in said deflection direction of any of the edges of the vacuum insulated glass unit at a temperature difference between the two glass sheets of 65° C. as compared to the vacuum insulated glass unit at a temperature difference of 0° C. is at least 0.3% of the length of the deflecting edge, such as in the range of 0.3% to 3.5% of the length of the deflecting edge, such as in the range of 0.4% to 2% of the length of the deflecting edge, such as in the range of 0.6% to 1.5% of the length of the deflecting edge.

Furthermore, according to a yet further aspect, the largest total edge deflection in said deflection direction of any of the edges of the vacuum insulated glass unit at a temperature difference between the two glass sheets of 40° C. as compared to the vacuum insulated glass unit at a temperature difference of 0° C. is at least 0.15% of the length of the deflecting edge, such as in the range of 0.15% to 3% of the length of the deflecting edge, such as in the range of 0.25% to 1.8% of the length of the deflecting edge, such as in the range of 0.35% to 1.2% of the length of the deflecting edge.

The above mentioned thermal deflections may in aspects be relative to the state of the VIG unit edge position/deflection when the VIG unit glass sheets have an identical/the same temperature such as 20° C.

In a particular aspect of the present disclosure, the fixation system is arranged so as to allow corner parts of the edges of said vacuum insulated glass unit to thermally deflect, whereas centre parts of the at least two opposing edges are substantially stationary with respect to said frame opening plane.

With the term "substantially stationary" is herein understood that the centre parts will thermally deflect substantially less than the corners of the respective edges, e.g. less than 10% of the deflection of the corners at a temperature difference DT of 65° C., such as less than 5% of the thermal deflection of the corners at that temperature difference, and/or deflect less than 2 millimetres, such than less than 1 millimetres perpendicular to said frame opening plane due to a temperature difference DT of 65° C.

The extend of said corners parts of the edges constitute preferably at least 10% of the respective edges, such as at least 15% thereof, whereas the centre parts of the at least two opposing edges constitute preferably at least 60% of the respective edges, such as at least 65% thereof.

In a preferred aspect, the centre parts of all edges are substantially stationary with respect to said frame opening plane.

All four edges of said vacuum insulated glass unit may preferably be allowed to thermally deflect in a deflection direction perpendicular to said frame opening plane due to a temperature difference between the two glass sheets.

The vacuum insulated glass (VIG) unit frame assembly may comprise one or more gasket arrangements and/or holding members of the fixation system, which is/are configured to provide said restriction of the edge deflection in said deflection direction.

The one or more gasket arrangements and/or holding members of the fixation system, is/are configured to provide a resistance, so as to provide the restriction of the edge deflection in said deflection direction.

Restricting the VIG unit edge completely from providing a thermal deflection may cause the VIG unit to break and the pressure in the evacuated gap to equalize to the ambient pressure. However, by restricting the VIG unit edge deflection to a certain amount compared to free deflection and no deflection, this may provide a solution where the VIG unit may be less likely to break over time due to thermal deflections and/or it may allow a more space saving frame solution.

In other embodiments of the present disclosure, the gasket for restricting the VIG unit's thermal deflection may be omitted, and the VIG unit frame profiles may e.g. comprise other structural parts such as protrusions or the like for at least partly restrict the thermal bending. In further embodiments of the present disclosure, the VIG unit may be arranged to thermally deflect substantially freely while affixed to the frame by means of discrete fixation arrangements.

It is considered advantageous that the fixation system comprises holding members, wherein one or more of said edges of the vacuum insulated glass unit extends into a recess provided by said holding members, and wherein the fixation system comprises fixation arrangements placed in said recess in a space between the holding members and outer surfaces of the vacuum insulated glass units.

These frame profile members may in aspects of the present disclosure either be integrated parts of a moulded, extruded or pultruded profile, they may be provided by a glazing member and base member assembly where the glazing member may in further aspects be releasably/dismountably connected to the base member, either directly or indirectly, The mentioned fixation arrangements, may preferably be fixed, such as clamped or wedged, between said holding members, and/or wherein said fixation arrangements, are configured to suspend the edge of said vacuum insulated glass unit in said recess between said holding members.

In one or more aspects of the present disclosure, said holding members may be configured to be substantially rigid at the location where the frame profile members wedges or clamps the fixation members (6).

The corners of the VIG unit edges are preferably configured to provide said thermal deflection in said recess between and relative to said holding members. This may e.g. help to provide a more cost efficient and/or mechanically simple frame solution allowing the above mentioned edge deflection relative to the frame opening plane.

Furthermore, the holding members may be elongated frame profile members extending between corners of the frame.

Said holding members may in particular be walls, such as elongated walls, integrated in and part of a frame profile connecting said holding members by means of an interconnecting wall extending between the holding members, thereby providing a U-shape forming said recess.

In other aspects of the present disclosure, said holding members may comprise an elongated base member and an elongated glazing profile member which is releasably connected to said base member, and wherein said base member and glazing member when connected provide an U-shape forming said recess.

This may e.g. provide a cost efficient solution and/or help to provide a solution where a fast and/or reliable manufacturing and/or installation of the VIG unit in the frame may be obtained.

The material of the profile(s) may e.g. be a plastic material such as a PVC material, it may be composite material such as a glass or carbon fibre material, the profiles may be made from a plastic material with fibres embedded to obtain a more strong/rigid profile and/or the like. Also, in one or more aspects the profiles of the frame may be made from a metal such as aluminium.

These profiles may in aspects of the present disclosure extend continuously between the corners of the frame in the longitudinal direction of the VIG edge.

These profile comprising the integrated walls and the interconnected wall may be manufactured together, e.g. by being extruded, moulded or pultruded together in the same manufacturing process.

The fixation arrangements comprises in preferred aspects of the disclosure one or more of:

- a plurality of clamps arranged at discrete fixation points of at each of two or more of said edges,
- a resilient gasket arrangement such as a rubber or silicone gasket arrangement,

- a substantially rigid material such as a plastic material or a moulded material, such as injected between said holding members,
- an adhesive such as a glue or an adhesive tape, and/or
- a plurality of distributed, discrete fixation blocks such as resilient fixation blocks.

The width of said recess is advantageously configured to be substantially fixed during said the thermal deflection, at least when said the temperature difference is less than 65° C. such as less than 40° C.

In particularly, the width of said recess is configured to vary less than 15%, such as less than 10%, e.g. less than 5% during said the thermal deflection, at when said the temperature difference is 65° C. or 40° C., compared to the width at a temperature difference of 0° C.

This may apply for the width at any position along the respective edge. It may however be configured to vary more than e.g. 0.5 or 2% under these conditions.

This unchanged width or width variation less than e.g. 15% may e.g. help to provide a good fixation of the VIG unit in the frame assembly, and/or provide a good control thermal deflection of the VIG unit edges.

A first gasket arrangement, such as parts of a C-profile gasket, may be placed in said recess between said frame profile members and the outer surfaces of the VIG unit.

This gasket arrangement may help to provide a water tightening, and/or may help to reduce the amount of deflection of the VIG unit compared to if it was allowed to thermally deflect freely by providing said restriction of the edge deflection.

The first gasket arrangement may e.g. be a rubber or silicone gasket, or a plastic gasket.

In one or more aspects of the present disclosure, said first gasket arrangement may provide at least a part of said fixation system.

The first gasket arrangement may e.g. be pre-compressed between the frame profile members and the VIG unit, thus providing a clamping force at the VIG unit, but also allowing a compression of the first gasket arrangement when thermal bending occur. This gasket may e.g. help to provide a restriction of the edge deflection as e.g. previously explained.

Alternatively or additionally, a resilient gasket or seal member, such as a further resilient gasket or seal member, may be arranged between said frame opening and said fixation arrangement.

This may e.g. help to improve water and/or air tightening between the vacuum insulating glass unit and said frame assembly.

Said fixation arrangements may comprise one or more resilient suspension elements compressed between a first of said holding members and an outwardly facing surface of the vacuum insulated glass unit, and one or more resilient suspension elements compressed between a second of said holding members and another opposite outwardly facing surface of the vacuum insulated glass unit, wherein said compressed, resilient suspension elements provides a holding force towards said opposite outwardly facing surfaces of the vacuum insulated glass unit so as to suspend the vacuum insulated glass unit between said first and second holding members, and wherein each of said compressed, resilient suspension elements are configured to be further compressed or expand in response to a thermal deflection of the edge of the VIG unit due to a temperature difference between the two glass sheets.

The compressed resilient suspension elements are partly pre-compressed between the holding members and the opposite outwardly facing surfaces of the vacuum insulated glass unit, and this enables the suspension elements to expand to be less compressed or be further compressed in response to the thermal deflection of the VIG unit edge as the temperature difference varies. This allows the edges of the VIG unit to thermally deflect, but also provides a holding force towards the opposite outwardly facing surfaces of the vacuum insulated glass unit. This may e.g. help to reduce stress conditions in the VIG unit and hence help to improve the lifetime of the VIG unit frame assembly, and/or help to provide a solution that may be used in varying conditions such as in varying climatic conditions.

It is understood that the sum of the compression of the first and second resilient suspension elements at the same area of the VIG unit edge in aspects of the present disclosure may remain substantially unchanged when the thermal deflection changes, since, when the VIG unit thermally deflect in one direction, one of the suspension elements is compressed, but the other gasket at the same position of the VIG unit edge expands substantially correspondingly.

The fixation system may in preferred embodiments comprise a plurality of fixation arrangements, wherein said plurality of fixation arrangements fixates said vacuum insulated glass unit at discrete fixation points distributed along the edges of the vacuum insulated glass unit, and wherein said plurality of fixation arrangements are attached to or between one or more frame members of said frame, whereby the thermal deflection of the edges is substantially at its minimum at the discreet fixation points.

The present inventors have seen indications in steady state VIG unit deflection computer simulations that a thermal deflection at the edges of the VIG unit may seems to follow a pattern where discrete, so to say “neutral”, deflection points may be estimated/selected as fixation points for an edge. The VIG unit corners and centre portion of the edge deflects in opposite directions relative to these points, and the amount of stress subjected to fixation arrangements placed at these points due to thermal deflection may tend to be lower than if the fixation arrangements are placed at other points along the same VIG unit edge, when the VIG unit is placed in a frame assembly.

This may help to provide a solution where the VIG unit is sufficiently fixed in the frame assembly, where forces acting on the VIG unit is transferred to the frame assembly such as to frame profiles, and where the VIG unit’s edges are at the same time allowed to thermally deflect relative to the frame opening plane when subjected to varying temperature differences between the outer major surfaces of the VIG unit so that the forces/stresses may be at least partly reduced.

Alternatively or additionally, it may help to provide an improved solution from a water tightening point of view and/or help to provide a more space-saving solution.

Also or alternatively, by selecting discrete pane fixation points distributed along the narrow edges of the vacuum insulated glass unit, and providing fixation arrangements at these points which fixates/holds the vacuum insulated glass unit in the frame, this may help to reduce the stresses in the VIG unit such as in the VIG unit edge seal when the VIG unit is subjected to temperature differences between the outer major surfaces of the VIG unit.

The fixation arrangements may at the same time hold the VIG unit in the frame so that the entire VIG unit will not e.g. displace significantly relative to the frame opening plane due to gravity or will not be displaced (without returning to substantially the same position again due to the frame assembly design) when outer forces such as wind loads or sudden impacts act on the VIG unit in the frame assembly.

The VIG unit edges, such as the centre portion of the edge and the corners where the respective edge terminates may thus deflect relative to the fixation arrangements.

Additionally, the fixation arrangements may in aspects of the present disclosure help to spare sealing’s or gaskets of the frame assembly from a substantial amount of the weight provided by the VIG unit, which may help to provide a longer lasting sealing solution.

In one or more aspects of the present disclosure, one or more of said fixation arrangements may be made from one or more of a plastic material, a composite material, a glue and/or an adhesive material, a soldering material, and/or A metal such as steel, e.g. one or more metal plates.

In particular, the fixation points may be placed so that the corners of the vacuum insulated glass unit where the respective edge terminates are configured to deflect in a first direction relative to a straight, common line extending through two of said discrete fixation points of the respective edge, and so that a centre portion of the same edge, is configured so deflect in an opposite direction than said first direction, relative to the straight, common line, when the VIG unit thermally deflects.

This may help to provide a narrower frame solution, and/or help to spare sealings or gaskets placed to provide water and/or air tightening functions between the VIG unit and one or more parts of the frame assembly.

It is a preferred aspect that each of at least two parallel edges of the vacuum insulated glass unit are attached to said frame assembly by two, and no more, of said discrete fixation arrangements distributed in the longitudinal direction of each of said edges.

It is particularly advantageous that each of said two discreet fixation arrangements of an edge is placed between 8% and 25% of the length of the respective edge from the respective corner of the vacuum insulated glass unit where the edge terminates, preferably between 10% and 20%.

Arranging two fixation points for an edge may be sufficient to allow a sufficient thermal edge deflection and at the same time provide a fixation of the VIG unit relative to the frame.

Said discrete fixation arrangements distributed in the longitudinal direction of each of said edges are preferably fixation devices such as clamps.

The frame assembly may in particular comprise substantially parallel top and bottom frame profile arrangements, and substantially parallel side profile frame arrangements, such as wherein two, three or all of said top, bottom and/or side profile frame arrangements at least partly, such as fully, encloses said edges, such as encloses said fixation arrangements.

The bottom frame profile arrangement may be of a different design/constitution than the side and top profile frame arrangements, as it may e.g. comprise a water drainage system for draining water from the surface of the vacuum insulated glass (VIG) unit away from the vacuum insulated glass (VIG) unit frame assembly which is not present at the side and top profile frame arrangements.

In one or more aspects of the present disclosure, at least one of said top, bottom or side frame profile arrangements encloses at least one fixation arrangement, and may be of a different constitution or type than the remaining fixation arrangements enclosed by the other of said frame profile arrangements. For example, in aspects, said one or more fixation arrangements of a different constitution or type may be located in/at said bottom frame profile arrangements.

The frame may advantageously comprise:

- holding parts for fixating said vacuum insulated glass unit, wherein said holding parts each comprise a recessed portion provided between holding members arranged at opposite outwardly facing surfaces of the vacuum insulated glass unit, and wherein an edge of the vacuum insulated glass unit extends into the recessed portion and is held in said recess by means of the holding members, and
- flexible connection arrangements connecting the holding parts to elongated frame profile arrangements,
- wherein said flexible connection arrangements are configured to flex when said vacuum insulated glass unit exerts a bending moment on the holding parts, so that said holding parts will move relative to the elongated frame profile arrangements to which the individual holding part is connected.

The flexible connection arrangement is configured to flex when the VIG unit is subjected to temperature differences between the VIG unit glass sheets enclosing the evacuated gap. This allows a thermal deflection of the VIG unit relative to the elongated profiles. This may help to provide a longer lasting VIG unit, which may e.g. last longer despite being subjected to varying temperature differences. Also or alternatively, it may provide a more cost efficient solution as the same frame assembly may be used in a range of varying climates, and/or in that the same frame assembly system may be utilized for varying sizes of VIG units.

The flexible connection arrangement may thus be deflected by the VIG unit's thermal deflection changes due to a varying temperature difference between the VIG unit glass sheets, hence allowing the VIG unit and the edges of this to thermally deflect.

In particular, the flexible connection arrangements may comprise one or more wall members configured to provide said flexing, such as wherein a wall member of said one or more wall members of the flexible connection arrangement is configured to provide or support one of said holding members of the holding part.

This may e.g. help to provide a space saving and/or more simple, mechanical solution.

A flexing space may advantageously be provided between said outwardly facing major surface of the vacuum insulated glass unit and said elongated frame profile arrangements to which the individual holding part is connected, and wherein said vacuum insulated glass unit is configured to flex towards and away from said flexing space in response to said bending moment.

Hence, when the flexing due to said bending moment exerted by the vacuum insulated glass unit, and caused by a thermal deflection of the VIG unit edge is provided, the resulting movement of the VIG unit may be allowed into and away from the flexing space. This may e.g. help to provide a space saving frame solution, and/or help to provide a flexible frame solution that can flex in response to the bending moment subjected to the holding part due to a thermal deflection of the VIG unit. In aspects, the holding part may also be arranged so as to flex towards and away from the flexing space in response to said bending moment.

The fixation system may be arranged so as to allow a shift in the direction of the thermal deflection of the corners and/or centre parts of the edges of the vacuum insulated glass unit in response to a change in the temperature difference between the two glass sheets of the vacuum insulated glass unit.

It is here understood that said change in the temperature difference DT=T1−T2 between the two glass sheets of the vacuum insulated glass unit provides a switch between which of the glass sheets that is the hotter glass sheet and the colder glass sheet respectively.

This may e.g. help to provide a more cost efficient solution may be obtained and/or a solution where the VIG unit frame assembly can be used in a larger range of climatic conditions and/or applications.

One or more resilient tightening seals or gasket arrangements, such as comprising resilient, deflectable lips, are preferably configured to follow said deflection of the vacuum insulated glass unit when it is subjected to a temperature difference between outer major surfaces of the VIG unit, so as to provide a substantially watertight and/or airtight tightening between one or more elongated frame profiles and the vacuum insulated glass unit surfaces.

This seal or gasket preferably provides a seal so that at least the discretely arranged fixation arrangements are not exposed to e.g. the weather, and are preferably not visible at the final, framed VIG unit unless it is taken apart. The seal moreover provides a watertight seal irrespectively of the variation in or amount of thermal deflection of the VIG unit in the frame, as it has a resiliency that causes it to fill out a gap/space between the VIG unit and a part of the frame assembly.

The seal/gasket or seals/gaskets may in one or more aspects of the present disclosure follow the deflection of the vacuum insulated glass unit due to thermal deflection by being arranged in a pre-compressed state at the frame assembly. Thus, the seal will be either further compressed or decompressed/expand as the VIG unit edge thermally deflect due to a temperature difference variation. The pre-compressed gasket/seal may e.g. be a foam, rubber or silicone seal/gasket which in an uncompressed state has a larger volume, width and/or height than in the pre-compressed state. The pre compression is in one or more aspects of the present disclosure provided by means of the VIG unit and a part of the frame assembly.

The seal/gasket or seals/gaskets may in one or more other or additional aspects of the present disclosure follow the deflection of the VIG unit by being arranged at the frame assembly to be initially deflected by the VIG unit surface. Hence, the amount of deflection may vary along the gasket/seal(s) as the VIG unit thermally deflect and changes due to the temperature difference variation. The deflected portion of the gasket/seal may e.g. be one or more elongated, resilient flaps or lips made from e.g. rubber, silicone or another suitable, resilient material, extending along an outer surface of the VIG unit arranged in the frame assembly.

In one or more aspects of the present disclosure, one or more of said tightening seals or gasket arrangements is/are pre-compressed or pre-deflected by said VIG unit, such as by an outer glass sheet surface of said VIG unit. Tightening seals or gasket arrangement will thus expand or be further compressed when the thermal deflection of the VIG unit changes due to a temperature difference variation.

In aspects of the present disclosure, the one or more resilient tightening seals or gasket arrangements may be configured to seal a predefined space provided between an outer surface of a glass sheet of the vacuum insulated glass unit, and a frame profile member, such as wherein said fixation arrangement is placed in said predefined space.

One or more of said resilient tightening seals or gasket arrangements may be arranged to seal said predefined space, and a surface of said one or more resilient seals or gasket arrangements may face the exterior of said frame arrangement, e.g. by having a surface facing the frame opening.

The vacuum insulated glass unit may advantageously be a laminated vacuum insulated glass unit, where a lamination glass sheet, such as an annealed glass sheet, is laminated to an outer major surface of a glass sheet of the vacuum insulated glass unit by means of a lamination layer.

Simulation results have indicated that even though a lamination glass sheet may restrict the thermal deflection of the VIG unit edges with between 30% to 60% compared to free bending where the lamination glass sheet is not present, it may still be relevant to allow said edge deflection in the frame, as stresses in the VIG unit glass sheets and/or the edge sealing may still become significant during thermal deflection.

In one or more aspects of the present disclosure, a weakening arrangement of said frame, such as one or more perforations, slits/recesses, and/or unfilled spaces may be configured to provide that a resistance against the thermal deflection of the VIG unit edge may be substantially lower at corner parts of the edges than at centre parts of the edges.

The length of the longer opposing edges is typically in the range of 500 to 3000 millimetres, preferably in the range of 600 to 1300 millimetres and the length ratio between the shorter opposing edges and the longer opposing edges is preferably in the range of 0.3 to 0.9, preferably in the range of 0.35 to 0.85.

It is preferred that the minimum distance between an outer major surface of the vacuum insulated glass unit and said frame is at least 4 mm such at least 5 mm, for example at least 6 mm, at a temperature difference between the two glass sheets of the vacuum insulated glass unit of substantially 0° C.

Said minimum distance is measured in a direction perpendicular to the outer major surface of the vacuum insulated glass unit and the frame, such as a frame wall surface facing the major VIG unit surface. This may e.g. provide more space and/or deflection freedom in order to allow the VIG unit to thermally deflect relative to the frame. The minimum distance may provide a space in which a fixation system and/or a resilient tightening gasket is placed. In one or more aspects of the present disclosure, a resilient gasket or seal member arranged in said space may have a thickness above 4 mm, such as above 5 mm, for example above 6 mm at a temperature difference between the VIG unit glass sheets of substantially 0° C. This thickness may in aspects be between 4 mm and 30 mm, for example between 4 mm and 13 mm, such as between 4 mm and 10 mm, for example between 5 and 10 mm, at a temperature difference between the two glass sheets of the vacuum insulated glass unit of substantially 0° C. The thickness is measured in a direction perpendicular to the outer major surface of the VIG unit.

The present disclosure relates in a second aspect to a retrofitting frame system for retrofitting a vacuum insulated glass unit to a frame originally designed for insulated glass panes, such as windows, of greater thickness than the thickness of the vacuum insulated glass unit, wherein said retrofitting frame system at least comprises:

a vacuum insulated glass unit comprising at least two glass sheets separated by a gap between said glass sheets, wherein a plurality of support structures are distributed in said gap and wherein said gap is sealed, and one or more resilient, elongated tightening seals/gasket arrangements configured to follow a deflection of the vacuum insulated glass unit when it thermally deflect, so as to provide a water tightening and/or air tightening of a space provided between one or more frame profiles members and an outer surface of the vacuum insulated glass unit when installed at said frame, a fixation system configured to fixate the vacuum insulated glass unit in a recess of the frame, wherein said vacuum insulated glass unit is configured to extend in a frame opening extending in a frame opening plane defined between the plurality of frame profiles, wherein said fixation system is configured to be arranged so as to allow edges of said vacuum insulated glass unit to thermally deflect in a deflection direction perpendicular to said frame opening plane due to a temperature difference between the two glass sheets, and to provide a restriction of said thermal deflection of the edges, so as to reduce the magnitude of the thermal deflection compared to an unrestricted thermal deflection of the edges at said temperature difference.

This may e.g. provide a retrofitting solution providing one or more of the previously mentioned effects or advantages.

In aspects of the vacuum insulated glass unit, the magnitude of the thermal deflection may be configured to vary along the edges of the VIG unit between the corners where the respective edge terminates.

The retrofitting frame system may further comprising a plurality of elongated frame profiles each comprising a recess defined between walls of the frame profile for receiving an edge of the VIG unit, wherein said recess extends the longitudinal direction of the frame profile, and wherein said plurality of elongated frame profiles are configured to be attached to said frame originally designed for insulated glass panes of greater thickness than the thickness of the vacuum insulated glass unit.

The elongated frame profiles of the retro fitting system may in aspects be configured to be placed in the frame opening extending between base members of the existing frame, and attached/fixed to these base members. This may e.g. help to provide a solution wherein the VIG unit may more easily be adapted to the frame originally designed for insulated glass panes of greater thickness than the thickness of the vacuum insulated glass unit. Also or alternatively, it may provide a solution that may be used in a larger variety of frames.

In the retrofitting frame system, the thermal deflection of the edge may be configured to be provided between and relative to said walls defining said recess.

The fixation system of the retrofitting frame system may in particular comprise a plurality of fixation arrangements, wherein said plurality of fixation arrangements fixates said vacuum insulated glass unit at discrete fixation points distributed along the edges of the vacuum insulated glass unit, wherein said plurality of fixation arrangements are attached to, or configured to be attached to said frame profiles, and whereby the thermal deflection of the edges is configured to be substantially at its minimum at the discreet fixation points, such as wherein said fixation arrangements are clamping devices configured so as to provide a clamping force onto oppositely directed, outer major surfaces of said vacuum insulated glass unit.

Said fixation system and one or more, such as all, of said elongated frame profiles may preferably be pre-mounted at said vacuum insulated glass unit.

This may e.g. help to enable a faster installing of the VIG unit frame assembly and/or help to provide a retro fitting solution where installation errors may be reduced.

The fixation system of the retrofitting frame system may advantageously comprise a gasket arrangement, arranged in or configured to be arranged in a space between outer surfaces of the vacuum insulated glass unit and the walls of said frame profiles defining said recess, wherein said gasket arrangement is configured to be pre compressed when the temperature difference between the glass sheets of the vacuum insulated glass unit enclosing the evacuated gap is 0° C., and wherein said gasket arrangement is configured to be further compressed or expand to allow said thermal deflection of the respective VIG unit edge.

The retrofitting frame system is preferably configured so as to provide a vacuum insulated glass unit frame assembly as disclosed herein.

In another aspect of the present disclosure, it relates to a method of retrofitting a vacuum insulated glass unit to a frame originally designed for gas insulated glass panes such as windows of greater thickness than the vacuum insulated glass unit, wherein said method comprises the steps of:

removing an existing glass pane in said frame if present, providing a retrofitting frame system as disclosed herein, and fixating said retro fitting system to the existing frame, so that the vacuum insulated glass unit extends in the frame opening plane while fixated by said fixation system.

Said method may in further aspects optionally comprise providing and arranging one or more water tightening and/or air tightening gaskets or seals so as to provide a water and/or air tightening of a space between the frame profile designed for thicker glass panes and the vacuum insulated glass unit.

Said method of retrofitting may in aspects of the present disclosure comprise removing a glazing member of the existing frame from a base member of the frame designed for thicker glass panes during removal of the existing glass pane (if present), and either re-attaching the glazing member to a base member of the existing frame, or replacing said glazing member of the existing frame with another glazing member having the same or other dimensions than the glazing member of the existing frame.

In a yet further aspect, the present disclosure relates to a vacuum insulated glass unit comprising at least two glass sheets separated by an evacuated gap between said glass sheets, wherein the edges of said vacuum insulated glass unit are configured to thermally deflect due to a temperature difference between the at least two glass sheets, wherein the vacuum insulated glazing is provided in a frame comprising a fixation system fixating the vacuum insulated glass unit in the frame, wherein said frame is configured so as to allow edges of said vacuum insulated glass unit to thermally deflect relative to a frame opening plane defined by elongated profiles of said frame due to a temperature difference between the at least two glass sheets, and to provide a restriction of said thermal deflection of the edges, so as to reduce the magnitude of the thermal deflection compared to an unrestricted thermal deflection of the edges at said temperature difference.

This may e.g. provide a retrofitting solution providing one or more of the previously mentioned effects or advantages. In aspects of the vacuum insulated glass unit, the magnitude of the thermal deflection may be configured to vary along the edges of the VIG unit between the corners where the respective edge terminates.

Said vacuum insulated glass unit and the frame provides preferably a vacuum insulated glass unit frame as disclosed herein.

In yet another aspect of the present invention, it relates to a vacuum insulated glass unit comprising at least two glass sheets separated by a gap between said glass sheets, wherein a plurality of support structures are distributed in said gap and wherein said gap is sealed and evacuated, wherein the vacuum insulated glass unit moreover comprises elongated profiles extending along and parallel to each their edge of the vacuum insulated glass unit, wherein a fixation system fixates the vacuum insulated glass unit to said elongated profiles, and wherein the elongated profiles and/or the fixation system is configured so as to allow edges of said vacuum insulated glass unit to thermally deflect in a deflection direction perpendicular to a frame opening plane due to a temperature difference between the two glass sheets, and to provide a restriction of said thermal deflection of the edges, so as to reduce the magnitude of the thermal deflection compared to an unrestricted thermal deflection of the edges at said temperature difference.

This may e.g. be advantageous since the fixation system and elongated profiles are hence pre-mounted at the vacuum insulated glass unit, and this may e.g. help to enable a faster installing of the VIG unit in a frame and/or help to provide a retro fitting solution where installation errors may be reduced. Additionally, it may be advantageous to provide a VIG unit where the system for restricting the thermal deflection is preinstalled at the VIG unit, as this may e.g. allow providing a uniform, streamlined and controlled manufacturing process at a manufacturing site.

The elongated profiles of the VIG unit may hence be arranged in a frame when a VIG unit needs to be replaced, may be placed in a new frame at manufacturing facility or arranged during retrofitting an existing frame to hold a VIG unit instead of a gas filled insulated glass unit. The frame, such as a sash part, may here be attached to the elongated profiles of the VIG unit, and/or the VIG unit may be arranged in and attached to the frame directly by means of an adhesive solution, by means of pre compressed gaskets and/or the like, for example so that the elongated profiles of the VIG unit is placed in an interior cavity of the frame or may appear as a part of the final frame after installation of the VIG unit.

The elongated profiles of the vacuum insulated glass unit may comprise a recess defined between walls of the respective elongated profile, wherein the recess extends in the longitudinal direction of the elongated profile, and wherein an edge of the vacuum insulated glass unit extends into said recess of the respective profile (28), wherein the fixation system fixates the vacuum insulated glass unit in the recess of the respective profile.

This may e.g. provide a strong solution that may enable enhanced water tightening between the VIG unit and the rest of the frame after installation.

The elongated profiles of the VIG unit may here describe a U-shaped profile.

It is understood that in other aspects of the present disclosure, the elongated profiles may be a profile arranged at just one side of the VIG unit and/or it may be a profile having walls describing an “L” shape when seen through a cross section of the elongated profile of the VIG unit, and the U-shape providing a recess for receiving the VIG unit edge may be omitted. Such a profile may provide that only one major surface of the VIG unit is covered by and fixed to a wall of the elongated profile.

This may e.g. be provided by means of an adhesive, such as a structural adhesive, for example an adhesive comprising a silicone adhesive, comprising a silane-terminated polyurethane (SPUR) adhesive or an adhesive comprising a Modified-Silyl Polymer (SMP) adhesive. In case the profile comprises an L-shaped profile, it may also comprise a wall extending over and along an edge surface of the VIG unit. This may provide advantageous strength, and/or enable enhanced water tightening options.

The fixation system may comprise a gasket arrangement arranged in a space between outer surfaces of the vacuum insulated glass unit and the walls of the elongated profiles defining the recess, wherein said gasket arrangement is configured to be pre compressed when the temperature difference between the glass sheets of the vacuum insulated glass unit enclosing the evacuated gap is 0° C., and wherein said gasket arrangement is configured to be further compressed or expand to allow a thermal deflection of the respective VIG unit edge.

The elongated profiles and/or the fixation system may preferably be configured to allow the vacuum insulated glass unit to describe edge deflection curves along the edges of the vacuum insulated glass unit due to a temperature difference between the glass sheets of the vacuum insulated glass unit.

The vacuum insulated glass unit is preferably a rectangular vacuum insulated glass unit, wherein the length of the longer opposing edges preferably is in the range of 500 to 3000 millimetres, more preferably in the range of 600 to 1300 millimetres.

The length ratio between the shorter opposing edges and the longer opposing edges of the rectangular vacuum insulated glass unit is preferably in the range of 0.3 to 0.9, more preferably in the range of 0.35 to 0.85.

BRIEF DESCRIPTION OF THE DRAWINGS

Aspects of the present disclosure will be described in the following with reference to the figures in which.

DETAILED DESCRIPTION

In relation to the figures described below, where the present disclosure may be described with reference to various embodiments, without limiting the same, it is to be understood that the disclosed embodiments are merely illustrative of the present disclosure that may be embodied in various and alternative forms. The figures are not to scale; some features may be exaggerated or minimized to show details of particular components. Therefore, specific structural and functional details disclosed herein are not to be interpreted as limiting, but merely as a representative basis for e.g. teaching one skilled in the art to variously employ the present disclosure.

Figure 1:
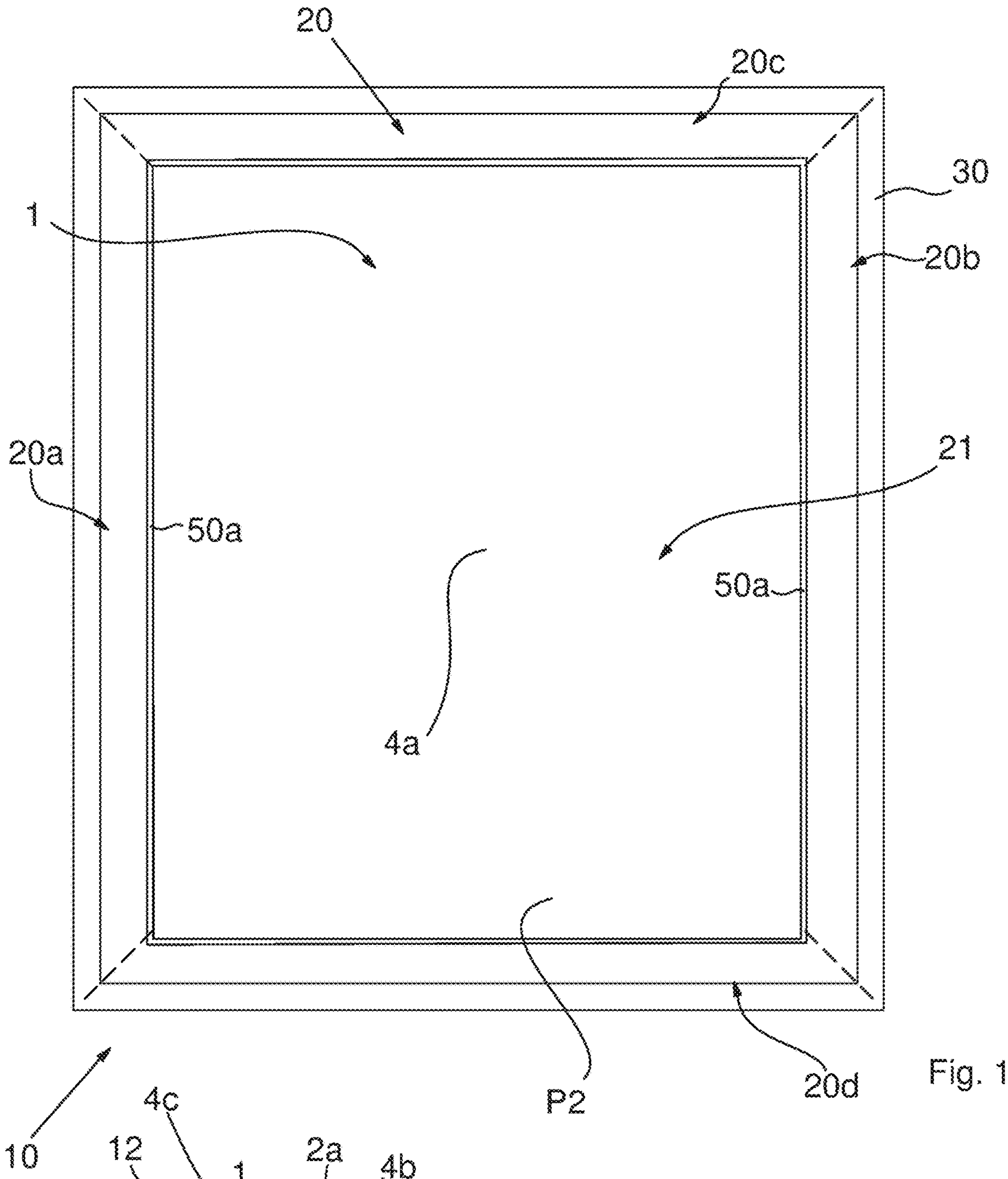
FIG. 1: Illustrates a VIG unit frame assembly according to embodiments of the present disclosure.

FIG. 1 illustrates schematically a vacuum insulated glass unit frame assembly 10 for use as e.g. a building aperture cover such as a window or a door according to embodiments of the present disclosure. The vacuum insulated glass unit frame assembly 10 comprises a vacuum insulated glass (VIG) unit 1, and a frame 20. The frame 20 comprises elongated frame profile arrangements 20*a*-20*d* which frames the vacuum insulated glass unit 1 in a frame opening 21, defining a frame opening plane P2.

These elongated frame profile arrangements 20*a*-20*d* comprises substantially parallel top and bottom frame profile arrangements 20*c*, 20*d*, and substantially parallel side profile frame arrangements 20*a*, 20*b*. Two, three or all (as illustrated) of said top, bottom and/or side profile frame arrangements 20*a*-20*d* at least partly, such as fully, encloses the VIG edges 8*a*-8*d*. Two or more of frame profile arrangements 20*a*, 20*b*, 20*c*, 20*d* may each comprise one or more holding parts 6 and one or more flexible connection arrangements as disclosed in more details below.

Gasket arrangements 50*a*, 50*b* may in one or more embodiments of the present disclosure be arranged to seal a space between the frame profile arrangements 20*a*-20*d* and the VIG unit 1 in one or more embodiments of the present disclosure, as e.g. described in more details later on.

As can be seen, the frame 20 may be attached to a fixed frame arrangement 30, such as in case the frame 20 is configured to be opened and closed while hanging from a hinge system (not illustrated) connecting the frame 20 and the fixed frame arrangement 30. In other embodiments, the sash or frame 20 may also be fixed in an un-openable manner to the fixed frame or directly to a building structure.

The frame profile arrangements 20*a*-20*d* defines a frame opening 21 plane P2 extending between the frame profile arrangements 20*a*-20*d* in the frame opening 21.

Figure 2:
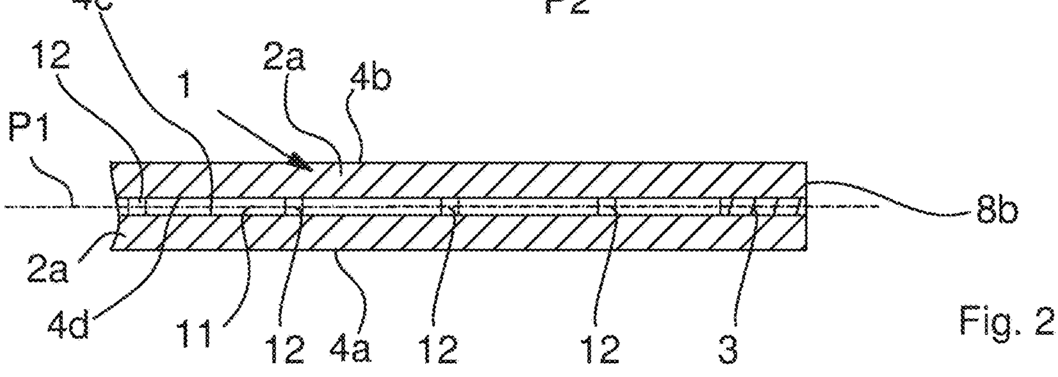
FIG. 2: illustrates schematically a VIG unit 1 to be arranged in a frame according to embodiments of the present disclosure.

FIG. 2 illustrates schematically a cross sectional view of a rectangular VIG unit 1 to be arranged in the frame 20 according to embodiments of the present disclosure. The VIG unit 1 comprises two glass sheets 2*a*, 2*b* such as tempered glass sheets, e.g. thermally tempered glass sheets, but it may also be annealed glass sheets.

The glass sheets 2*a*, 2*b* are separated by a gap 11 between the glass sheets 2*a*, 2*b*, and a plurality of support structures 12 are distributed in the gap 11. The gap 11 may for example be 0.05-0.5 mm. The gap 11 is sealed by an edge sealing 3, such as a fused edge sealing, which may e.g. be made from a solder glass material, e.g. low melting temperature solder glass material, or a metal solder material.

The support structures 12 may be made from metal, glass or polymer and be arranged in a grid or another pattern to maintain the gap 11 between the glass sheets 2*a*, 2*b* when the gap 11 is evacuated to a pressure below e.g. $10^{-3}$ bar, such as below $10^{-4}$ bar, e.g. to about or below $10^{-3}$ mbar. The glass sheets 2*a*, 2*b* comprises major surfaces 4*c*, 4*d* facing the gap, and the support structures support on these surfaces. The glass sheets also comprises outwardly facing major surfaces 4*a*, 4*b* facing away from the gap 11.

The VIG unit's thickness, measured between the outwardly facing surfaces 4*a*, 4*b* of the VIG unit may in embodiments be between 4-15 mm such as between 4-12 mm, e.g. 4-10 mm.

Especially if the VIG unit glass sheets 2*a*, 2*b* are tempered glass sheets, the distance between neighboring/adjacent support structures 12 may be above 3 cm or above 4 cm, such as between 3 cm and 6 cm in the evacuated VIG unit gap 11.

As described in more details later on, the VIG unit 1 may also be a laminated VIG unit and/or a VIG unit of a hybrid type comprising a further glass sheet providing a further sealed gap between this glass sheet and the VIG unit that may be filled with a gas.

The VIG unit 1 defines a VIG unit plane PI that will extend parallel to or coincide with the frame opening 21 plane P2 when the VIG unit is arranged in the frame 20. This plane PI may e.g. be determined when the VIG unit glass sheets 2*a*, 2*b* have the substantially same temperature and no substantial thermal deflection of the VIG unit occur (AT=0° C.).

Figure 3:
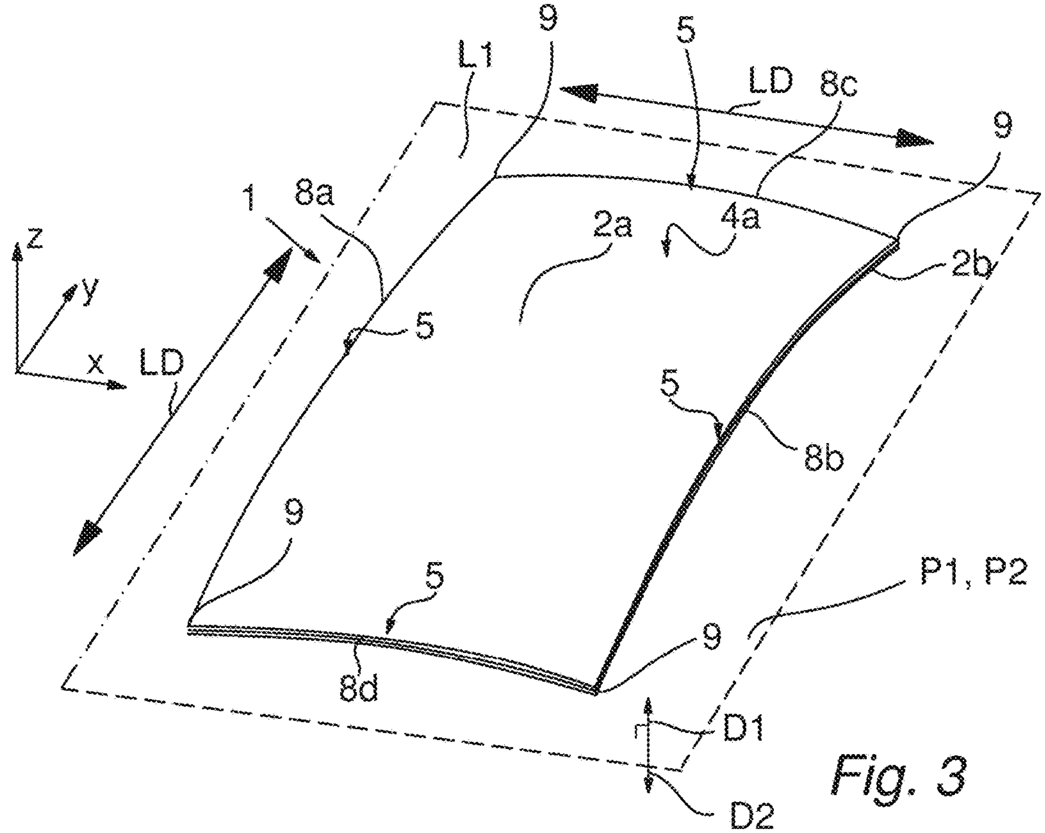
FIGS. 3-4: Illustrates a thermally deflecting VIG unit according to embodiments of the present disclosure.
Figure 4:
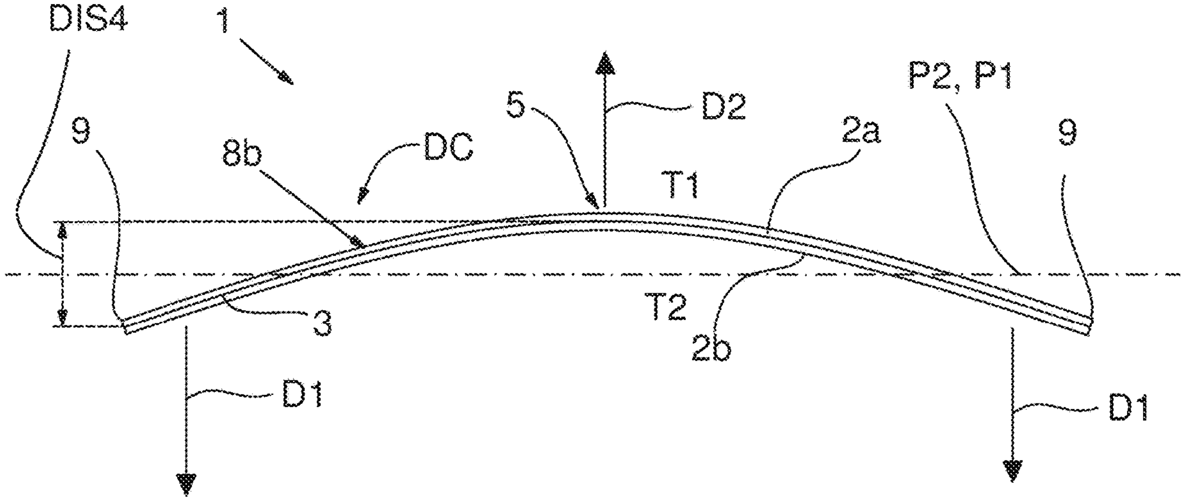

FIGS. 3 and 4 illustrates schematically a VIG unit thermal deflection as a result of a temperature difference AT=T1−T2 between the two VIG unit glass sheets 2*a*, 2*b* providing the evacuated gap, according to embodiments of the present disclosure.

In FIG. 3, the VIG unit 1 is shown schematically and in perspective, where it can be seen that the outer major surface 4*a* of the VIG unit 1 may thus obtain a convex shape when T1 is higher than T2 whereas the outer surface 4*b* of the other (lower) glass sheet 2*b* (not visible in FIG. 3) provides a concave shape due to the thermal deflection.

The VIG unit 1 deflects relative to the VIG unit plane PI (determined where AT is substantially zero) and relative to the frame opening plane P2, in the directions D1, D2 which are perpendicular to the planes PI and/or P2.

The planes P2 and PI extends in the x-y direction, and the thermal deflection of the VIG unit edges 8*a*-8*d* is provided in the z direction relative to the planes PI, P2.

FIG. 4 illustrates schematically and seen from the side onto the long edge 8*b*, the thermal deflection of the edge 8*b*. As can be seen, the VIG unit edge 8*b* may tend to describe a deflection curve DC due to thermal deflection of edge 8*b*, caused by a temperature difference AT=T1− T2 between the two glass sheets 2*a*, 2*b*. In the present example, the glass sheet 2*a* is subjected to a higher temperature T1 than the glass sheet 2*b* subjected to temperature T2. This cause the glass sheet 2*a* to expand more than glass sheet 2*b*. As the edge seal 3 may provide a very rigid connection between the glass sheets, this causes the VIG unit to thermally deflect, and this temperature difference may cause the edge 8*b* to describe a deflection curve that varies relative to the frame opening plane P2 and the VIG unit plane PI.

As can be seen from various figures of the present disclosure, the plane P1 and the frame opening plane P2 may coincide. In other embodiments of the present disclosure however, the plane PI may be parallel to the frame opening plane P2, but may not coincide with the plane.

The outer, major surface 4*a* of the VIG unit 1 at or near the edge, e.g. at the surface 4*a* opposite to the edge seal 3 may thus obtain a convex shape when T1 is higher than T2 whereas the outer surface 4*b* of the other (lower) glass sheet 2*b* provides a concave shape.

As can be seen, the corners 9 of the VIG unit where the edge 8*b* terminates may move in a first direction D1 relative to the plane PI and/or P2, whereas the centre portion 5 of the edge 8*b*, is may move in the opposite direction D2 than the first direction D1, relative to the plane PI and/or P2.

When/if the glass sheet 2*b* gets hotter than glass sheet 2*a*, caused by a temperature change of T1 and/or T2, the corners 9 of the VIG unit moves in the second direction D2 relative to the plane PI and/or P2, and the centre portion 5 of the edge 8*b*, move in the first direction D1, relative to the plane PI and/or P2.

In one or more other embodiments of the present disclosure, the largest total edge deflection DIS4 of any of the edges 8*a*-8*d* of the vacuum insulated glass unit at a temperature difference DT=T1−T2 between the two glass sheets 2*a*, 2*b* of 65° C. as compared to the vacuum insulated glass unit at a temperature difference DT=T1−T2 of 0° C. is at least 2 mm, such as at least 3 mm or at least 4 mm, such as in the range of 2 mm to 30 mm, preferably in the range of 3 mm to 20 mm.

As can be seen, in FIG. 4, the frame opening plane P2 here is determined to be placed to coincide with the VIG unit plane PI in the frame (the frame is though not illustrated). In some embodiments, the total edge deflection DIS4 will be the sum of the largest distances of positions of the VIG unit edge in question from the frame opening plane in each their direction D1, D2 from that plane. In FIG. 4, the largest total edge deflection DIS4 is defined between the deflection of the edge seal 3 at the centre 5 of the edge 8*b*, and the edge seal 3 at the corner 9 of the same edge, in a direction perpendicular to the plane P2, PI.

Figure 5:
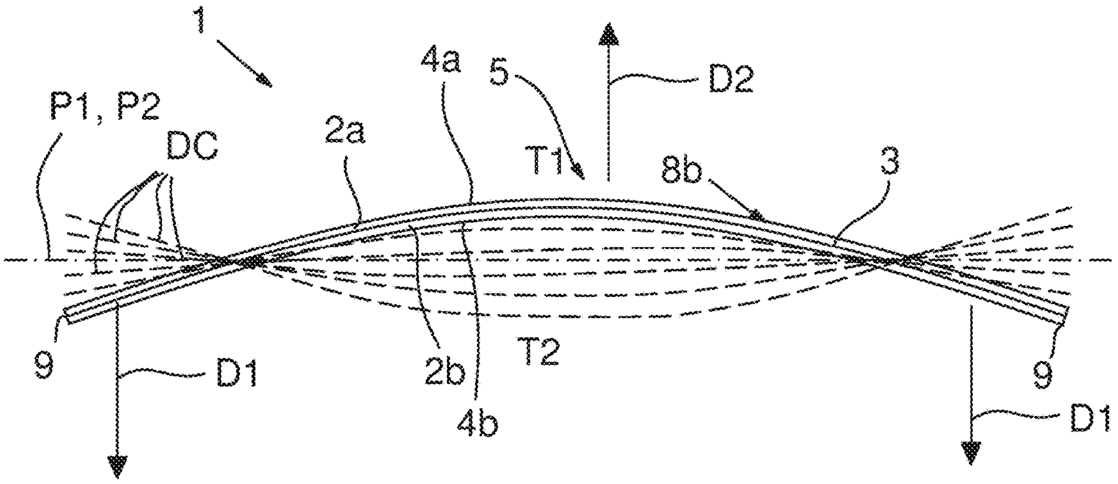
FIG. 5: Illustrates a thermally deflecting VIG unit subjected to varying temperature difference according to embodiments of the present disclosure.

FIG. 5 illustrates an example of a situation where a VIG unit 1 is subjected to a varying temperature difference AT=T1−T2 between the glass sheets 2*a*, 2*b* over time, according to embodiments of the present disclosure.

For example, it is common for e.g. building aperture covers such as windows or doors arranged in openings of outer walls, roofs or the like of a building, that these are subjected to varying temperature differences over time after they have been installed. Similar temperature differences may also apply to refrigerator and cooler covers or doors.

For example, with a room temperature T1 of e.g. about 20° C. in the building, the temperature T2 at the other side (outside a building) of the VIG unit 1 may vary significantly, such as between e.g. 15° C. and 30° C. or even more, over 24 hours.

Even, the temperature difference AT=T1−T2 may so to say switch "operational sign" so that the hotter side of the VIG unit may shift one or more times over e.g. 24 hours, many times over a calendar year, or even in the mere case that a hail, rain or snow shower occurs for a short period of time. This may e.g. largely depend on the geographical area where the VIG unit frame assembly is installed, and causes the rate and even direction of the thermal deflection to change over time.

As an example over 24 hours, the outside temperature T2 may start to be 10° C. at 8 PM, and at 3 AM it may be 35° C., and it then gradually decreases again to 10° C. overnight. The inside temperature T1 is set to e.g. be 20° C. the whole 24 hours.

This causes the temperature difference AT to switch operational sign: The temperature T1 is 20° C. at the inside, and T2 (outside) is 10° C. at 8 PM. Thus, the VIG unit edge 8*b* corners 9 deflect in a first direction D1 as illustrated in FIG. 3. Then the thermal deflection of the VIG unit edge 8*b* gradually changes (illustrated by dashed deflection curves DC) as the temperature T2 changes to be 35° C. at 3 AM at surface 4*b*, and thus 15° C. higher than T 1. Thus, the VIG unit thermal deflection changes so that the edges 8*a*-8*d* deflects in the other direction, and then, it deflects back again as the temperature T2 changes back to the about 10° C. overnight. This may even vary over the year dependent on the time of year, and e.g. in winter time, the outside temperature may be significantly below 0° C., and in the summer time, it may be significantly above 30° C., although the inside room temperature may be desired to be substantially constant, e.g. by help from a room heating system or cooling system (e.g. air-conditioning). These systems may also be known as HVAC (Heating, ventilation, and/or air conditioning).

Accordingly, the thermal deflection of the VIG unit 1 may vary significantly over 24 hours and even more over a longer period such as a calendar year and may depend on different weather conditions. A similar temperature difference may occur when a refrigerator or freezer door is opened or if the cooling device is turned on/off. This causes varying stress condition on the VIG unit over time, such as at the edges 8*a*-8*d* near the location where the VIG unit glass sheets are connected to seal the gap by e.g. an edge sealing 3. The stress conditions are complex. Examples of these stresses may be shear stresses at the VIG edge, differential stresses where tensile stress occurs at the deflecting glasses and/or stress concentrations at the corners.

The frame 20 may in embodiments of the present disclosure comprise a restriction arrangement for restricting the thermal deflection of the edge(s) 8*a*-8*d*, such as for example the longest edges of the VIG unit or all edges of the VIG unit This restriction arrangement may comprise a gasket solution, one or more stop parts or walls of the frame preventing an edge deflection above a certain point and/or the like.

Figure 6:
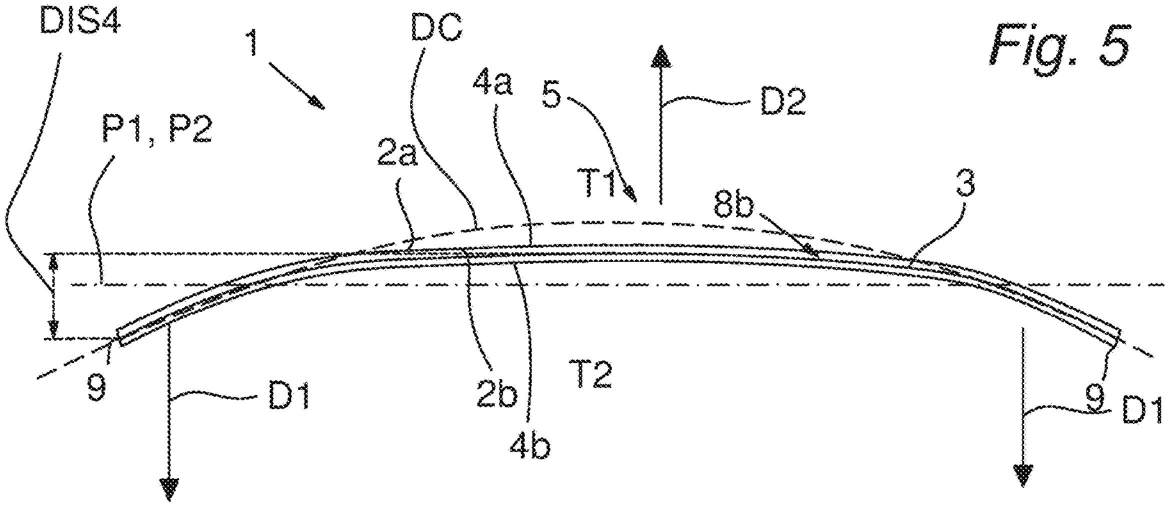
FIGS. 6-7: Illustrates a thermally deflecting VIG unit subjected to a restriction of the thermal deflection provided by a frame, according to embodiments of the present disclosure.

FIG. 6 illustrates an embodiment of the present disclosure wherein the frame 20 provides a restriction of the thermal deflection of the edge 8*a* compared to free edge unrestricted thermal deflection at a temperature difference AT=T1−T2 of for example 65° C. The free edge deflection that would have occurred without any restriction of the deflection of the edge 8*b* is illustrated by the dashed deflection curve DC.

As can be seen, the dashed deflection curve DC indicates that the thermal deflection DIS4 at the areas near the corner 9 of the edge 8*b* remains substantially unchanged, whereas the deflection at the centre area 5 of the edge is restricted.

Hence, the frame provides a resistance against the thermal deflection of the edge 8*b* of the VIG unit 1, and the resistance is substantially lower at corner parts of the edge than at centre parts of the edge 8*b*. The restricted centre part 5 of the edge may in embodiments of the present disclosure constitute at least a third, such as half of the extend of the edge 8*b* between the corners 9 where the edge terminates.

It is understood that the above mentioned restriction of the thermal edge deflection may in embodiments of the present disclosure be provided for opposing parallel edges (see e.g. the parallel long edges 8*a*, 8*b* and short edges 8*c*, 8*d* of FIG. 3) respectively.

Figure 7:
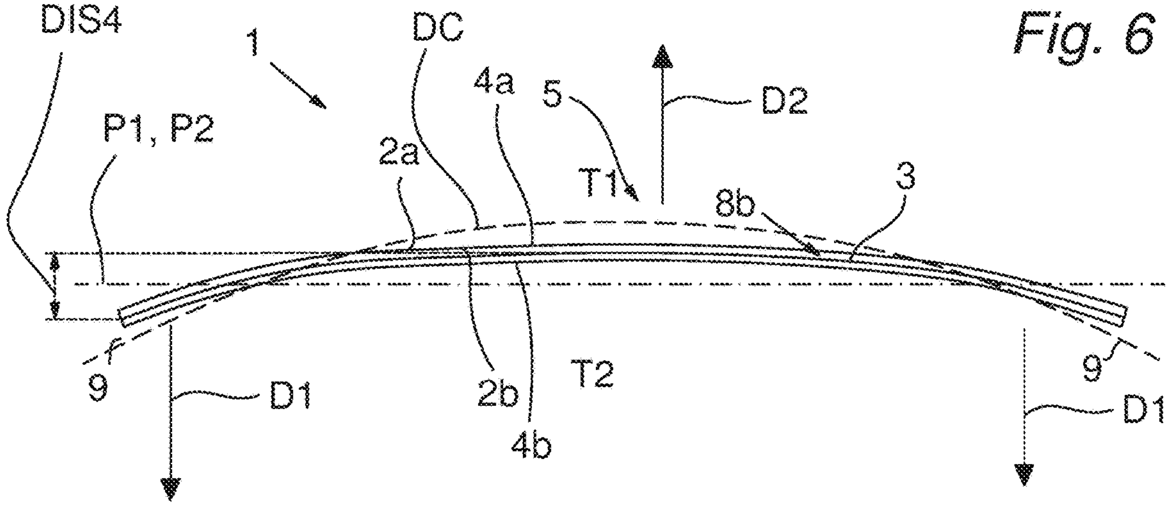

FIG. 7 illustrates an embodiment of the present disclosure substantially corresponding to FIG. 6. Also here, the frame 20 provides a resistance against the thermal deflection of the edge 8*b* of the VIG unit 1. As can be seen in FIG. 7, both a restriction of the magnitude of the thermal deflection of the corner 9 areas and the centre part of the edge is provided by the frame. The restriction may in further embodiments of the present disclosure be lower at corner parts of the edge 8*b* than at centre parts of the edge. The corners 9 are restricted a certain amount in FIG. 7 compared to the free edge deflection that would have occurred without any restriction of the deflection of the edge 8*b* (illustrated by the dashed deflection curve DC).

In one or more embodiments of the present disclosure, the frame 20 provides the restriction of the edge deflection by means of a fixation system as e.g. described in more details later on.

The fixation system may in embodiments of the present disclosure be arranged so as to allow corner parts of the edges of the VIG unit 1 to thermally deflect DIS4, whereas centre parts of the edge(s) 8*a*-8*d* are substantially stationary with respect to said frame opening plane P2 during the thermal deflection. This may e.g. apply for a temperature difference AT of at least 20° C., such as at least 30° C., e.g. at least 45° C., such as about 65° C. (and may be compared to a temperature difference AT of e.g. 0-5° C.).

In one or more embodiments of the present disclosure, the largest edge deflection DIS4 of any of the edges of the VIG unit at a temperature difference DT=T1−T2 between the two glass sheets 2*a*, 2*b* of 65° C. as compared to the vacuum insulated glass unit at a temperature difference DT=T1−T2 of 0° C. is at least 2 mm, such as in the range of 2 mm to 0 mm, preferably in the range of 3 mm to 15 mm, more preferred in the range of 5 to 10 mm.

In embodiments of the present disclosure, the largest, total edge deflection DIS1+DIS2 of the edge 8*b*, such as of any of the edges 8*a*-8*d* of the VIG unit 1 may at a temperature difference AT=T1−T 2 between the two glass sheets 2*a*, 2*b* of 65° C. be configured to be at least 2 mm, such as in the range of 2 mm to 40 mm, such as in the range of 5 mm to 35 mm, preferably in the range of 8 mm to 20 mm, as compared to a temperature difference of 0° C.

In other embodiments of the present disclosure, the largest, total edge deflection DIS1+DIS2 of the edge 8*b*, such as of any of the edges 8*a*-8*d* of the VIG unit 1 may at a temperature difference AT=T1−T2 between the two glass sheets 2*a*, 2*b* of 40° C. be configured to be at least 1 mm, such as in the range of 1 mm to 25 mm, such as in the range of 3 to 15 mm, preferably in the range of 4 to 12 mm, as compared to a temperature difference of 0° C.

It is understood that in aspects, the edge may be configured to deflect (total edge deflection DIS4) at least 3 mm such as at least 5 mm such as at least 8 mm at a 40° C. or 65° C. Temperature difference, compared to a temperature difference of substantially 0° C.

In embodiments of the present disclosure, the largest, total edge deflection DIS1+DIS2 of the edge 8*b*, such as of any of the edges 8*a*-8*d* of the VIG unit 1 may at a temperature difference AT=T1−T 2 between the two glass sheets 2*a*, 2*b* of 65° be configured to be at least 0.3% of the length of the deflecting edge (8*a*-8*d*), such as in the range of 0.3% to 3.5% of the length of the deflecting edge 8*a*-8*d*, such as in the range of 0.4% to 2% of the length of the deflecting edge (8*a*-8*d*), such as in the range of 0.6% to 1.5% of the length of the deflecting edge (8*a*-8*d*), as compared to a temperature difference of 0° C.

In other embodiments of the present disclosure, the largest, total edge deflection DIS1+DIS2 of the edge 8*b*, such as of any of the edges 8*a*-8*d* of the VIG unit 1 may at a temperature difference AT=T1−T2 between the two glass sheets 2*a*, 2*b* of 40° C. may be configured to be in the range of 0.15% to 3% of the length of the deflecting edge (8*a*-8*d*), such as in the range of 0.25% to 1.8% of the length of the deflecting edge (8*a*-8*d*), such as in the range of 0.35% to 1.2% of the length of the deflecting edge (8*a*-8*d*), as compared to a temperature difference of 0° C.

In one or more embodiments of the present disclosure, the magnitude of the restricted thermal deflection of the edges at the temperature difference may be configured to be at least at least 10% smaller, such as at least 20% smaller, such as at least 30% smaller than the magnitude of the unrestricted thermal deflection DIS4 (see dashed curve DC) of the edges (8*a*-8*d*) at a temperature difference (AT=T1−T2) of 40° C. and/or 65° C. As can be seen, this thermal deflection DIS4 of the edges may be determined between the position of a corner 9 portion of the edge 8*b* and a centre portion 5 of the edges, and measured perpendicular to said frame opening plane P2.

The above mentioned total thermal deflections DIS4 are provided when the VIG unit is arranged in the frame 20, and is determined relative to the state of the VIG unit edge position/deflection when the VIG unit glass sheets 2*a*, 2*b* have an identical/the same temperature such as 20° C. It may e.g. be measured by an optical measuring instrument such as a laser distance measuring instrument/sensor.

In one or more embodiments of the present disclosure, the largest total edge deflection DIS4 of any of the edges 8*a*-8*d* of the vacuum insulated glass unit 1, between the corners 9 at a temperature difference AT=T1−T2 between the two glass sheets 2*a*, 2*b* of 65° C. may be configured to be in the range of 4 to 35 mm, such as in the range of 6 to 20 mm.

In one or more other embodiments of the present disclosure, the largest total deflection DIS4 of any of the edges 8*a*-8*d* of the vacuum insulated glass unit 1, at a temperature difference AT=T1−T2 between the two glass sheets 2*a*, 2*b* of 40° C. may be configured to be in the range of 3 to 25 mm, such as in the range of 6 to 15 mm.

The above mentioned total thermal deflections DIS4 are provided when the VIG unit is arranged in the frame 20, and is determined relative to the state of the VIG unit edge position/deflection when the VIG unit glass sheets 2*a*, 2*b* have an identical/the same temperature such as 20° C. It may e.g. be measured by an optical measuring instrument such as a laser distance measuring instrum ent/sensor. The above mentioned total or largest thermal deflections DIS4 are configured to be present when the frame 20 provides the mentioned restriction of the thermal deflection DIS4 of the edges 8*a*-8*d*, thus reducing the magnitude of the thermal deflection compared to an unrestricted thermal deflection of the edges at the temperature difference (AT=T1−T2).

As can be seen, in FIGS. 3-7, the frame opening plane P2 may be determined to be placed to coincide with the VIG unit plane PI in the frame (the frame is though not illustrated). In some embodiments, the total edge deflection DIS4 will be the sum of the largest distances of positions of the VIG unit edge in question from the frame opening plane in each their direction D1, D2 from that plane.

In FIGS. 4, 6 and 7, the largest total edge deflection DIS4 is defined between the deflection of the edge seal 3 at the centre 5 of the edge 8*b*, and the edge seal 3 at the corner 9 of the same edge, in a direction perpendicular to the plane P2, PI.

Figure 8:
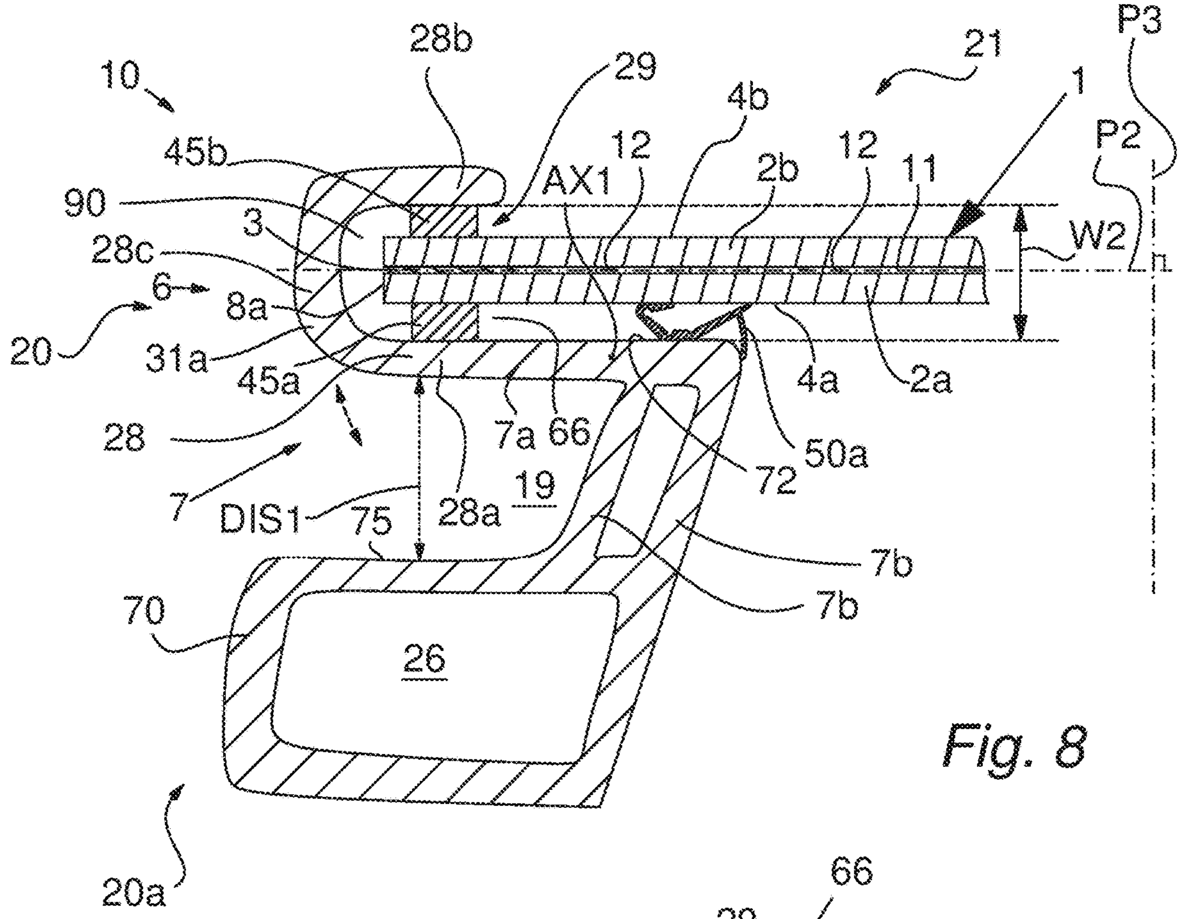
FIG. 8: illustrates embodiments of the present disclosure where a frame comprises a flexible connection arrangement.

FIG. 8 illustrates schematically a cross sectional view of an elongated frame profile arrangement 20*a* of a frame 20 according to embodiments of the present disclosure. The elongated frame assembly 20*a* comprises an elongated sash profile 70 extending in the longitudinal direction of the VIG unit 1.

A holding part 6 fixates the VIG unit 1 in/to the frame 20. The holding part 6 comprises a recessed portion 29 that is provided between the holding members 28*a*, 28*b* such as walls or legs. The holding members 28*a*, 28*b* are arranged at opposite outwardly facing surfaces 4*a*, 4*b* of the vacuum insulated glass unit 1, so that the edge 8*a* of the vacuum insulated glass unit 2 extends into the recessed portion 29 and is held in this recess 29 by means of the holding members 28*a*, 28*b*.

A wall part 28*c* of the holding part 6 interconnects the holding members 28*a*, 28*b* and provides a bottom wall member of the recess 29 receiving the vacuum insulated glass unit edge 8*a*.

The recess 29 may provide a space 66 with a minimum distance between an outer major surface 4*a*, 4*b* of the vacuum insulated glass unit and said frame is at least 4 mm such at least 5 mm, for example at least 6 mm at a temperature difference between the two glass sheets 2*a*, 2*b* of the vacuum insulated glass unit of substantially 0° C. Said minimum distance is measured in a direction perpendicular to the outer major surface 4*a*, 4*b* of the vacuum insulated glass unit 1 and the frame, such as the inner surface of the frame wall member 28*a* or 28*b* facing the major VIG unit surface.

A flexible connection arrangement 7 comprising a flexible wall 7*a* connects the holding part 6 to the elongated frame profile arrangement 20*a*, in the present embodiment an elongated sash profile 70.

The wall 7*a* of the flexible connection arrangement 7 is configured to flex when the vacuum insulated glass unit 1 exerts a bending moment on the holding part 6 due to a thermal deflection. This bending moment may be configured to be provided about an axis AX1 having a component which is substantially parallel to the edge 8*a* of the VIG unit 1 extending into the recessed portion 29. Hence, the flexible portion of the wall 7*a* flexes so that the holding part 6 is moved relative (see dashed, curved arrow) to the elongated frame profile arrangement 70, 20*a* to which the individual holding part 6 is connected.

As can be seen, the VIG unit 1 is held between the holding members 28*a*, 28*b* by means of fixation arrangements 45*a*, 45*b* of the holding part 6, see e.g. also description below to other figures.

A resilient, elongated tightening gasket or sealing 50*a* may in embodiments of the present disclosure extend parallel to the edge 8*a* between a surface 72 of the elongated member 20*a* and the VIG unit 1 surface 4*a*. This elongated tightening gasket or sealing 50*a* is configured to seal the space 66 between the major surface 4*a* of the vacuum insulated glass unit and the frame 20. This provides a water and/or air tightening between the frame and the vacuum insulated glass unit 1. The gasket/seal 50*a* may be placed between a fixation arrangement 45*a* and the frame opening 21.

In FIG. 8, the resilient gasket/seal 50*a* is placed between the wall(s) 7*a* of the flexible connection arrangement 7 and the VIG unit 4*a* surface, and support on the flexible connection arrangement. Hence, when the thermal deflection of the VIG unit edge changes due to a temperature difference change, the deflection (and/or compression dependent on gasket/seal type) of the gasket/seal 50*a* will change, but the gasket/seal 50*a* will, due to the resiliency, still provide an air tightening between the surface 4*a* and the frame 20 in that it will follow the surface 4*a* movement.

Generally, it is understood that the holding part 6 and/or flexible part 7, and e.g. also the elongated sash member 70 may in embodiments of the present disclosure e.g. be made from a plastic material such as a PVC (polyvinyl chloride) or PP (polypropylene) plastic material, it may be composite material such as a glass or carbon fibre material, the profiles may be made from a plastic material with fibres embedded to obtain a more strong/rigid profile and/or the like. Also, in one or more embodiments, one or more of the profiles of the frame may be made from a metal such as aluminium or another suitable metal alloy.

In the example of FIG. 8, the flexible connection arrangement 7, the elongated frame/sash member 70 and the holding part 6 is integrated in the same frame profile 28. The profile 28 may either be an extruded, moulded or pultruded, such as co extruded or co pultruded, profile. It may also be bent or roll shaped to provide a profile having this shape. It is understood that in other embodiments of the present disclosure, the profile 28 comprising the flexible connection arrangement 7, and the holding part 6 may be integrated in one profile (e.g. by extrusion, moulding or pultrusion), and may be connected to an elongated sash profile by means of a sash connection part 28*e*, see FIG. 9.

The elongated sash profile 70 extending in the longitudinal direction of the VIG unit comprises an insulating cavity 26 enclosed by the sash profile wall. It is understood that the elongated sash profile may comprise a plurality of cavities extending in the longitudinal direction of the profile (substantially along/parallel to the edge 8*a*), and these may be separated by partition walls (not illustrated) obtained during the manufacturing of the profile. One or more these compartments/cavities 26 may in embodiments of the present disclosure be filled with an insulating arrangement (not illustrated) such as an insulating foam, a polystyrene material, a glass fibre insulation such as glass wool or mineral wool, it may comprise an aerogel insulating material and/or the like, but it/they 26 may also be kept substantially empty and thus just be filled with a gas such as air.

The profile 28 comprises distancing walls/portions 7*b* providing the flexing space 19 which the holding part 6 and the wall 7*a* of the flexible connection arrangement 7 can deflect/move into and away from when subjected to a thermal bending. This space 19 is provided between the flexible wall 7*a* and the elongated sash profile 70.

The flexible connection arrangement 7 may thus suspend the vacuum insulated glass unit with a distance from the elongated frame profile arrangement's 70 to which the holding part 6 is connected.

In FIG. 8, two separated distancing walls/portions 7*b* providing an enclosed space there between are provided. This may e.g. help to improve rigidity of the profile in the area of the walls 7*b*, but it is understood that the profile 28 may also just, in other embodiments comprise just one distancing wall/portion 7*b*. The distancing wall or walls 7*b* may in further embodiments of the present disclosure also provide a flexible part of the flexible connection arrangement 7, and it is understood that in embodiments, just one distancing wall 7*b* may be present to e.g. help to improve softness of the flexible connection arrangement.

As can be seen in FIG. 8, the wall 7*a* of the flexible connection arrangement 7 may in embodiments of the present disclosure extend from the holding member 6 and comprises a bend 31*a* towards a plane P3. This plane P3 extends substantially perpendicularly through the frame opening 21 plane P2 and is substantially parallel to the edge 8*a* of the VIG unit extending into the recess 29 of the holding part 6. The bend 31*a* provides that the flexible portion of the wall 7*a* is arranged opposite to the outwardly facing major surface 4*a* of the vacuum insulated glass unit.

The thermal deflection of the edge 8*a* is configured to be provided relative to the frame opening plane P2 towards and away from the sash profile 70.

In embodiments of the present disclosure, the maximum distance DIS1 between the outer surface 75 of the sash profile 70 facing the flexing space 19, and the surface of the holding member 28*a* facing the flexing space 19 (determined substantially perpendicularly to the surface 4*a* and opposite to the edge seal 3) may be between 0.5 cm and 15 cm, such as between 0.5 cm and 15 cm, such as between 0.7 and 7 cm, e.g. between 1 cm and 6 cm.

In embodiments of the present disclosure, the minimum distance DIS1 between the outer surface 75 of the sash profile 70 facing the flexing space 19, and the surface of the holding member 28*a* facing the flexing space 19 (determined substantially perpendicularly to the surface 4*a* and opposite to the edge seal 3) may be at least 0.4 cm, such as at least 0.5 cm, e.g. at least 1 cm, e.g. at least 1.5 mm.

This distance DIS1 may e.g. dependent on the VIG unit size (height and/or width) and/or the layout of the flexible connection system. This distance DIS1 may in embodiments of the present disclosure apply for one or more positions, or along the entire surface 4*a* of the VIG unit when the temperature difference between the glass sheets 2*a*, 2*b* is substantially 0° C.

In further embodiments of the present disclosure (not illustrated), a separation wall may extend from the sash profile 70 and towards the VIG unit 1, between the flexible connection arrangement 7 and the frame opening 21. The resilient gasket 50 may here instead be provided between this separation wall and the proximate major VIG unit surface 15.

Figure 9:
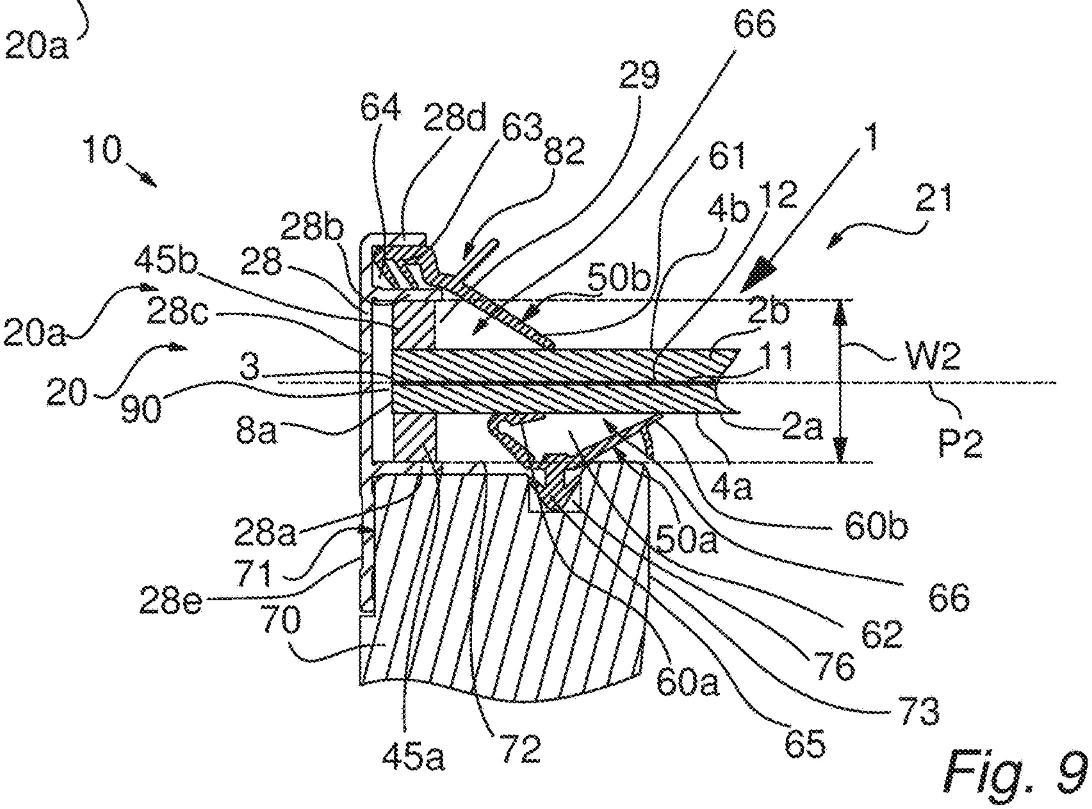
FIG. 9: illustrates embodiments of the present disclosure where a VIG unit frame assembly is a window.

FIG. 9 illustrates schematically a cross sectional view of several embodiments of the present disclosure where the VIG unit frame assembly 10 is a window.

Here the gasket/seal arrangement 50*a* is placed between a sash profile 70 and the VIG unit surface 15. The gasket arrangement 50*a* is arranged to provide an air tightening at the surface 4*a* of the VIG unit 1 for facing the interior of the building, and comprises two elongated flaps/lips 60*a*, 60*b* each deflected (and not as such compressed) by the VIG unit surface 4*a* compared to a free state, and in contact with/abutting the VIG unit surface 4*a*. These tightening flaps/lips 60*a*, 60*b* help to protect against condensation at the VIG unit edge 8*a* area due to a cold bridge provided between VIG unit glass sheets by the edge sealing 3.

A space 62 defined between the flaps/lips 60*a*, 60*b* and enclosed by the VIG unit surface 4*a* helps to provide an air and/or heat insulation.

The gasket arrangement 50*a* thus follow the VIG unit edge 8*a* movement when the VIG unit's thermal deflection changes due to a temperature difference variation, due to the resilient properties of the gasket arrangement 50*a*, so as to provide an air tightening functionality.

The seal/gasket arrangement 50*b* is arranged to provide a water tightening at the outer surface 4*b* of the VIG unit 1 to face away from the interior of the building.

This gasket arrangement 50*b* also comprises an elongated flap/lip 61 deflected by the outer surface 4*b* of the VIG unit 1. This flap/lip 61 follow the VIG unit movement when the VIG unit's thermal deflection changes due to a temperature difference variation, due to the resilient properties of the gasket arrangement 50*b*, so as to provide a water tightening functionality, e.g. to protect the interior of the frame such as the space 66 and recess 29 from moist, dew, rain water and/or the like. The gasket arrangement 50*b* thus follows the difference in the edge deflection curve caused by thermal deflection.

Generally, as one of the lips/flaps of the gasket arrangements 50*a*, 50*b* hence become less deflected by the VIG unit as the thermal deflection of the VIG unit changes, the lips/flaps of the other gasket will at the same location of the VIG edge 8*a* simultaneously become more deflected.

As can be seen, the outer gasket 50*b* may in embodiments of the present disclosure be connected to the frame 20 by being inserted in a gasket recess 64 of the holding member profile 28 dedicated to this. The recess 76 receives a connection part 63 of the elongated gasket arrangement 61. This gasket recess or groove 64 is defined between the holding member 28*b*, and a further gasket support member/wall 28*d*.

The recesses 29 and 64 extends parallel in the longitudinal direction of the frame profile arrangement 20*a*, along the longitudinal direction of the edge 8*a* of the VIG unit.

The sash profile 70 may be configured to face the interior of the building. The profile 70 comprises a groove 76 in a surface 72. This groove 71 receives a connection part 65 of the gasket arrangement 50*a*, so that the gasket arrangement 50*a* extend between the sash profile surface 72 and the VIG surface 4*a*. Also or alternatively, the groove 76 may be arranged in another surface 73 dependent on the design of the gasket/seal arrangement 50*a*.

It is naturally to be understood that in other embodiments of the present disclosure, the gasket arrangements 50*a*, 50*b* may be attached/connected to the frame 20 by any other suitable means such as by means of glue, nails, screws or the like and/or be attached/connected to the frame at other location than the ones illustrated and described in relation to FIG. 8 or 9.

As illustrated in FIG. 9, the width W2 of the recess 29 between holding members 28*a*, 28*b* may be larger than the thickness of the part of the VIG unit edge 8*a* extending into the recess 29, and hence, a predefined space 66 may be provided between the outer surface 4*a*, 4*b* of the glass sheets 2*a*, 2*b* of the VIG unit 1, and holding members 28*a*, 28*b*.

Figure 10:
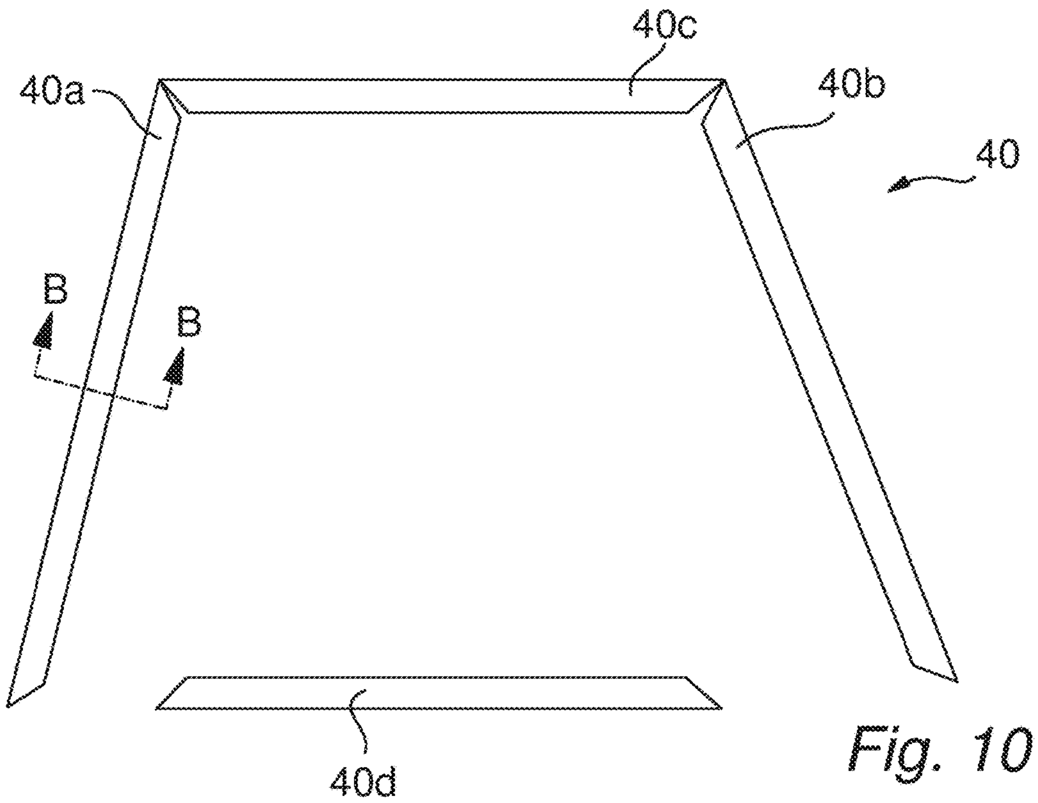
FIGS. 10-11: illustrates a gasket arrangement that may provide a restriction against thermal deflection according to embodiments of the present disclosure.

The VIG unit 1 may as described in relation to FIGS. 9-10 either thermally deflect in this space 66 between the walls 28*a*, 28*b* so as to describe the previously described "deflection curve" of the edge 8*a* in the recess 29, and/or the holding members 28*a*, 28*b* may deflect along with it.

In embodiments of the present disclosure, the distance in the space 66 between the holding members 28*a*, 28*b* and the respective VIG unit surface 4*a*, 4*b* may configured to be larger than 1 or 2 mm, such as larger than 4 mm e.g. larger than 6 mm, such as larger than 8 mm when the VIG unit is kept at a constant temperature such as 20° so that the glass sheets of the VIG unit are at the same temperature. In embodiments, the spaces 66 between the respective holding member 28*a*, 28*b* and VIG unit surface 4*a*, 4*b* may be configured to be between 4 mm and 12 mm, such as between 4 mm and 10 mm, e.g. between 5 mm and 8 m when the VIG unit is kept at a constant temperature such as 20° so that the glass sheets of the VIG unit are at the same temperature.

The gasket flap/lips 60*a*, 60*b*, 61 seals this space 66, and may thus comprise a surface facing the exterior of the frame arrangement 20, such as facing the frame opening 21.

In one or more aspects of the present disclosure, said resilient gasket 50*a* in the space 66 may have a thickness/height above 4 mm, such as above 5 mm, for example above 6 mm at a temperature difference between the VIG unit glass sheets of substantially 0° C. This thickness may in embodiments be between 4 mm and 30 mm, for example between 4 mm and 13 mm, such as between 4 mm and 10 mm, for example between 5 and 10 mm, at a temperature difference between the two glass sheets of the vacuum insulated glass unit of substantially 0° C. The thickness is measured in a direction perpendicular to the outer major surface of the VIG unit.

This thickness of the gasket may as illustrated, at least for gasket 50*a* correspond to the distance such as the minimum distance between the surfaces 72 and 2*a*, and is determined when the resilient gasket 50*a*, 50*b* has been pre-deflected by the VIG.

Also, FIG. 9 illustrates an embodiment of the present disclosure where the holding members are part of a profile 28 comprising a connection wall part 28*e*. This part 28*e* connects the profile 28 to the sash profile 70 at a connection area 71. The connection wall part 28*e* may be connected (at connection area 71) to the sash profile 70 by means of mechanical fasteners (not illustrated) such as screws or nails, one or more snap connections, one or more tongue and groove connections and/or the like. The connection wall part 28*e* may also or alternatively be connected to the profile 70 by means of an adhesive. Also, in one or more embodiments, the sash profile 70 to which the connection wall part 28*e* is connected may be made from a metal such as aluminium, and/or a wood material such as core wood or glued laminated wood. In further embodiments of the present disclosure, the sash profile 70 may be an extruded, pultruded or moulded profile, e.g. made from a plastic material such as a PVC (polyvinyl chloride) or PP (polypropylene) plastic material, it may be composite material such as a glass or carbon fibre material, it may be made from a plastic material with fibres embedded to obtain a more strong/rigid profile and/or the like. The elongated sash profile 70 may either be hollow or it may be solid (e.g. a solid wood material profile).

The sash profile 70 may generally in embodiments of the present disclosure be connected to one or more hinge connections so as to allow the sash profile 70 and thus the remaining part of the frame 20 and the VIG unit 1 to be moved and opened and closed relative to a fixed frame arrangement (not illustrated in FIG. 9).

Figure 11:
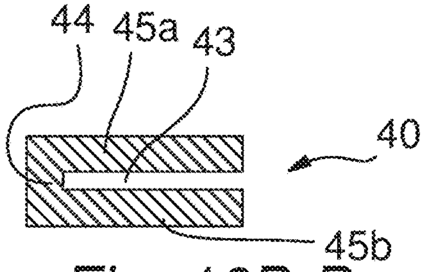
Figure 11:
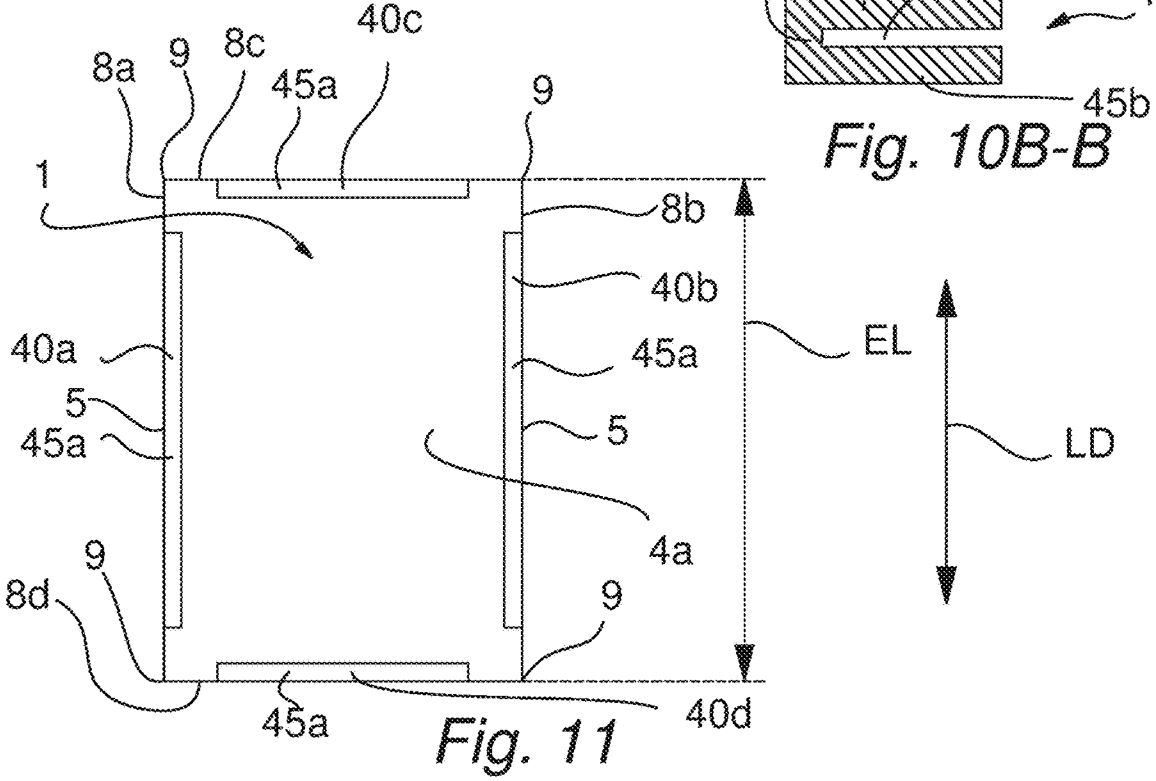

As illustrated in FIG. 11, the holding wall members 28*a*, 28*b* and the connection part 28*e* may together provide an F-shape in embodiments of the present disclosure. The walls/members 28*a*, 28*b*, 28*d* may as illustrated in FIG. 11 together provide an E-shape in embodiments of the present disclosure.

The fixation arrangements 45*a*, 45*b* placed between the holding members 28*a*, 28*b* and the VIG unit surface 4*a*, 4*b* may in embodiments of the present disclosure comprises one or more suspension elements 45*a*, 45*b* that are pre-compressed between the holding members 28*a*, 28*b* and the respective outwardly facing surface 4*b*, 4*a*. The compressed, resilient suspension elements 45*a*, 45*b* provides a holding force towards the opposite outwardly facing surfaces 4*b*, 15 of the vacuum insulated glass unit 1 so as to suspend the vacuum insulated glass unit 1 between the first and second holding members 28*a*, 28*b*. Hence, each of the compressed, resilient suspension elements 45*a*, 45*b* are further compressed or expands in response to the thermal deflection of the edge 8*a* of the VIG unit 1 due to a temperature difference AT between the two glass sheets 2*a*, 2*b*. Thus, the magnitude of the thermal deflection of the respective VIG unit edge may be allowed to change along the edge as e.g. illustrated in and/or described in relation to one or more of FIGS. 3-7, in the frame recess 29 and possibly also by at least partly deflecting the holding members 28*a*, 28*b* due to the thermal deflection of the VIG unit edge.

In one or more embodiments of the present disclosure, the resilient suspension elements 45*a*, 45*b*, may have a height of at least 8 mm such as at least 10 mm, for example at least 12 mm in an uncompressed state. The pre-compression of each the suspension elements 45*a*, 45*b* may in embodiments of the present disclosure be at least 3 mm such as at least 4 mm, e.g. at least 6 mm at a temperature difference AT between the glass sheets 2*a*, 2*b* of 0° C.

In one or more embodiments of the present disclosure, the compression and expansion of the resilient suspension elements at the ⅛, such as the 1/10, such as 1/12 of the length of the vacuum insulated glass unit edge nearest a corner where the respective edge terminates, is configured to be larger than the compression and expansion, respectively, of the same resilient suspension elements at a position closer to the centre of the respective edge, at a temperature difference AT between the glass sheets of e.g. 40° C. or 65° C. This may e.g. help to provide that the resistance against the thermal deflection of the edge of the VIG unit 1 may be configured to be substantially lower at corner parts of the edges than at centre parts of the edge.

In one or more aspects of the present disclosure, said resilient suspension elements 45*a*, 45*b* may be foam elements, rubber elements, such as substantially solid rubber elements from a rubber material such as natural rubber and/or synthetic rubber, and/or be made from a plastic material or a silicone material.

Generally, in various embodiments of the present disclosure, the fixation arrangements 45*a*, 45*b* may be or comprise an adhesive material, a substantially rigid material such as a plastic material or an moulded material injected between the walls 38*a*, 38*b* and the VIG unit, an adhesive such as a glue or an adhesive tape and/or the like, one or more clamps such as metal or plastic clamps providing a clamping force e.g. by means of resiliency in the clamps and/or due to a wedging/clamping force transferred through the clamp from the holding members one or more of the above mentioned resilient, pre-compressed suspension elements one or more gaskets (see e.g. FIGS. 10, 10B-B and 11 described below) and/or the like.

It can be seen form several of the figures such as FIGS. 8 and 9, and other figures described below that the edges 8*a*-8*d* of the VIG unit 1 in embodiments of the present disclosure may be kept with a distance between the VIG unit edge 8*a* and the interconnecting wall member 28*c* of the frame profile 28, thus providing a space 90 between these. Hence, the VIG unit edge 8*a* may move/slide into or away from this provided space 90 due to differences in CTE between the glass sheets 2*a*, 2*b* and the material of the holding part 6 or another part of the frame. Also, or alternatively, the VIG unit edge 8*a* may move/slide into or away from this provided space 90 as the temperature difference between the VIG surfaces 4*a*, 4*b* varies, hence causing a change in the amount and/or direction of the thermal deflection of the VIG unit 1. Though, some of this movement of the VIG unit 1 may in embodiments of the present disclosure also or alternatively deflect/flex the flexible connection arrangement 7. Hence, it is understood that in other embodiments of the present disclosure, the edge 8*a*-8*d* may instead be very close to or abut the wall 8*c*

It is generally understood that the width W2 of the recess 29, 24 (see also FIG. 12) in embodiments of the present disclosure may be configured to be substantially fixed during the thermal edge deflection, at least when the temperature difference (AT=T1−T 2 is at or less than 40° C. such as at or less than 65° C., and compared to the width W2 at a temperature difference AT=T1−T2 of 0° C.

It is generally understood that the width W2 of the recess 29, 24 (see also FIG. 12) in embodiments of the present disclosure may be configured to vary less than 15%, such as less than 10%, e.g. less than 5% during said the thermal deflection, when said the temperature difference (AT=T1−T2) is 65° C. or 40° C., compared to the width W2 at a temperature difference (AT=T1−T2) of 0° C. This may apply for the width W2 at any position along the respective edge. It may however be configured to vary more than e.g. 0.5 or 2% under these conditions.

FIGS. 10 and 10B-B illustrates schematically a fixation gasket assembly 40 comprising elongated gasket strips 40*a*-40*d* for use in a VIG unit frame assembly 10 according to embodiments of the present disclosure. These gasket strips may be configured to provide the fixation arrangements 45*a*, 45*b* in embodiments of the present disclosure. FIG. 10B-B illustrates a cross sectional view of the cutting planes B-B as illustrated in FIG. 10.

As can be seen from FIG. 10B-B, the gasket strips 40*a*-40*d* of gasket assembly 40 has/provides a C-profile providing a recess 43 for receiving the VIG unit edges 8*a*-8*d* (not illustrated in FIG. 11). The gasket assembly 40 comprises four elongated gasket strips 40*a*-40*d*, one for each VIG edge 8*a*-8*d*. Two, or as in the present example three, or four of these elongated gasket members 40*a*-40*d* may be folded around the corners of the VIG unit so that the edges of the VIG unit extend into a recess in the frame between walls/holding parts 28*a*, 28*b*, 22, 23 (not illustrated in FIG. 10)

The strips 40*a*-40*d* may be connected/unbroken at the corners 9 of the VIG unit, and may as illustrated comprise chamfered ends arranged to provide a substantially 90° bend at the corners between adjacent ends of the strips 40*a*-40*d* folded at the VIG corners, e.g. so that two adjacent ends of strips 40*a*-40*d* arranged at each their edge terminating at the same VIG unit corner 9 abuts.

However, in some embodiments of the present disclosure, the strips 40*a*-40*d* may not be connected to each other at the corners 9 of the VIG unit 1.

The fourth strip 40*d* may however also be disconnected from the other as illustrated in order to be fitted appropriately at a bottom frame profile of the frame assembly 20 when installing or exchanging the VIG unit in the frame 20. However, in other embodiments, the fourth gasket 40*d* may be connected to one or more of the other gasket members 40*a*-40*d*, or another type of suspension element may be used. Also, in other embodiments only two or three of the gasket members 40*a*-40*d* may be used.

An end wall member 44 of the fixation gasket 40 at the recess 43 bottom connects the gasket side walls 45*a*, 45*b* and is configured to be placed opposite to the VIG unit edges 8*a*-8*d*, e.g. so as to abut the VIG unit edges 8*a*-8*d*, and the gasket side walls 45*a*, 45*b* will thus extend in over the outer surfaces 4*a*, 4*b* of the VIG unit 1.

In further embodiments, the gasket strips 45*a*, 45*b* may merely be two individual gasket strips.

FIG. 11 illustrates schematically a VIG unit 1 according to embodiments of the present disclosure, wherein fixation arrangements 45*a*, 45*b* in the form of elongated gasket strips 40*a*-40*d* arranged at the edges 8*a*-8*d* of the VIG unit, and supporting on the surface 4*a* of the VIG unit at the edges around the circumference of the VIG unit. For improved clarity, holding members and other parts of the frame 20 are not illustrated in FIG. 12.

In this example, the strips 40*a*-40*d* (as opposed to the embodiment illustrated in FIG. 11) are not configured to extend all the way to the corners 9 of the VIG unit. Rather, the suspension elements 45*a*, 45*b* are arranged to support the centre portion of the VIG unit edge and in both direction towards the corners where the respective edge terminates. The strips 45*a*, 45*b* terminates at a distance before the corner 9 of the edge, and thus, no fixation gasket/suspension element may be arranged at the 1/8, such as the 1/10, such as 1/12 of the length EL of the edge nearest a corner 9 where the respective edge terminates.

In embodiments of the present disclosure, the holding members 28*a*, 28*b* extending along the VIG unit edge, and/or the suspension elements 45*a*, 45*b*, may extend at least 40%, e.g. at least 60%, such as at least 80%, of the entire length of the respective edge of the VIG unit.

In embodiments of the present disclosure, holding members 28*a*, 28*b* extending along the VIG unit edge, and/or the suspension elements 45*a*, 45*b*, may extend no more than 50%, such as no more than 65%, e.g. no more than 75%, such as no more than 85% of the entire length EL of the respective edge of the VIG unit. This may e.g. alone apply for the longer parallel edges 8*a*, 8*b*, but it may also apply for e.g. the shorter edges 8*c*, 8*d*.

Figure 20:
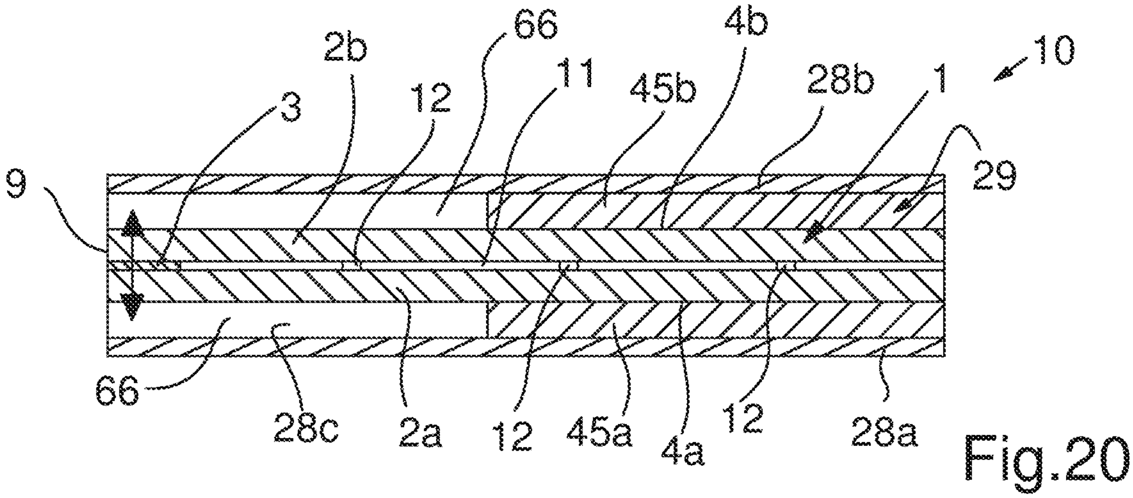

This may e.g. help to provide that the resistance against the thermal deflection of the edge of the VIG unit 1 may be configured to be substantially lower at corner 9 parts/areas of the edges than at centre parts of the edge, See e.g. also FIG. 20 and the description thereto.

Figure 12:
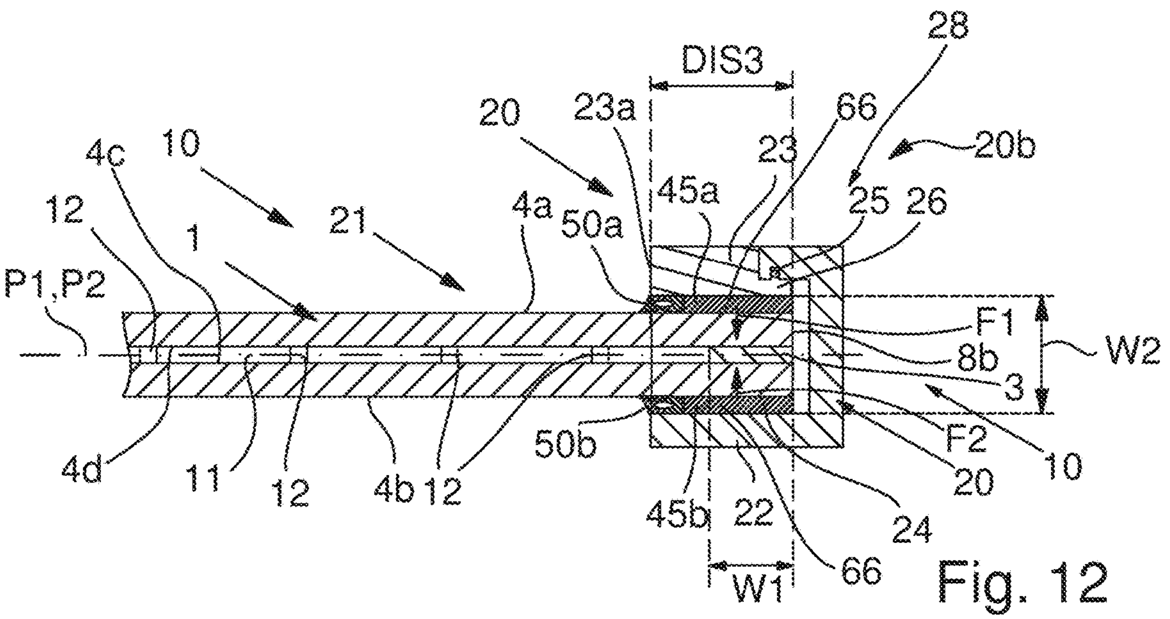
FIGS. 12-13: illustrates embodiments of the present disclosure where frame comprises a base member and a glazing member

FIG. 12 illustrates schematically a cross sectional view of a VIG unit 1 frame assembly 10 with a base member/glazing member solution according to embodiments of the present disclosure.

It is generally understood, that in embodiments of the present disclosure, the frame 20 may overlap the VIG unit edges (in FIG. 12 the edge 8*b* is illustrated) by a certain amount/distance DIS3. This may help to provide an improved insulation performance of the VIG unit frame assembly 20, as the edge seal 3 material such as a metal material or a solder glass material, for example a low melting point solder glass, may provide a "cold bridge" at the VIG unit edge where it seals the gap 11.

The distance DIS3 may in embodiments of the present disclosure be at least two times the width W1, such as at least three times the width of the edge seal 3, measured along an inner surface facing the gap of one of the VIG glass sheets in a direction perpendicular to the nearby edge 8*b*. In embodiments of the present disclosure, the distance DIS3 is between two and five times the edge seal width W1.

For example, the overlap DIS3 may in embodiments of the present disclosure be between 10 mm and 50 mm, such as between 20 mm and 40 mm.

The distance DIS3 may be measured along an outer surface 4*a*, 4*b* from the edge 8*b* to the position where the frame assembly 20 ends and a view through the VIG unit 1 glass sheets 2*a*, 2*b* is possible. In the present example, it may be measured between the edge 8*b* and the surface 23 a of the frame facing the frame opening 21 or between the edge 8*b* and edge of the gasket 50*a* most distal to the edge 8*b*.

It is understood that in further embodiments of the present disclosure (not illustrated in FIG. 16), the outwardly facing surface of the VIG unit 1 to face away from a temperature controlled room such as a room in a building (or a temperature controlled cavity in a freezer or a refrigerator) may either be less overlapped by the frame than the other surface, such as surface 4*a*, to face the room. This may e.g. be provided at one or more sides of the VIG unit at e.g. the bottom edge, top edge and/or side edges of the VIG unit.

It is generally understood that in one or more embodiments of the present disclosure, the frame profile arrangements 20*a*-20*d* may comprise a base member 22 and a glazing member 23. These may be elongated profiles made by means of e.g. an extrusion manufacturing process, a pultrusion manufacturing process, a moulding manufacturing process and/or the like.

The material of the profile(s) 22, 23 may e.g. be a plastic material such as a PVC (polyvinyl chloride) or PP (polypropylene) plastic material, it may be composite material such as a glass or carbon fibre material, the profiles may be made from a plastic material with fibres embedded to obtain a more strong/rigid profile and/or the like. Also, in one or more embodiments, one or more of the profiles of the frame may as previously explained be made from a metal such as aluminium, and/or a wood material such as core wood or glued laminated wood material. These profiles may in embodiments of the present disclosure extend continuously between the corners of the frame 20. One frame example can be an aluminium profile with polymer interconnection between the interior and exterior to add a thermal break. Another frame example according to the present disclosure may be a polymer profile with hollow chambers and reinforcements inside the hollow chambers for adequate strength. Another frame example is a compound frame of wood combined with a non-wood profile.

The glazing member 23 and base member together provides a recess 24 into which the VIG unit edge 8*b* extend.

Figure 13:
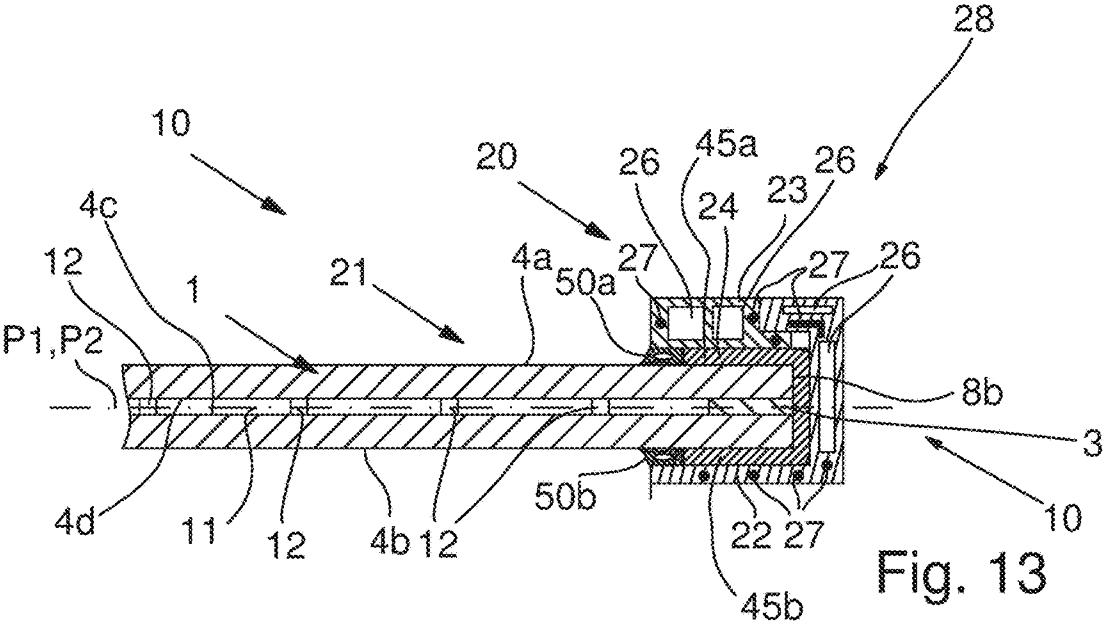

One or more of the frame profiles, 22, 23 of the frame may either be substantially solid, see e.g. FIG. 12, or comprise internal insulating cavities 26, see e.g. FIG. 13, illustrating schematically a cross sectional view of a part of the frame 20 holding the VIG unit according to further embodiments of the present disclosure. In FIG. 12, both the glazing member 23 and the base member 22 comprises such cavities 26. These cavities may be obtained during the production of the profiles 22, 23, and may extend in the longitudinal direction of the profiled 22, 23 inside the profiles 22, 23.

The cavity or cavities 26 may in embodiments of the present disclosure either be left empty to comprise a gas such as air, or a selected gas pumped into the cavity 26. Alternatively one or more of the cavities 26 may comprise an insulating material such as an insulating foam, an expanded polystyrene material, a glass fibre insulation such as glass wool or mineral wool, it may comprise an aerogel insulating material and/or the like.

FIG. 13 moreover illustrates a further embodiment of the present disclosure, wherein the frame profiles 22, 23 comprises strengthening/reinforcing members 27 embedded in the profiles 22, 23, e.g. by means of a co-manufacturing such as co-extrusion or co-pultrusion. These may have any suitable shape, extends in the longitudinal direction of the profiles and helps to improve/increase the rigidity and strength of the frame members 22, 23.

Figure 16:
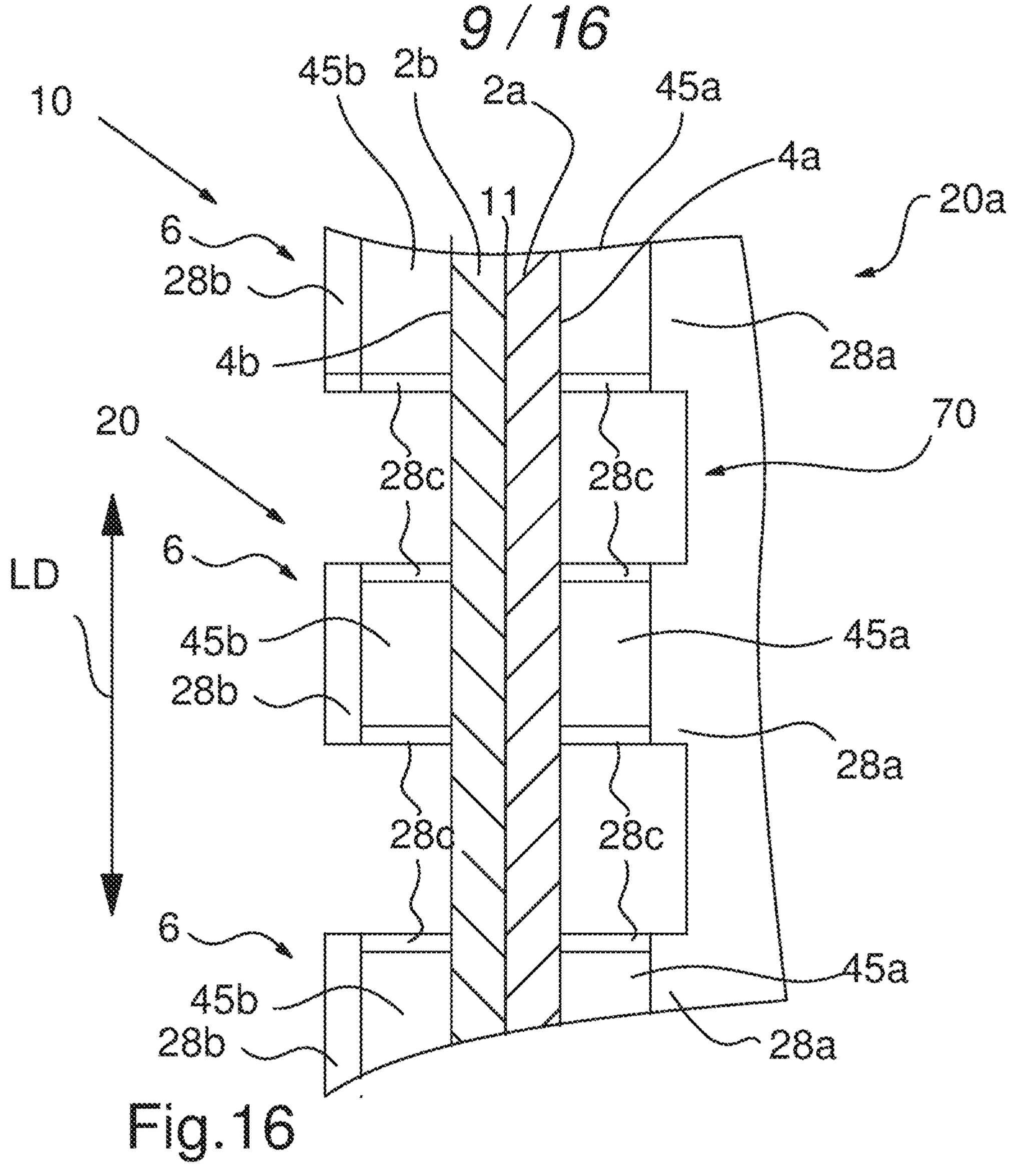
FIGS. 16-17: Illustrates holding systems comprising discretely arranged holding members and discretely arranged fixation blocks FIGS. **18*a*-21: Illustrates various frame solutions for allowing a larger edge deflection at certain areas of a VIG unit, according to various embodiments of the present disclosure.

The further sealings/gaskets 50*a*, 50*b* illustrated in FIG. 16, 17 or other of the previously described figures may in embodiments of the present disclosure be separate and removable from the frame 20, but in other embodiments of the present disclosure (not illustrated), the sealings/gaskets 50*a*, 50*b* may be co manufactured such as co-extruded or co-pultruded together with the base member 22 and/or the glazing member 23, or the profile 28.

As illustrated in FIG. 12-13, the fixation elements 45*a*, 45*b* are arranged in the recess 24 between the base member 22 and the glazing member 23, and the VIG unit 1 respectively.

As can be seen, the base member 22 may extend from a position opposite to the major surface 4*b* of the VIG unit 1 and around the edge 8*b*, and e.g. also to be at least partly opposite to a part of the surface 4*a*, but it may also In other embodiments extend only from a major surface 4*b* of the VIG unit and around the edge 8*b*, and not extend to the oppositely directed surface 4*a* of the VIG unit.

The width W2 of the recess 24 provided between members 22, 23 may in embodiments of the present disclosure be configured to substantially not change when the VIG unit edge 8*b* thermally deflect to describe an edge deflection curve as described above, but in other embodiments, it may be allowed to vary as e.g. previously explained, during thermal deflection of the VIG unit. The width W2 is larger than the thickness of the part of the VIG unit edge extending into the recess 24, and hence, a predefined space 66 may in embodiments of the present disclosure (ref. no. 66 however not illustrated in FIG. 16) be provided between the outer surface 4*a*, 4*b* of the glass sheets 2*a*, 2*b* of the VIG unit 1, and a frame profile member 22, 23. The VIG unit 1 can thermally deflect in this space 66 so as to describe the previously described "deflection curve" of the edge 8*b* in the recess 24.

One or more members of the frame 20, such as the base member 22 and glazing member 23, or the base member alone, may in embodiments of the present disclosure thus help to provide a counter force when the VIG unit thermally deflects, and may in further embodiments of the present disclosure help to provide a restriction towards the thermal deflection of the VIG unit.

This may e.g. be provided within one or more temperature ranges of the temperature difference DT, e.g. at more extreme temperature differences such as temperature differences above 40° C. or above 65° C.

As can be seen in FIG. 12, the glazing member 23 may be connected and fixed to the base member 22 by means of a connection 25. This connection 25 is a tongue and groove connection, but it may also be a snap connection and/or the like. Alternatively or additionally, the glazing member 23 may be connected to the base member 22 by means of other releasable mechanical fastening means such as screws or nails, and/or by means of chemical fastening means such as an adhesive.

In embodiments of the present disclosure, a compression of the fixation arrangement 45*a* may help to keep the glazing member 23 in place relative to the base member 22, e.g. by pressing towards a part 26 of the glazing member 23 arranged between the base member 22 and the suspension element as illustrated in FIG. 16. This may help to provide a holding force or keep a connection arrangement 25 such as a tongue or groove the glazing member in place relative to a groove or tongue in the base member.

When removing the glazing member (if possible), the suspension element(s) may be removed and then the VIG unit may be dismantled from the frame 20.

As previously described, the VIG unit may thermally deflect/bend relative to the frame profiles 22, 23, so that the distance between the outer major surfaces 4*a*, 4*b* of the VIG unit and the frame profiles 22, 23 at/near the edge of the VIG unit changes. This may cause the further seals or gaskets 50*a*, 50*b* (see previous description) to expand or be compressed by the VIG unit 1 due to the thermal deflection along the longitudinal direction LD1 of the frame profiles 22*a*, 22*b* and the VIG unit. Hence, as the amount and even direction of the thermal deflection of the VIG unit may change over time due to a change in the temperature difference between the VIG glass sheets 2*a*, 2*b* as e.g. previously described, the amount of compression of the further seals/gaskets 50*a*, 50*b* may also change over time.

As can be seen in e.g. FIGS. 8-9 and 12-13, the further resilient gasket or seal members 50*a*, 50*b*, 60*a*, 60*b*, 61 may in embodiments of the present disclosure be arranged between the frame opening 21 and the fixation arrangements elements 45*a*, 45*b*, to provide a water and/or air tightening of the recess 24, 29 and spaces 66.

It is generally understood that in one or more embodiments of the present disclosure, in case the fixation arrangements 45*a*, 45*b* are continuous gasket strips, one or both of the further gaskets/seals 50*a*, 50*b*, 60*a*, 60*b*, 61 as described above or below may be omitted, and the fixation arrangements 45*a*, 45*b* may thus provide a sufficient air and/or water tightening between VIG unit 1 and frame 20 at one or both sides of the VIG unit 1.

Figure 14:
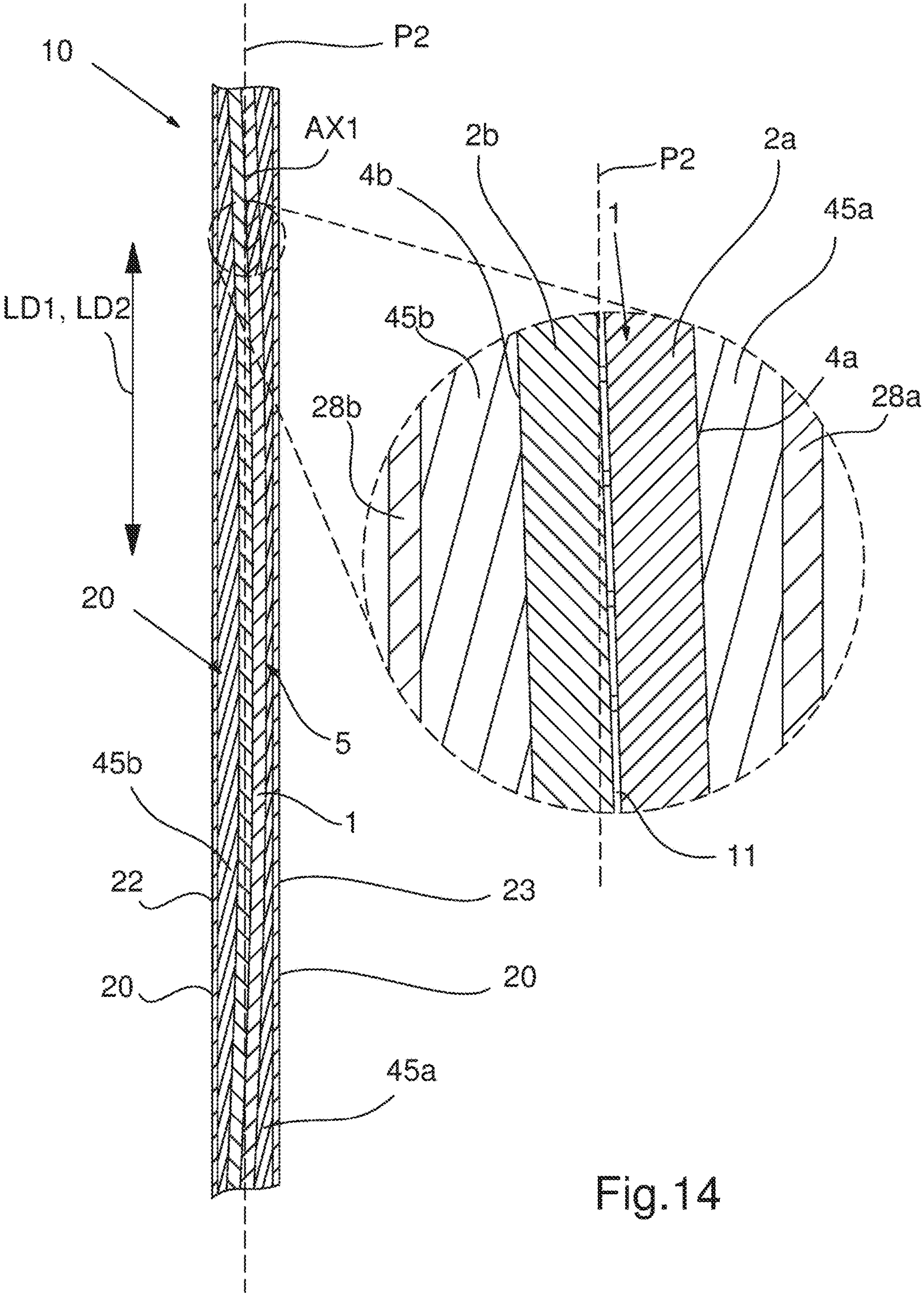
FIG. 14: Illustrates a thermally deflecting VIG unit in a frame, according to embodiments of the present disclosure.

FIG. 14 illustrates a cross sectional view of a VIG unit 1 placed in a frame 20, seen in a direction parallel to the frame opening 21 provided by the frame, according to embodiments of the present disclosure. As can be seen, the VIG unit thermally deflects/bends relative to the holding members 28*a*, 28*b*, so that the distance between the outer major surfaces 4*a*, 4*b* of the VIG unit 1 and the holding members 28*a*, 28*b* near the edge of the VIG unit varies due to a temperature difference between the VIG unit glass sheets 2*a*, 2*b*. This causes the fixation arrangements 45*a*, 45*b* to expand or be further compressed by the VIG unit due to the thermal deflection along the longitudinal direction LD1, LD2 of the holding members 28*a*, 28*b* and the VIG unit 1. The amount of compression of the respective suspension element varies along the direction LD1, LD2 corresponding/according to the thermal deflection of the VIG unit edge. The amount and even direction of the thermal deflection of the VIG unit edge may change over time due to a change in the temperature difference between the VIG glass sheets 2*a*, 2*b* as e.g. previously described, and this also causes a change in the amount of compression of the Fixation arrangements 45*a*, 45*b* over time.

Figure 32:
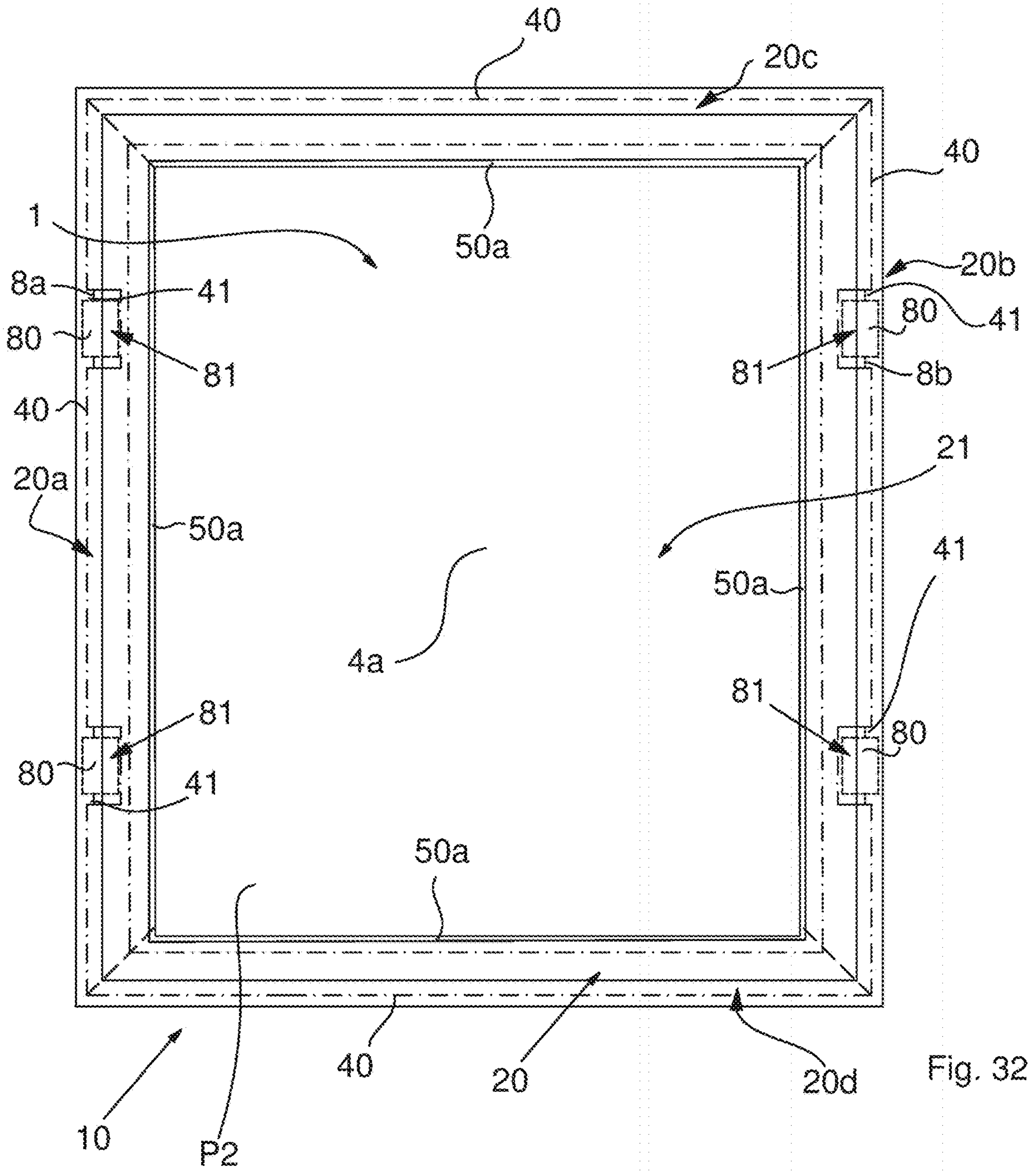

FIG. 14 moreover illustrates a further embodiment of the present disclosure, wherein the fixation arrangements 45*a*, 45*b* are elongated gasket strips configured to extend in the longitudinal direction of the edge 8*a*-8*d* of the vacuum insulated glass unit 1 and the holding part 28, See also for example FIG. 32.

Generally, in embodiments of the present disclosure, the compression and expansion of the resilient fixation arrangements 45, 45*b* arranged at the ⅛, such as the 1/10, such as 1/12 of the length of the vacuum insulated glass unit edge nearest a corner where the respective edge terminates, may be configured to be larger than the compression and expansion, respectively, of the same resilient suspension elements at a position closer to the centre 5 of the respective edge in response to the thermal deflection of the VIG unit 1 edge.

The resilient fixation arrangements 45*a*, 45*b* may provide a restriction of the thermal deflection of the VIG unit 1 compared to an unrestricted thermal deflection.

It is generally understood that in embodiments of the present disclosure, resilient gasket/seal arrangements 50*a* and/or 50*b* (not illustrated in FIG. 14—see e.g. description to previous figures) may also or alternatively be subjected to a varying compression and expansion of the respective gasket/seal arrangements 50*a* and/or 50*b* as described in relation to the fixation arrangements 45*a*, 45*b* described in relation to FIG. 14 and/or in relation the description of the gasket/sealing arrangements 50*a* and/or 50*b* described above in relation to e.g. FIG. 8 or 9. These are however omitted from FIG. 14.

Figure 15:
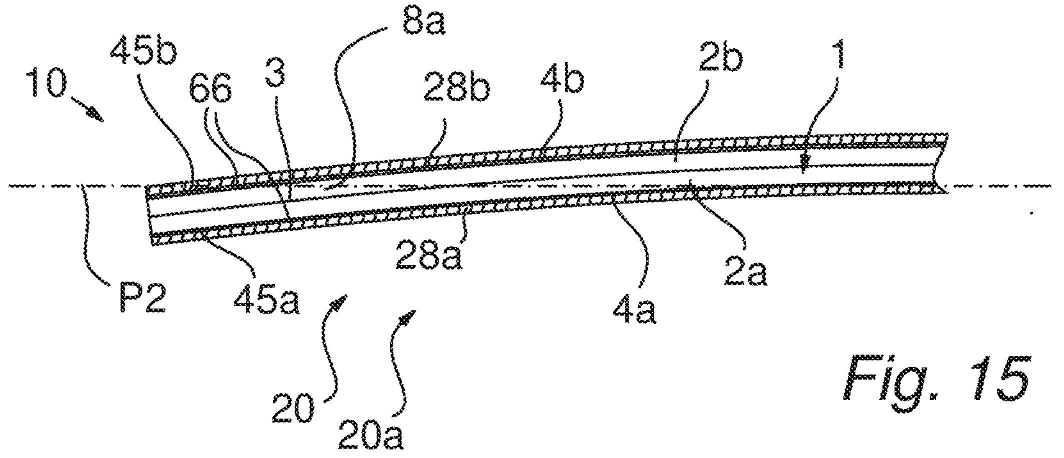
FIG. 15: illustrates an embodiment of the present disclosure where holding members are configured to follow and deflect together with a thermal deflection of a VIG unit edge.

FIG. 15 illustrates schematically a cross sectional view according to embodiments of the present disclosure through the holding members 28*a*, 28*b* between the interconnecting wall 8*c* (not visible in FIG. 15) and the edge 8*a*, and is a view towards the edge 8*a* of the VIG unit 1. The edge 8*a* is subjected to thermal deflection, and hence describes a deflection curve. In this embodiment of the present disclosure, the holding members 28*a*, 28*b* of the holding part 6 are configured to follow and deflect together with the thermal deflection of the VIG unit 1 edge 8*a*.

The holding members 28*a*, 28*b* of the holding part 6 are thus flexible enough to follow the deflection curve of the edge 8*a*. The fixation arrangements 45*a*, 45*b* may here e.g. be a glue or adhesive tape, it may be gaskets such as rubber gaskets and/or the like. The deflection forces provided by the VUG unit 1 due to thermal deflection is transferred through these fixation arrangements 45*a* 45*b* to the holding members 28*a*, 28*b*. The VIG unit 1 may here slide relative to the holding members 28*a*, 28*b* when the edge deflection changes. Thus, in FIG. 15, a certain deflection in the space between the holding members 28*a*, 28*b*, may occur in a space relative to the holding members, but also, as illustrated, the holding members 28*a*, 28*b* may deflect together with the VIG unit due to the thermal deflection of the edge 8*a*.

Figure 17:
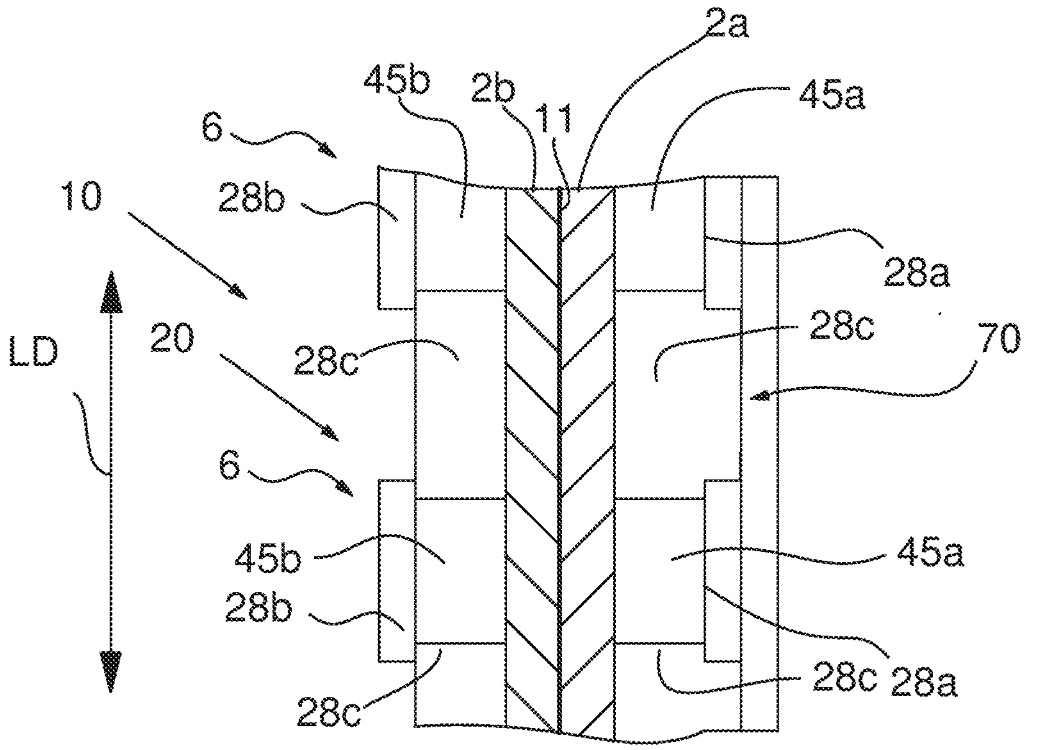

FIGS. 16-17 illustrates schematically embodiments of the present disclosure where a plurality of discrete holding parts 6 each comprising holding members 28*a*, 28*b* are distributed in the longitudinal direction LD of the edge 8*a*-8*d* of the vacuum insulated glass unit extending into the recess 29 between the holding parts 28*a*, 28*b*. Discrete fixation arrangements 45*a*, 45*b* in the form of fixation blocks or the like extends between the outwardly facing glass sheet surfaces 4*a*, 4*b* and the holding members 28*a*, 28*b*, and are distributed in the longitudinal direction of the edge LD at the positions of the holding parts 6.

The interconnecting walls 28*c* are also in the embodiment of FIG. 16 walls interconnecting the holding members 28*a*, 28*b*, and these walls 28*c* are discretely arranged in the longitudinal direction LD of the VIG unit 1 edge with a space there between. This may e.g. be obtained by individual walls 28*c* or by providing slits in an elongated wall 28*c* extending in the longitudinal direction LD of the edge.

In FIG. 17 however, the separation wall 28*c* is an elongated member extending in the longitudinal direction LD of the VIG unit edge. This wall 28*c* interconnects a plurality of discretely arranged holding members 28*a*, 28*b*.

It is understood that even though the fixation arrangements 45*a*, 45*b* illustrated in FIGS. 16 and 17 are a plurality of discretely arranged blocks arranged in the longitudinal direction LD of the edge, it is generally understood that the fixation arrangements 45*a*, 45*b* may also comprise elongated strips extending between the holding members 28*a*, 28*b* along and substantially parallel to the VIG unit edge as e.g. illustrated in e.g. FIG. 14 or 32.

It is generally understood that in embodiments of the present disclosure, the fixation arrangements 45, 45*b* may be pre-compressed, resilient suspension elements 45*a*, 45*b* providing a holding force towards the opposite outwardly facing surfaces 4*a*, 4*b* of the vacuum insulated glass unit 1 so as to suspend the vacuum insulated glass unit between said first and second holding members. Each of said compressed, resilient suspension elements 45*a*, 45*b* may thus be configured to be further compressed or expand in response to the thermal deflection of the edge 8*a*-8*d* of the VIG unit 1 due to a temperature difference AT=T1−T2 between the two glass sheets 2*a*, 2*b*.

Hence, the VIG unit edge may thermally deflect between the holding members 28*a*, 28*b* to describe an edge deflection curve as previously explained.

However, the members 28*a*, 28*b* may also be configured to be deflected by the VIG unit edge deflection in embodiments of the present disclosure, e.g. at the corner areas of the VIG unit or at the entire length of the VIG unit.

It is understood that in embodiments of the present disclosure, a plurality of fixation blocks 45*a*, 45*b* may provide fixation arrangements distributed in the longitudinal direction of the edge in the space between an elongated holding member 28*a*, 28*b* (see e.g. FIG. 14) and the VIG unit.

Figure 18A:
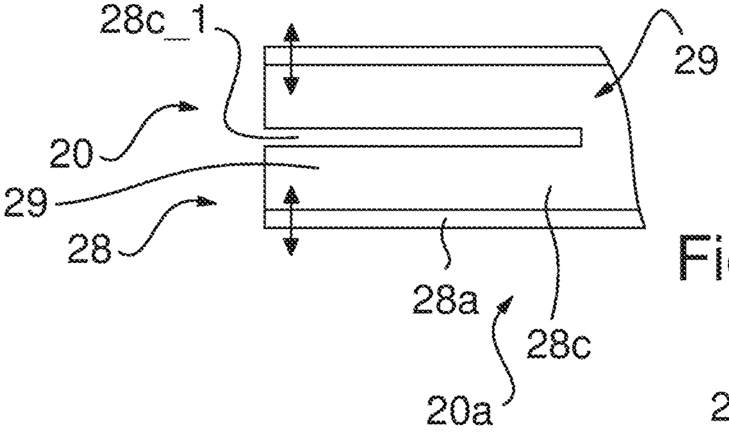
Figure 18B:
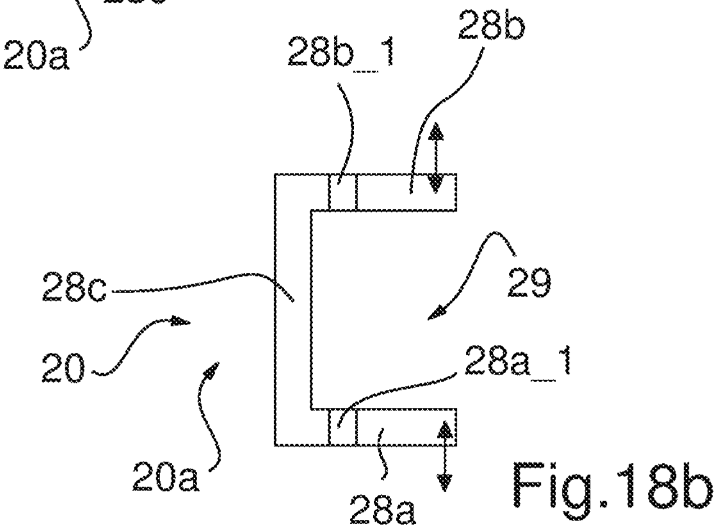

FIGS. 18*a* and 18*b* illustrates schematically embodiments of the present disclosure where an elongated frame profile 20*a* is configured to provide a resistance against the thermal deflection of the edge of the VIG unit 1, so as to restrict the VIG unit's edge thermal edge deflection. In these embodiments, the resistance is configured to be substantially lower at corner parts of the edges than at centre parts of the edge.

The VIG unit 1 is not illustrated in the figure in order to improve the understanding of the FIGS. 18*a* and 18*b*. In FIG. 18*a*, this is provided by means of a weakening arrangement in the form of the slit 28*c*_1 in the interconnecting wall 28*c*. This slit 28*c*_1 is arranged where the corner area of the VIG unit is to be placed. Hence, the VIG unit corner areas may with a reduce force cause an increased distance between the holding members 28*a*, 28*b* compared to the force needed to increase the distance between the holding members 28*a*, 28*b* at other parts of the profile 28 arranged at the centre part of the edge placed in the recess 29 where a weakening arrangement such as a slit is not present.

In FIG. 18*b*, slits 28*a*_1, 28*b*_1 are provided in the holding members 28*a*, 28*b* in order to provide a weakening arrangement where the corner area of the VIG unit is to be placed.

Hence, the VIG unit edge will in FIG. 18*a* and FIG. 18*b*, when arranged in the recess 29, be less restricted during thermal edge deflection at the area of the slit(s) 28*a*_1, 28*b*_1, 28*c*_1 than at the area of the centre part of the edge.

It is generally understood that even though slits are illustrated in relation to FIGS. 18*a* and 18*b* as weakening arrangements, a weakening arrangement may in further embodiments of the present disclosure comprise a plurality of holes, perforations and/or hollow, enclosed channels in the wall 28*a*, 28*b* and/or 28*c*. In still further embodiments, the weakening arrangement may also or alternatively be provided by a softer wall structure of a wall, such as wall 28*c*, (e.g. by selecting a softer or more flexible material for the wall) than the wall structure of e.g. the other walls 28*a*, 28*b* of the holding part 6, and/or the wall 28*c* may be made thinner than e.g. the holding members 28*a*, 28*b*. The weakening arrangement may also comprise one or more recesses in a surface of the walls 28*a*, 28*b* and/or 28*c*.

Figure 19:
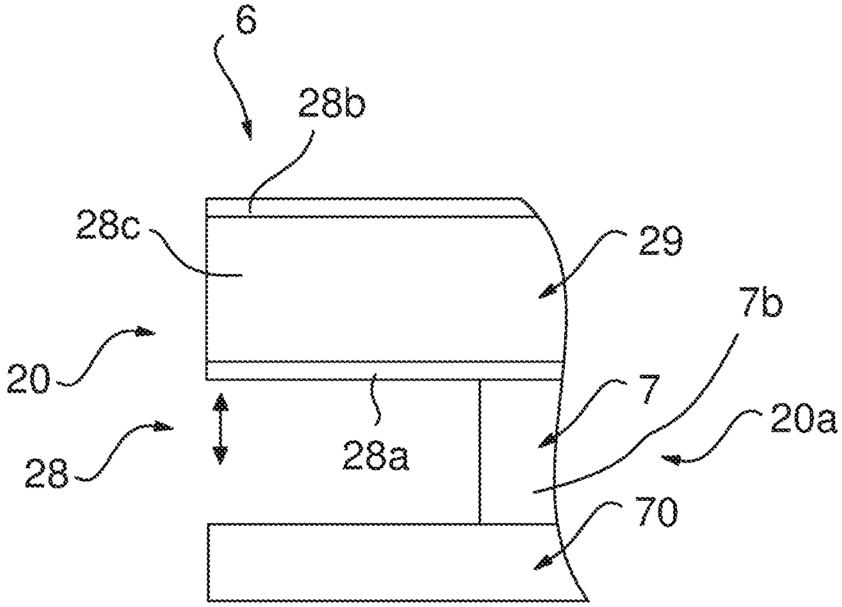

FIG. 19 illustrates schematically a further embodiment of the present disclosure where an elongated frame profile 20*a* is configured to provide a resistance against the thermal deflection of the edge of the VIG unit 1, where the resistance is configured to be substantially lower at corner parts of the edges than at centre parts of the edge. The VIG unit 1 is not illustrated in the figure in order to improve the understanding of the figure. This is provided by means of a weakening arrangement in the form of a removed/omitted wall portion of a wall 7*b* of a flexible connection arrangement 7 (see more details above such as in FIG. 8 and/or the description thereto). This wall portion is removed/omitted at/opposite to the corner area of the VIG unit. Hence, the VIG unit corner areas may with a reduce force cause an increased or reduced distance between the holding part 6 and sash profile 70. This provides that the bending moment provided by the VIG unit due to thermal deflection may more easily deflect the corner areas of the VIG unit compared to the centre portion of the VIG unit. Hence, the VIG unit edge is less restricted during thermal edge deflection at the area of the removed/omitted portion of the wall than at the area of the centre part of the edge.

FIG. 20 illustrates schematically a cross sectional view of a still further embodiment of the present disclosure where an elongated frame profile 20*a* is configured to provide a resistance against the thermal deflection of the edge of the VIG unit 1, where the resistance is configured to be substantially lower at corner parts of the edges than at centre parts of the edge. Here the VIG unit 1 is suspended between the holding members 28*a*, 28*b* by means of a fixation arrangement 45*a*, 45*b* such as a gasket solution, pre-compressed suspension elements and/or the like (e.g. as described in more details above.

The fixation arrangement 45*a*, 45*b* provides a resistance against the thermal deflection of the edge of the VIG unit 1 at centre parts of the edge. However, at the corner area near the corners 9 of the VIG unit, the fixation arrangements are omitted so that the VIG unit corner areas can thermally deflect substantially freely between the holding members 28*a*, 28*b*. Hereby, the resistance against the thermal deflection of the edge of the VIG unit 1 may be configured to be substantially lower at corner parts of the edges than at centre parts of the edge.

The above mentioned weakening arrangements described in relation to FIGS. 18*a*-20 may thus provide a weakening in one or more wall structures of the frame at or near the corner areas of the VIG unit.

Figure 21:
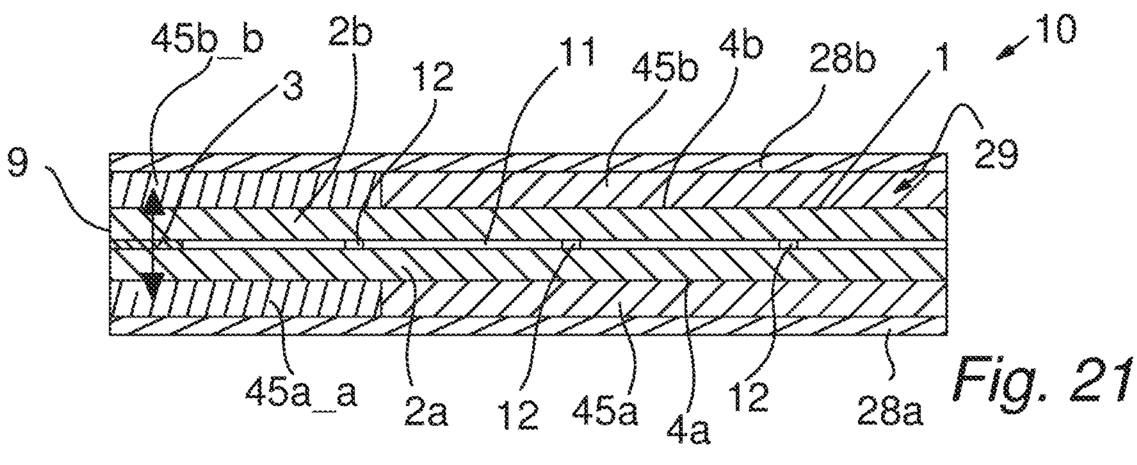

FIG. 21 illustrates a solution substantially as described in relation to FIG. 20. However, here, a fixation arrangement 45*a*_a, 45*b*_b is arranged at the corner areas which has other compression properties than the compression properties of the fixation arrangement 45*a*, 45*b* at or more near the centre portion of the edge of the VIG unit 1. For example, the fixation arrangement 45*a*_a, 45*b*_b at the corner areas may be softer than the fixation arrangement at the centre portion, hence providing a reduced resistance against the thermal deflection of the edge of the VIG unit 1 at the corner area of the VIG unit 1. Hereby, the resistance against the thermal deflection of the edge of the VIG unit 1 may be configured to be substantially lower at corner parts of the edges than at centre parts of the edge.

The arrangement 45*a*_a, 45*b*_b at the corner areas of the VIG unit may also in embodiments merely provide a tightening/gasket function and thus provide substantially no restriction towards the thermal deflection of the corner area of the VIG unit.

Figure 22:
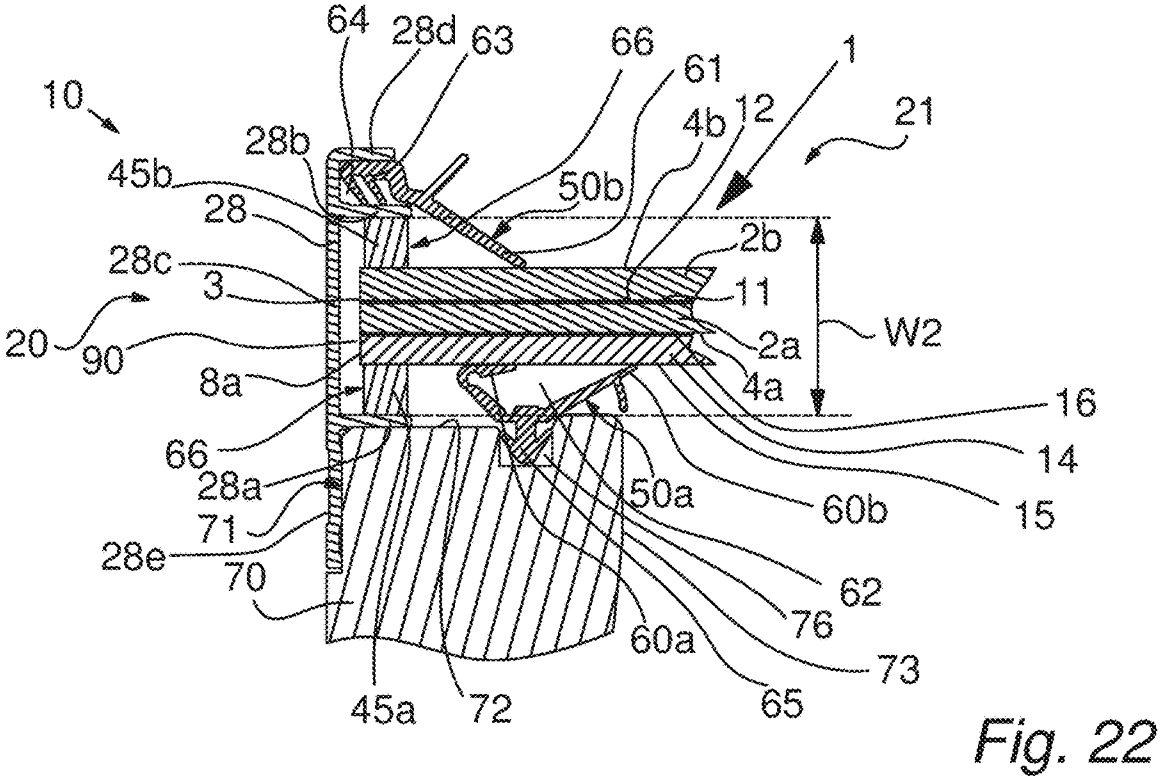
FIGS. 22-24: illustrates embodiments of the present disclosure wherein a VIG unit is laminated.

The frame solution 20, in FIG. 22 (illustrating schematically embodiments of the present disclosure) substantially corresponds to the frame solution according to FIG. 9, however where the VIG unit 1 is laminated with a lamination glass sheet 14, such as an annealed glass sheet or a tempered glass sheet. The lamination glass sheet 14 may e.g. have a thickness between 2 mm and 5 mm, such as between 2 mm and 4 mm, e.g. around 3 mm. This lamination glass sheet 14 is laminated to an outer major surface 4*a* of the VIG glass sheet 2*a* providing a major surface on which the support structures 12 support in the gap 11. The lamination glass sheet 14 is laminated to the VIG glass sheet 2*a* by means of a lamination layer 16 such as a polyvinyl butyral (PVB) or ethylene-vinyl acetate (EVA) layer. The lamination glass sheet 14 thus provides the outer major surface 15 of the glass sheet.

The fixation arrangement 45*a* may thus be arranged to abut or connect to the outer surface 15 of the laminated glass sheet 14. The distance between the holding members 28*a*, 28*b* is thus adjusted to the increased VIG unit 1 thickness provided by the lamination glass sheet 14 and the lamination layer 16. The lamination glass sheet 14 may in embodiments of the present disclosure, as illustrated, be configured to face the interior of the building. However, in other embodiments, it may be arranged in the frame to face the exterior of the building.

Figure 23:
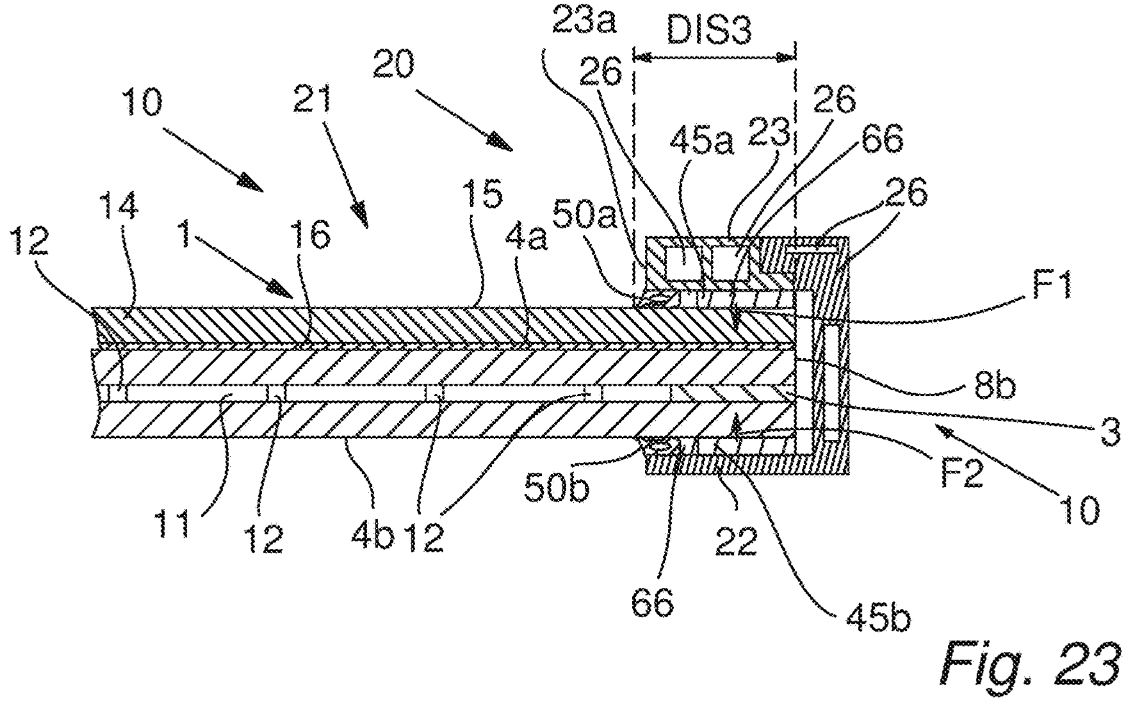

The frame solution 20 in FIG. 23 substantially corresponds to the frame solution according to e.g. FIG. 12 or 13, where a glazing member 23 and a base member 22 of one or more of the frame profile arrangements 20*a*-20*d* are connected by connection 25 and/or by means of screws, nails or the like. These 22, 23 form a recess 24 for receiving the edge of the VIG unit 1. Again, the VIG unit in FIG. 20 is laminated by a lamination glass sheet 14 as e.g. explained above. The edge 8*b* of the VIG unit glass sheets 2*a*, 2*b* and the lamination glass sheet 14 extend into the recess 24 in the frame 20 provided between the base member 22 and the glazing member 23.

The fixation arrangements 45*a*, 45*b* in this embodiment support the VIG unit 1 at an outer surface 4*b* of a VIG glass sheet 2*b* such as a tempered glass sheet, e.g. a thermally tempered glass sheet. The support structures 12 in the gap 11 support at the major surface of this glass sheet 2*b* facing the gap 11 to maintain the gap 11 between the glass sheet 2*b* and a further (e.g. also tempered) glass sheet 2*a* between which the gap 11 is provided. Also, the fixation arrangements support the VIG unit 1 at the oppositely directed outer surface 15 of the laminated glass sheet 14.

It is generally understood that the size of the lamination glass sheet 14, i.e. the width and/or height may be substantially equal to the size of the glass sheet 2*a* of the VIG unit to which it is attached by the lamination layer 16.

Though, in further embodiments of the present disclosure, the size (width and/or height) of the lamination glass sheet 14 may be reduced compared to the width and/or size of the VIG unit glass sheet to which it is attached. This is illustrated in a cross sectional, schematic view in FIG. 24. Here, the resilient, compressed suspension elements 45*a*, 45*b* are configured to suspend the VIG unit 1 at the outwardly facing major surfaces 4*a*, 4*b* of the glass sheets 2*a*, 2*b* providing the major surfaces 4*c*, 4*d* facing the gap 11. The lamination glass sheet's 14 edge 17 extending between the major surfaces of the lamination glass sheet 14 faces the frame 20 surface 23 a, in the present embodiment it faces the glazing member 23. The edge 17 thus is arranged opposite to the edge/surface 23*a* of the frame facing the frame opening 21.

In the present example, the surface of the frame 18 facing in the same direction as the lamination glass sheet surface 15 is substantially flush with the surface 15, but in other embodiments, this may not be the case, and the lamination glass sheet surface 15 may either extend beyond the frame surface 18 facing away from the gap 11, or the surface 15 may not extend all the way to the level of surface 18. The part of the frame 20 at the side of the lamination glass sheet 15 may thus be considered counter sunk compared to the outer surface 15 of the lamination glass sheet 14, with a depth corresponding to the lamination glass sheet thickness and possibly also the lamination layer thickness (as illustrated in the present embodiment). The lamination glass sheet 14 of reduced size may help to reduce the thickness of the frame compared to if the frame should extend over the entire thickness of all glass sheets 2*a*, 2*b*, 15 and the gap 11 and lamination layer 16.

As can be seen, a gasket such as a rubber gasket, a silicone sealing or the like 19 may be placed between the lamination glass sheet and the frame, in the present example the glazing member 23. The gasket 50*a* may thus either be maintained to improve water and/or air tightness, or be omitted if the gasket 19 is considered sufficient.

Figure 25:
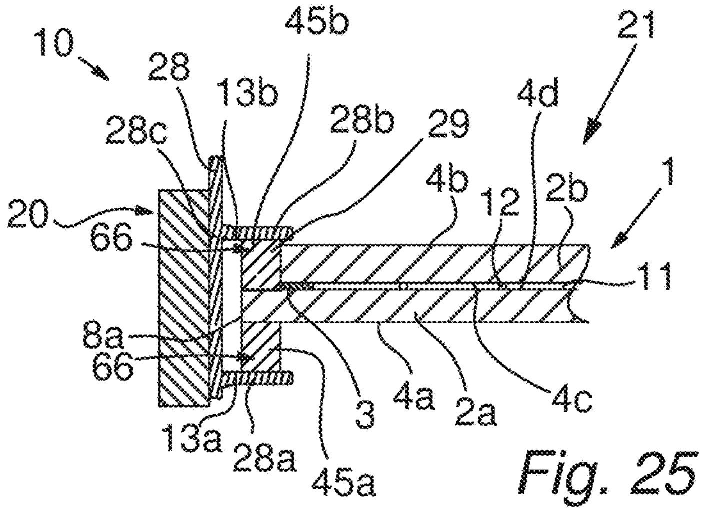
FIG. 25: Illustrates a holding solution where a VIG unit is held at one glass sheet according to embodiments of the present disclosure.

FIG. 25, illustrates schematically a cross sectional view of the VIG unit frame assembly 10 according to embodiments of the present disclosure. The fixation arrangements 45*a*, 45*b* holds the VIG unit 1 at one glass sheet 2*a* of the VIG unit between the holding members 28*a*, 28*b* substantially in the same way as disclosed in relation to various embodiments disclosed above.

However, the glass sheet 4*a* is larger than the glass sheet 4*b*, hence providing an exposed major surface 4*d* of the glass sheet 2*a* which also faces the evacuated gap 11 at the other side of the sealing 3. Accordingly, the fixation arrangements 45*a*, 45*b* are connected to the VIG unit 1 at the opposite surfaces 4*a*, 4*d* of the glass sheet 4*a*, 4*b*, but still so that the VIG unit edge 8*a* may deflect thermally as disclosed previously. Even though gasket arrangements 40, 50*a*, 50*b*, 61, 60*a*, 60*b* are not disclosed in FIG. 25, these may naturally also be provided as e.g. previously disclosed in relation to various embodiments of the present disclosure.

Figure 24:
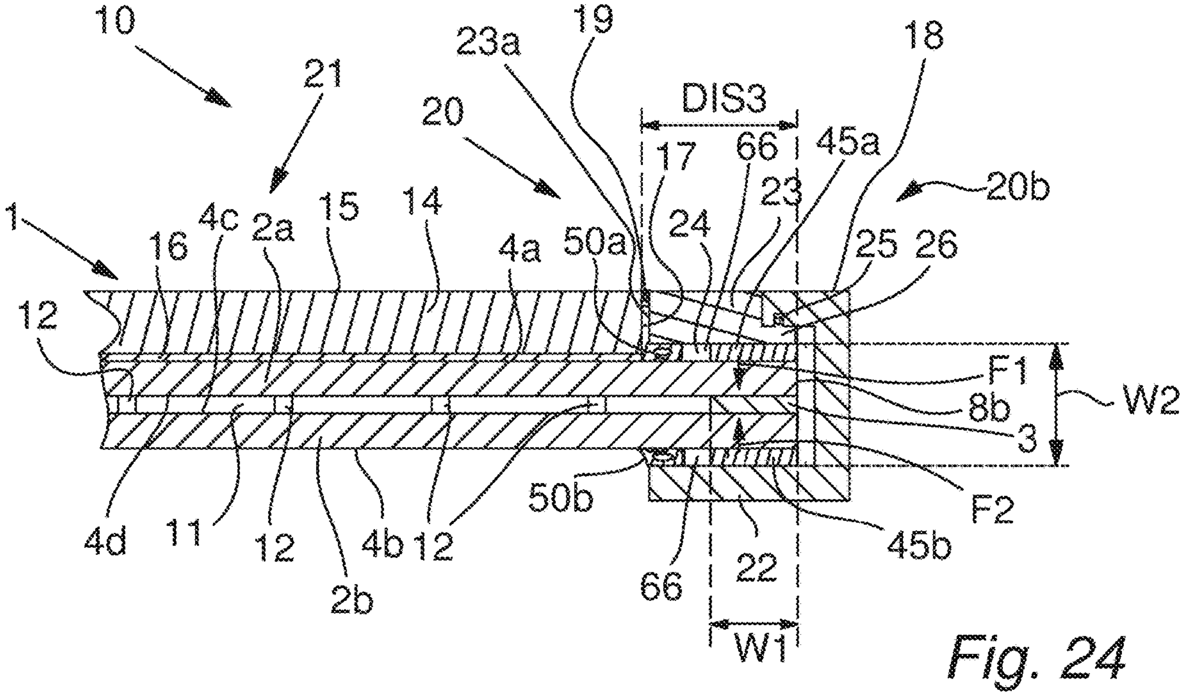

It is naturally to be understood that an embodiment as disclosed in FIG. 24 may also be used for an un-laminated VIG unit as disclosed in FIG. 25, in further embodiments of the present disclosure, so that the frame surface 23 a facing the frame opening 21 extends to face the end edge of the VIG unit 1 glass sheet 2*b* which is not held by the suspension assembly. The VIG glass sheet 2*b* of reduced size may thus help to reduce the thickness of the frame compared to if the frame 20 should extend over the entire thickness of all glass sheets 2*a*, 2*b* and the gap 11.

Figure 26:
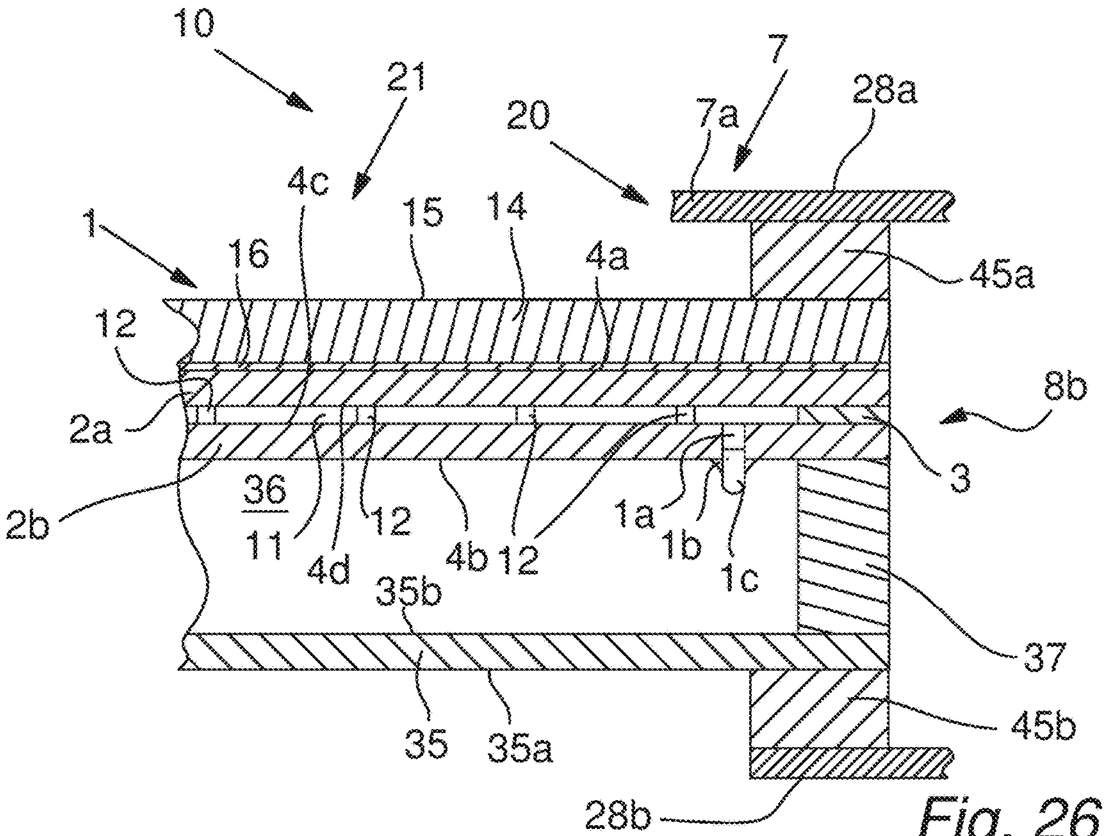
FIGS. 26-27: Illustrates a frame assembly comprising a hybrid type VIG unit according to embodiments of the present disclosure.

FIG. 26 illustrates an embodiment of the present disclosure where the VIG unit 1 is a so-to-say hybrid VIG unit comprising three glass sheets 2*a*, 2*b*, 35. This VIG unit 1 comprises glass sheets 2*a*, 2*b* paired to provide an evacuated gap 11 between surfaces 4*c*, 4*d*, and the gap 11 comprising distributed support structures between these glass sheets 2*a*, 2*b* as explained above in relation to e.g. FIG. 2. The hybrid VIG unit 1 moreover comprises a further glass sheet 35 providing a further gap 36 between the major surface 4*b* of the glass sheet 2*b* facing away from the evacuated gap 11, and this gap 36 is sealed by means of a gas-space edge seal 37. The VIG glass sheets 35, and 2*b* respectively thus forms a gas IG (Insulated glass) unit where a gas such as Argon or any other suitable gas may be provide in the space 36 for insulating properties to slow the transfer of heat through the VIG unit.

As can be seen, an evacuation hole 1*a* in glass sheet 2*b* is sealed by a sealing system 1*b*, 1*c* in the form of a sealed evacuation port such as a tube 1*e*, and a sealing material 1*b* such as solder glass or metal solder for sealing the connection between tube 1*e* and glass sheet 2*b*. The tube 1*e* has been used to evacuate the gap 11. This system 1*b*, 1*c* may in embodiments of the present disclosure extend into the space 36, and is hence protected in the space.

As can be seen from FIG. 26, a lamination glass sheet 15 may in embodiments of the present disclosure be laminated 16 to the glass sheet 2*a* of the VIG unit in embodiments of the present disclosure, see e.g. FIGS. 22-24 and description above thereto.

The fixation arrangements 45*a*, 45*b* holds the VIG unit 1 between the holding members 28*a*, 28*b* at the outer surface 15 of the lamination glass sheet 14 and the outer surface 35*a* of the glass sheet providing an inner major surface 35*b* to the gas-filled space 36. In further embodiments of the present disclosure, a solution where e.g. the glass sheet 35 or lamination glass sheet 14 is smaller in width and/or height than the VIG unit glass sheets 2*a*, 2*b* may be utilized, e.g. as described above.

Generally, a coating, for example low-e coating (not illustrated), may in embodiments of the present disclosure be placed at one or more of surfaces 4*c*, 4*d*, 4*b* and/or 36*b*.

It is noted that even though parts of the frame 20 have been omitted from FIGS. 26 (and 27) for simplicity, a frame solution as described in relation to any of the previous figures may be used in one or more aspects of the present disclosure.

Figure 27:
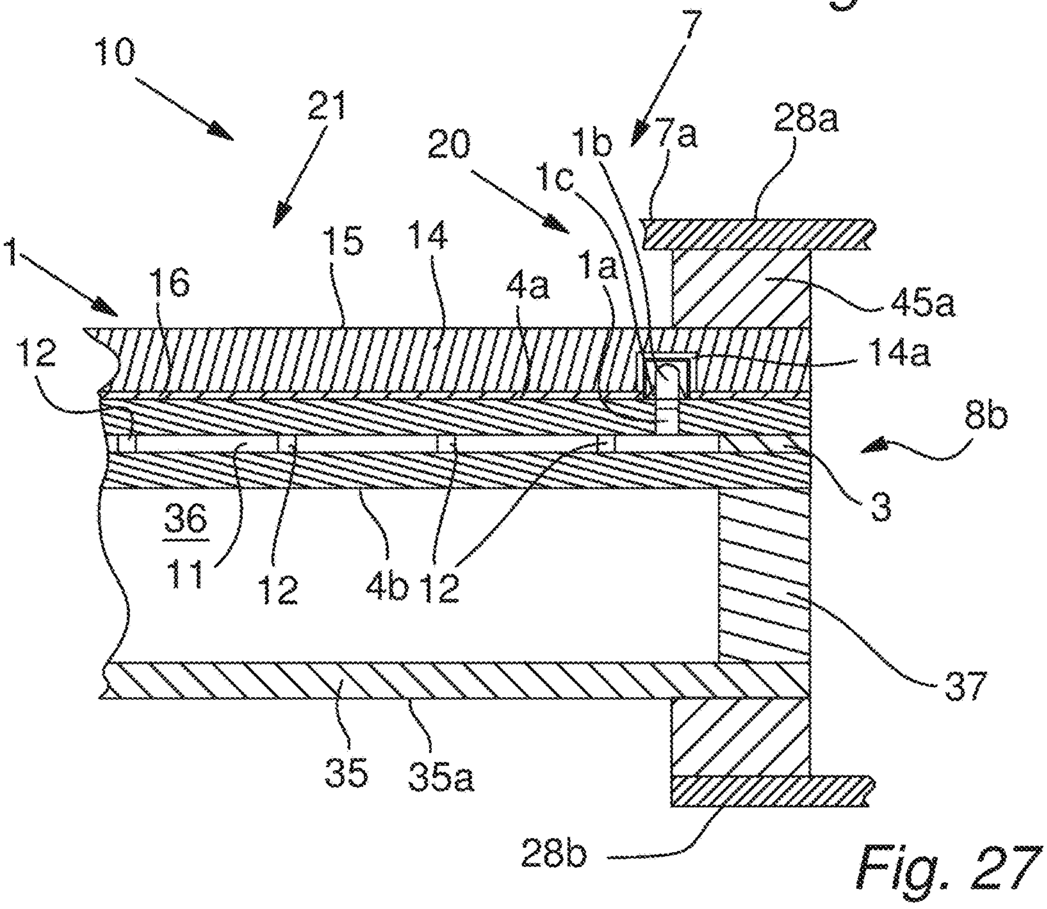

FIG. 27 illustrates an embodiment of the present disclosure where the sealing system 1*b*, 1*c* extend into a hole/recess 14*a* in the lamination glass sheet, and is hence protected by the lamination glass sheet 14. This hole in the lamination glass sheet may be a through hole or a blind hole as illustrated. This may be provided in a Hybrid VIG solution as described above and illustrated in FIG. 26, or a laminated VIG unit solution such as described previously.

Figure 28:
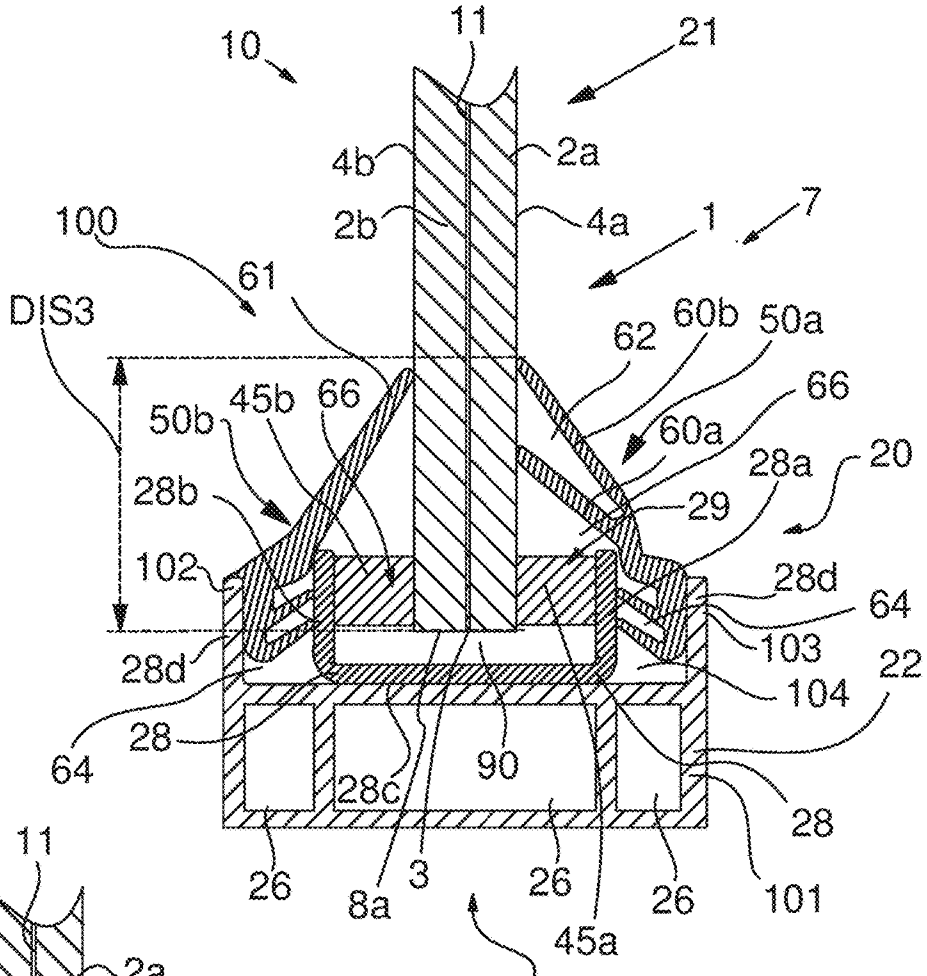
FIGS. 28-29: Illustrates retro fitting solutions according to embodiments of the present disclosure.

FIG. 28 illustrates schematically a cross sectional view of a retro-fitting solution 100 according to embodiments of the present disclosure for retrofitting a vacuum insulated glass unit 1 to a frame 101 originally designed for gas insulated glass panes of larger thickness than the vacuum insulated glass unit. The frame 101 may either be a frame provided at a frame part manufacturing site, or may be an existing frame where the gas filled and thicker glass pane is replaced.

The retro fitting solution 100 comprises resilient, elongated tightening seals or gasket arrangements 50*a*, 50*b*, 60*a*, 60*b*, 61 as described in relation to one or more of the embodiments described in relation to one or more of the figures above.

The retro fitting solution 100 moreover comprises fixation arrangements 45*a*, 45*b* placed between or configured to be placed between holding members 28*a*, 28*b* and an outer VIG unit surface as e.g. previously disclosed.

In the present example of FIG. 28, the gasket parts/lips 60, 61*a*, 61*b* are configured to deflect to follow a deflection of the vacuum insulated glass unit edge when it thermally deflect and describes the bending/deflection curve as described above, to provide a substantially watertight and/or airtight tightening of a space 66 between the one or more frame profiles 28*a*, 28*b* and the outer surfaces 4*a*, 4*b* of the vacuum insulated glass unit 1 when installed at the frame 101.

The frame 101 comprises a recess 104 provided between two walls 102, 103 of the frame 101.

A profile member 28 of the retro-fitting system 100 provides an U-shape between the holding members 28*a*, 28*b*, and is placed in this recess/slit 104 and is fixated to the frame 101 for example by means of mechanical fasteners such as screws, fixation clips, a snap connection or the like, by means of an adhesive or by means of a wedging force (not illustrated in FIG. 28).

The edge 8*a* of the VIG unit 1 extends into the recess 29 provided by the U-shape of the profile 28 of the retro fitting system 100. The fixation arrangements 45*a*, 45*b* as previously described in relation to various embodiments of the present disclosure is/are placed in the recess 29 so as to fixate and suspend the vacuum insulated glass unit 2 between the holding members 28*a*, 28*b*.

Gaskets 50*a*, 50*b* are placed between the walls 102, 103 of the frame 101 and the elongated profile members 28*a*, 28*b* of the profile 28, and comprises resilient elongated lips/flaps 60*a*, 60*b*, 61 extending to the VIG unit surfaces 4*a*, 4*b*. The lip 61 may be configured to provide a water tightening so as to reduce or prevent e.g. rain water from entering the mentioned recesses 28 in the profile 28 attached to the existing frame 101. The lips 60*a*, 60*b* may help to provide an air tightening.

In FIG. 28, the profile walls 102, 103 of the frame 101 are an integrated part of a frame profile but one or more of the walls 102, 103 may also be separate members, for example provided by means of a glazing member and base member as e.g. described in relation to FIGS. 12-13.

As can be seen, the profile 28 provides three parallel recesses in the existing frame 101 after it has been installed, i.e. the recesses 64 between the wall 102, 103 of the exiting frame and the walls 28*a*, 28*b* of the profile 28, and the recess 29 provided between the walls 28*a*-28*b*. These recesses extend in the longitudinal direction of the profiles 28, 101 and thus also in the longitudinal direction of the VIG 1 edge 8*a*. The recesses 64 are in the present example used for attachment of gasket arrangements 50*a*, 50*b*, but one or both of the recesses 64 may alternatively in further aspects of the present disclosure also be used for attachment of a glazing profile 23, e.g. to provide a glazing profile solution as disclosed in e.g. one or more of FIGS. 12-13 at one or both sides of the VIG unit.

It is understood that the fixation system 45*a*, 45*b* and the elongated profiles 28 in embodiments of the present disclosure may be pre-mounted/pre-installed at the vacuum insulated glass unit at e.g. a manufacturing factory.

In one or more other embodiments of the present disclosure (not illustrated), elongated profiles 28 which is/are attached to the VIG unit may be profiles arranged to cover just one major surface of the VIG unit. It may hence be a straight/flat profile 28, a rectangular profile and/or it may be a profile having walls describing an L shape when seen through a cross section of the elongated profile of the VIG unit. This profile 28 may provide that only one major surface of the VIG unit is covered by and attached to a wall of the elongated profile. This may e.g. be provided by means of an adhesive such as a structural adhesive, for example comprising an adhesive comprising a silicone adhesive, comprising a silane-terminated polyurethane (SPUR) adhesive or an adhesive comprising a Modified-Silyl Polymer (SMP) adhesive. This L-shaped profile may also in further aspects be arranged so that one of the walls providing the L-shape extends over and along a "narrow" edge surface of the VIG unit which in FIG. 28 faces the space 90. The L-shape may help to increase the rigidity and strength of the elongated profile and/or help to provide screening in order to improve water tightness and/or protect the VIG unit edge.

It is generally understood that the elongated profile(s) and/or the fixation system attaching the VIG unit to the profile 28, in embodiments of the present disclosure may be configured so as to allow the edges of the vacuum insulated glass unit to thermally deflect in a deflection direction due to a temperature difference DT=T1−T2 between the two glass sheets (2*a*, 2*b*) of the VIG unit. The elongated profile(s) and/or the fixation system may moreover be configured to provide a restriction of the thermal deflection (DIS4) of the edge (edge 8*a* is illustrated in FIG. 28), so as to reduce the magnitude of the thermal deflection compared to an unrestricted thermal deflection of the edges (8*a*-8*d*) at said temperature difference (DT=T1−T2). Hence, the profile 28 and/or the fixation system fixating the VIG unit 1 to the profiles (28) pre-mounted on the VIG unit may allow the VIG unit edges to thermally deflect and possibly also allow the VIG unit edges to describe an edge deflection curve due to a thermal deflection. Additionally, the profile 28 and/or the fixation system fixating the VIG unit 1 to the profile 28 may be configured to provide the function of the restriction of the thermal deflection (DIS4) of the VIG unit edge(s) as e.g. described above and/or below.

Figure 29:
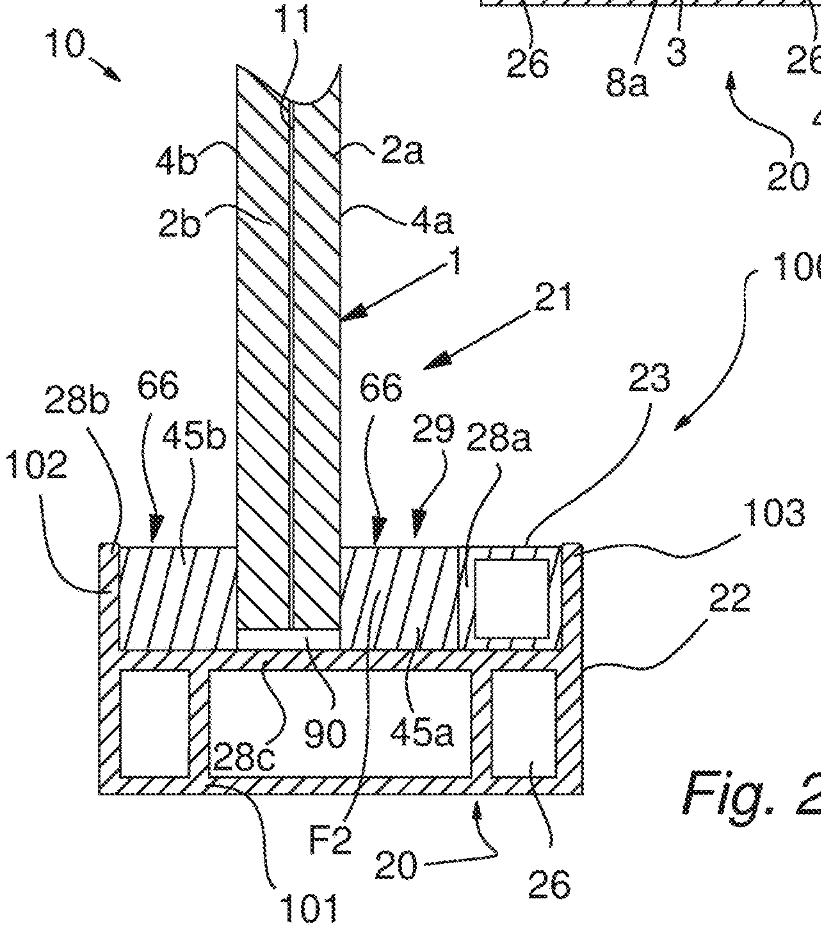

FIG. 29, illustrates a further embodiment of a retro fitting frame solution 100 according to embodiments of the present disclosure. Here the fixation arrangement(s) 45*a*, 45*b* is/are provided in the space 66 between a wall 102 of the frame profile 101 and the VIG unit surface 4*b*. At the other side, a glazing member 23 in the form of an elongated spacer (e.g. hollow to obtain improved heat insulation or alternatively a solid glazing member) is placed between the wall 103 of the frame profile 101 and the other suspension element(s) 45*b*. Hence, the space 66 is provided between the member 43 and the VIG unit surface 4*a*, and the other suspension element(s) 45*b* is/are provided in this space 66. Accordingly, in FIG. 18*a*, one of the walls 102 of the frame 101 provides a holding member 28*b*, whereas the elongated profile 23 provides the other holding member 28*a*. In still further embodiments (not illustrated) the fixation arrangement(s) 45*a* may extend between wall 102 of the frame and the VIG unit surface 4*a*.

It is understood that the fixation arrangement(s) 45*a*, 45*b* may either provide a sufficient tightening of the recess 29, or gaskets such as e.g. gaskets 50*a*, 50*b* described above or below may be provided (not illustrated in FIG. 29).

It is generally to be understood that in further embodiments of the present disclosure, a gasket 50*a* or 50*b* to be deflected as e.g. illustrated in one or more of FIGS. 8, 9, 12, 13, 22, 23 and/or 28 may be replaced by a suitable glazing member/profile 23 as described in relation to various further embodiments of the present disclosure. The glazing member 23 may thus be fixed to the frame in the recess 64, and a gasket to be deflected or compressed or expand (see e.g. 50*a*, 50*b* described above) may in further embodiments of the present disclosure be placed between the glazing member 23 and the VIG unit surface.

Figure 30:
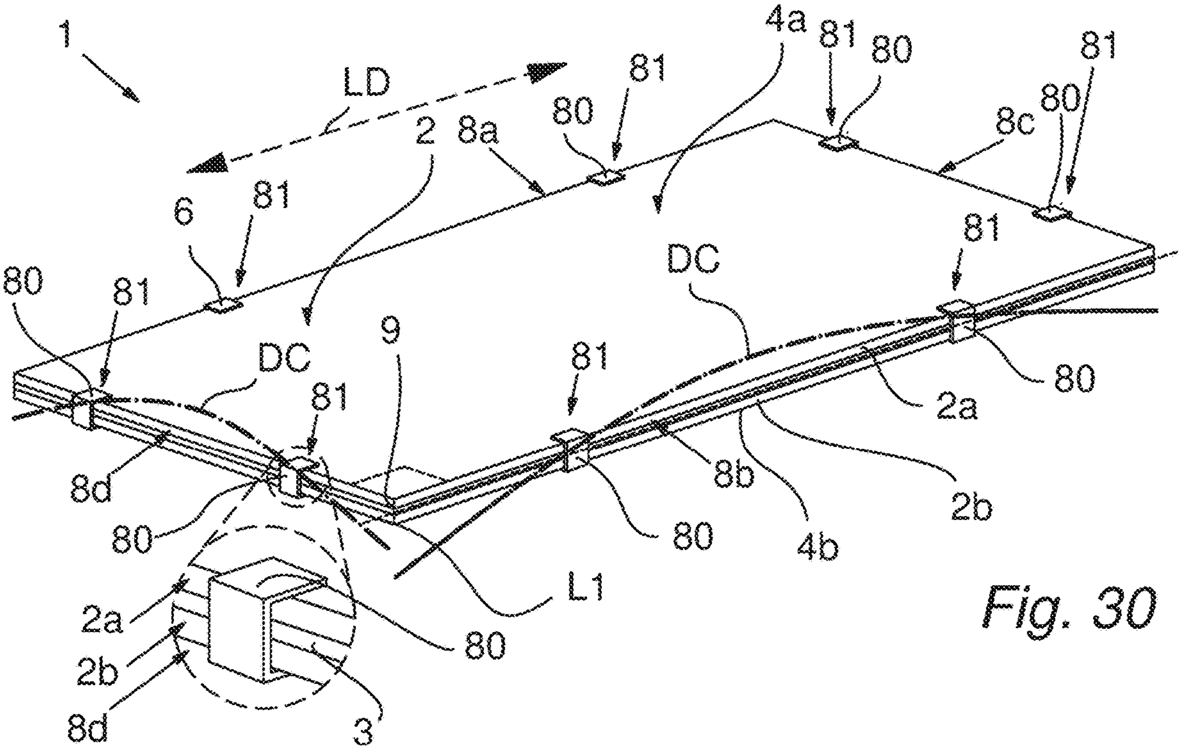
FIGS. 30-32: Illustrates VIG unit frame assemblies according to further embodiments of the present disclosure.

FIG. 30 illustrates schematically and in perspective a vacuum insulated glass (VIG) unit 1, where a plurality of fixation arrangements 80 are placed at discrete pane fixation points 81 distributed along the edges 8*a*-8*d* of the VIG unit 1.

The edges 8*a*-8*d* extends between the outer major surfaces 4*a*, 4*b* of the VIG unit, and between the corners 9 where the respective edge terminates. The edges comprises the end edges of the glass sheets 2*a*, 2*b* defining the height (between short edges 8*c* and 8*d*) and width (between long edges 8*a* and 8*b*) of the VIG unit respectively.

When the VIG unit is subjected to a temperature difference at the glass sheets 2*a*, 2*b*, this causes the VIG unit edges to thermally deflect as e.g. described above in relation to FIGS. 3-7. This is indicated in FIG. 30 by means of dash/dotted edge "deflection curves".

As can be seen in FIG. 30, the fixation arrangements 6 are placed at discrete pane fixation points 7 distributed along the narrow edges 8*a*-8*d* of the vacuum insulated glass unit, and these points 7 are placed where the dash/dotted "deflection curves" BC1, BC2 "crosses" the respective edge 8*a*-8*d* of the VIG unit. The VIG unit edge will accordingly flex/deflect to both sides when compared to a straight, common line LI extending through the two pane fixation points 81 of the respective edge 8*a*-8*d* when the VIG unit thermally deflects. The Thermal deflection of the edge is substantially at its thus minimum at the discreet fixation points 81 does to the fixation by means of the fixation arrangements 80.

The pane fixation points 81 of e.g. the edge 8*b* are placed so that the corners 9 of the VIG unit where the edge 8*b* terminates moves in a first direction D1 relative to the envisaged straight, common line LI extending through the pane fixation points 7 of the edge 8*b* when the VIG unit thermally deflect, and relative to a frame opening plane (P2—not illustrated in FIG. 30 see e.g. one or more of FIGS. 3-7). On the other hand, a centre portion 5 of the edge 8*b*, is configured so move in the opposite direction D2 than the first direction D1, relative to the straight, common line LI and the frame opening plane when the VIG unit edge thermally deflects.

In embodiments of the present disclosure, e.g. only the long edges 8*a*, 8*b* may be provided with fixation arrangement 80 at the discrete fixation points 81, whereas the shorter edges 8*c*, 8*d* may not be fixed at discrete fixation points describing the straight common line at the edge, e.g. since the longer edges may be experiencing the largest edge bending curves due to thermal deflection. Hence, four fixation arrangements 80 such as clamps as previously described in relation to FIG. 30 or 31*a* and not more, may in various embodiments of the present disclosure, be used for the VIG unit 1 to control the positioning of the VIG unit in the frame 20.

In further embodiments of the present disclosure, two further fixation points 81 may be selected, one at each shorter edge 8*c*, 8*d*. These further fixation points 81 may be arranged in a diagonal configuration to be closer to each their long edge 8*a*, 8*b* than to the other long edge, or may alternatively be substantially opposite and closer to the same long edge 8*a*, 8*b* than the other long edge. Hence, six fixation arrangements 80 arranged at discrete fixation points 81 as e.g. illustrated in FIG. 30, and not more, may be used for the VIG unit 1. In embodiments of the present disclosure, no more than 8, such as no more than 6, e.g. no more than 4 fixation arrangements such as clamps may be used.

It is generally to be understood that e.g. fixation arrangements 45*a*, 45*b* as e.g. previously described may be provided in addition to the fixation device 80 provided at the discrete fixation points 81, e.g. to provide a resistance towards the thermal deflection as e.g. described previously, to provide a further control of the orientation of the VIG unit in the frame 20 and/or the like.

Figure 31B:
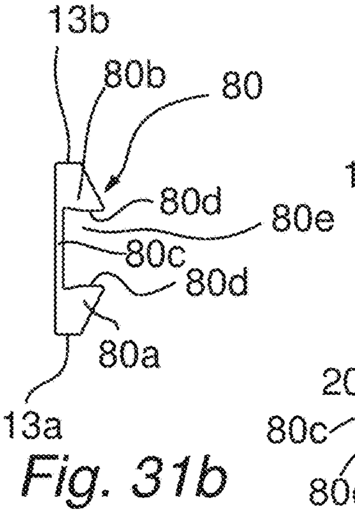
Figure 31A:
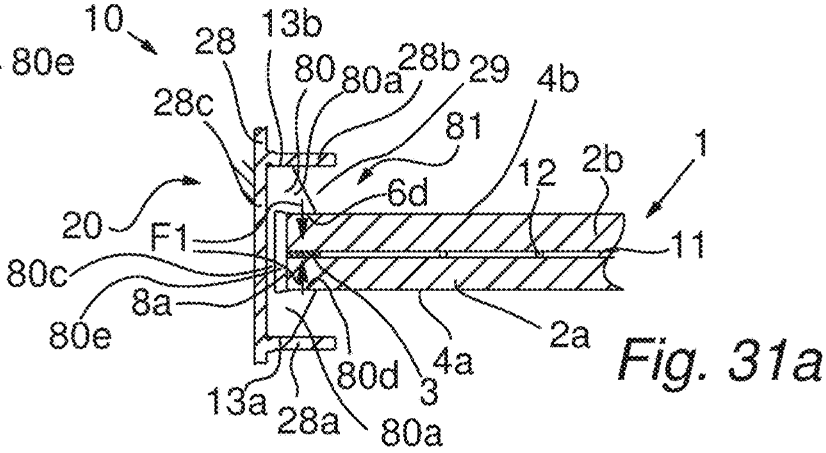

In FIG. 31*a*, the fixation arrangement 80 at a discrete fixation point 81 is arranged in a space/recess 29 between two support members 28*a*, 28*b*, e.g. legs, of an elongated frame profile member 28 of the frame assembly 20.

FIG. 31*b* illustrates the fixation arrangement 80, used in FIG. 31*a* which is a fixation device 80 in the form of a clamp.

The fixation device 80 comprises the holding parts 80*a*, 80*b* which are interconnected by an interconnection member 80*c*, and the holding parts provide a recess 80*e* configured to receive the VIG unit edge 8*a*. Connection surfaces 80*d* of the holding parts 80*a*, 80*b* faces the recess 80*e* provided between the holding parts, and are configured to connect to the VIG unit. In one or more embodiments of the present disclosure, a resilient material such as a rubber material, an adhesive layer and/or the like (not illustrated) may be placed at one or both surfaces 80*d* between the surfaces 80*d* and the VIG unit surfaces 4*a*, 4*b*.

As can be seen in FIG. 31*a*, the fixation device 80 is placed in a recess/space 29 between two fixation device support members 28*a*, 28*b* of a frame profile member 28 as e.g. previously disclosed above, at the fixation point 81.

The holding members 28*a*, 28*b* fixates the fixation device 80, and are connected by a wall part 28*c* of the frame profile member 28 arranged opposite to the narrow edge 8*a* of the VIG unit 1, and the interconnection member 80*c* is placed between the VIG unit 1 edge 8*a* and the wall part 28*c*.

Accordingly, outer surfaces 13 a, 13*b* of the fixation device 80 support at the surfaces of the fixation device support members 28*a*, 28*b* facing the space/recess 29, and the holding members 28*a*, 28*b* helps to provide a clamping force to the VIG unit to keep the VIG unit in a fixed position at the point 81. This may e.g. be provided due to the resiliency in the material and/or construction of the holding members 28*a*, 28*b* and/or the wall 28*c*.

When an outer force such as a wind gust, a foreign objects or the like strikes the VIG unit 1, the fixation arrangements 80 at the fixation points 81 transfers these forces to the frame through the frame profile member 28, such as by means of the holding members 28*a*, 28*b* and/or the wall member 28*c*.

It is generally understood that the fixation device 80 in embodiments of the present disclosure may be wedged between the holding members 28*a*, 28*b*, and/or it may be glued to one or both members 28*a*, 28*b* and/or to the wall 28*c*.

The fixation device 30 may in embodiments of the present disclosure, as illustrated, provide a clamping pressure to the edge opposite to the edge seal 3 of the VIG unit in the embodiments illustrated in FIGS. 31*a*-31*b*. This is provided at a location so that the VIG unit edge seal 3 is placed between the connection surfaces 80*d* of the fixation device 80.

However, it is generally understood that in further embodiments of the present disclosure, a part or the whole of the fixation device's 80 connection surfaces 80*d* may be arranged to be connected to a part of the surfaces 4*a*, 4*b* of the VIG unit, where between the VIG unit gap 11 is placed.

The clamping force provided by the fixation device 80 may e.g. be provided by an inherent resiliency of the clamping device, and/or it may be transferred from a holding member 28*a*, 28*b* of the frame arrangement 20, through the clamping device 80 and to the vacuum insulated glass unit 1.

As can be seen in FIG. 31*a*, the holding members 28*a*, 28*b* may be legs 28*a*, 28*b* which extend from the member 28 to provide a C-profile portion.

It is generally understood that the clamping arrangements 80 may be made from any suitable material or combination of materials. For example, the fixation devices 80 may be made from a metal such as steel, e.g. stainless steel and/or spring steel, but any other suitable material or materials such as a rubber material, a plastic material, a composite material such as glass fibre or carbon fibre and/or the like may be used for the clamping devices 80, e.g. since these materials may have a lower thermal conductivity, which may help to reduce the risk or degree of cold bridges. In still further embodiments of the present disclosure, the discrete fixation arrangements 80 may be made from or comprise a glue, a soldering material and/or the like.

In one or more embodiments of the present disclosure, the fixation device 80 may be realisably connected to the frame assembly and/or the vacuum insulated glass unit. This may e.g. allow a replacement of the VIG unit 1 later on, or help to provide a retro-fitting solution.

FIG. 32 illustrates schematically a VIG unit frame assembly 10 according to embodiments of the present disclosure, seen with a view perpendicular to and onto the frame opening plane P2 provided by the frame 20.

As can be seen in FIG. 32, the frame arrangement/frame 20 may comprise substantially parallel top and bottom frame profile arrangements 20*c*, 20*d*, and substantially parallel side profile frame arrangements 20*a*, 20*b*. Two, two, three or all (as illustrated) of said top, bottom and/or side profile frame arrangements 20*a*-20*d* at least partly, such as fully, encloses the VIG edges 8*a*-8*d*, and also the fixation arrangements 80 arranged at the discrete fixation points as mentioned above in connection to the description of FIGS. 30-31.

Generally, in embodiments of the present disclosure, the frame 29 may be provided from four elongated profiles. The frame 20 may be provided from 2 half shells (interior and exterior side) sandwiched together. The frame may also be moulded as one unit.

The VIG unit frame assembly 10 comprises a resilient gasket arrangement 40 as for example described in relation to FIGS. 10-11 (indicated by dash-dotted line FIG. 32). This gasket 40 arrangement may either be a C-shaped gasket or individual gasket strips. The gasket 40 may in embodiments of the present disclosure be a rubber gasket, e.g. an ethylene propylene diene monomer rubber (EDPM) gasket, it may be a foam gasket, a neoprene or silicone gasket, it may be a TPE (Thermoplastic elastomers) gasket and/or the like provided between frame members 22, 23, 28*a*, 28*b* of the frame as e.g. previously described, and the outer surfaces of the VIG unit glass sheets 2*a*, 2*b* placed in the frame 20.

The resilient gasket 40 comprises cut outs 41 at the fixation points 81 where fixation surface parts of the outer major surfaces 4*a*, 4*b* (or 15 or 35*a*) of the VIG unit are exposed to allow the fixation arrangements 6 to fixate the VIG unit at these points, relative to parts of the frame 20.

The resilient gasket 40 may in embodiments of the present disclosure, beyond a tightening property so that water from the outer VIG surface placed in the frame is prevented from flowing from the frame opening 21 in between the VIG unit and the frame 20, also provide heat insulation between the VIG unit and the elongated frame profile arrangements 20*a*-20*d*.

Further sealing or gaskets 50*a*, 50*b* such as a resilient rubber, plastic and/or foam gasket in embodiments of the present disclosure arranged to seal a frame recess 24 between the frame 20 and the VIG surfaces 4*a*, 4*b* to prevent or reduce water from the VIG surfaces moving into the frame recess 24. These further sealings or gaskets 50*a*, 50*b* encloses the frame opening 21 and are arranged at least partly between a frame member and the outer glass sheet surfaces 4*a*, 4*b* of the VIG unit 1, see e.g. previous description.

It is generally understood that the further sealings/gaskets 50*a*, 50*b* may in embodiments of the present disclosure comprise a rubber gasket, e.g. an ethylene propylene diene monomer rubber (EDPM) gasket, it may be a foam gasket, a neoprene or silicone gasket, it may be a TPE (Thermoplastic elastomers) gasket and/or the like. It/they 50*a*. 50*b* may comprise internal chambers which are reduced in cross sectional size/area as the further sealings/gasket(s) 50*a*, 50*b* are compressed, and which increases in cross sectional size as the further sealing's/gaskets 50*a*, 50*b* is/are less compressed. This may help to provide a shape-memory effect for the gasket/seal 50*a*, 50*b*.

The further sealings/gaskets 50*a*, 50*b* and/or gasket 40 may either be of the hollow type where a space between gasket walls is reduced in size upon placement of the gasket and/or during a thermal deflection of the VIG unit. In other embodiments, the further sealings/gaskets 50*a*, 50*b* and/or gasket 40 may be substantially massive and comprise no extruded space.

In other embodiments of the present disclosure, the seals or gaskets 50*a*, 50*b* may be arranged so as to be deflected or compressed by the VIG unit and thus follow the VIG unit movement when it thermally deflects/bends as e.g. disclosed later on in the present disclosure.

The gasket 40 is also in embodiments of the present disclosure pre-compressed and is resilient so that it will either expand or be compressed in the longitudinal direction of the edge 8*b* in response to the thermal deflection of the VIG unit edge, and hence follow the movement of the VIG unit when it thermally deflects, so as to seal the recess.

The gasket 40 comprises parts that are placed between the frame and the VIG unit surfaces 4*a*, 4*b*, in the present example at both sides of the glass sheets.

The gasket 40 may in embodiments of the present disclosure be configured to provide a the previously described resistance towards thermal bending/deflection of the VIG unit 1 so that the VIG unit does not thermally deflect as much as if the gasket 40 was not present. For example at more extreme temperature differences between the VIG glass sheets 2*a*, 2*b* such as above 40° C. or above 60° C. so that the gasket 40 will prevent the VIG unit 1 from being subjected to the full thermal deflection compared to if the frame 20 and/or gasket has been removed, and can thus provide a full thermal deflection in response to the temperature difference between the glass sheets 2*a*, 2*b*.

The gasket 40 may thus also be considered a part of the system for fixating the VIG unit in the frame 20, and may hence provide the fixation arrangements 45*a*, 45*b* as previously described.

One or more members of the frame 20, such as the previously described holding members 28*a*, 28*b*, 22, 23, may in embodiments of the present disclosure help to provide a counter force when the VIG unit thermally deflects, and thus help to provide a restriction towards the thermal deflection of the VIG unit. This may e.g. be provided within one or more temperature ranges of the temperature difference DT, e.g. at the more extreme temperature differences, or alternatively over the whole thermal deflection of the VIG unit.

In one or more embodiments of the present disclosure, the gaskets 40 and/or further gasket(s) 50*a*, 50*b* material has a shore A value between 30 and 130. For example, In one or more embodiments of the present disclosure, The further gaskets 50*a*, 50*b* (if used) and/or the gasket 40 may have a Shore A value between 30 and 60 or between 33 and 95.

In one or more embodiments, the gasket 40 may at least at some areas have a shore A value above the shore A value of the further gasket(s) 50*a*, 50*b*.

It is understood that the gasket 40 in further embodiments of the present disclosure may be replaced with discretely arranged, resilient fixation blocks as e.g. described previously. The material and/or properties of these fixation block may in embodiments of the present disclosure be the same as the material and/or properties of the gasket 40 described above.

It is generally to be understood that in various embodiments of the present disclosure, one or more of the VIG unit's major surfaces 4*a*, 4*b*, 4*c*, 4*d*, 15 and/or 35*a*, 35*b* may be provided by one or more further layers or coatings providing advantages/features improving or providing optical properties (such as tinted/tinting effects, frosting effects, colouring effects and/or the like), mechanical protection advantages and/or advantages with regard to improving (lowering) the Ug-value of the VIG unit (e.g. by means of one or more low-e coatings).

Figure 33:
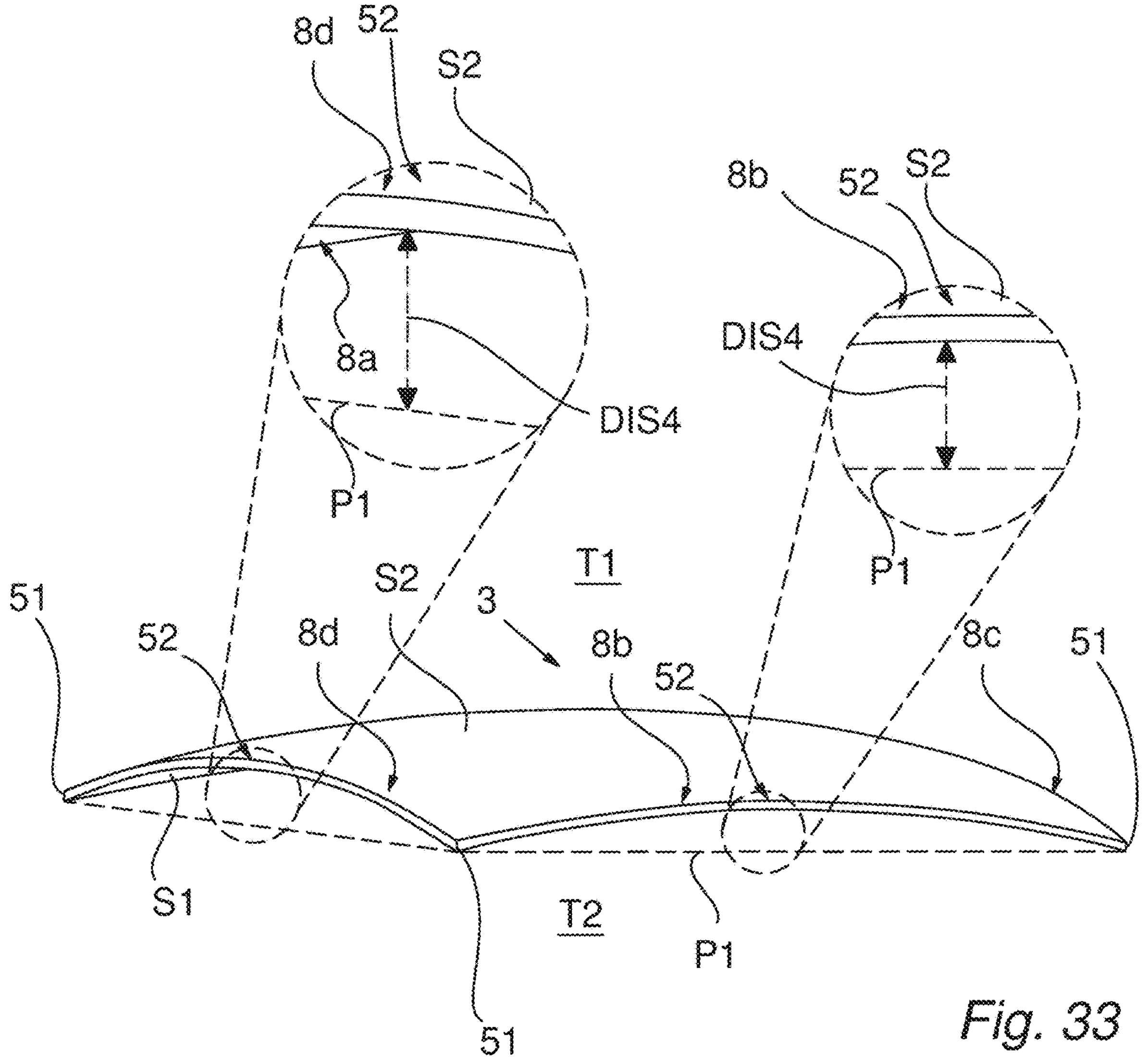
FIG. 33: illustrates a visualized computer simulation of a thermal deflection of a VIG unit.

FIG. 33 illustrates a visualized computer simulation of a "free" thermal deflection of a VIG unit 1 used for a frame as disclosed according to embodiments of the present disclosure, which has been provided by one of the present inventors. The VIG unit 1 simulated was based on a VIG unit model defined to have the following characteristics:

- The VIG unit is laminated and hence comprises a lamination glass and a lamination interlayer
- Length LI of shorter edges 8*d*, 8*c:* 114 cm
- Length of the longer edges: 8*a*, 8*b:* 140 cm
- Glass sheets 2*a*, 2*b* type: Thermally tempered glass sheets each having a thickness of 4 mm.
- Lamination glass: annealed float glass of a thickness of 4 mm
- Edge seal material: solder glass edge seal material
- The VIG is arranged with the surfaces SI, S2 horizontally and is thus simulated so that gravity acts on the VIG unit.
- Temperature difference between T1 and T2: about 60° C.
- The hotter side (S2) was set to be the lamination glass side and hence the lamination glass sheet provides the outer major surface S2 in FIG. 33.

For the computer simulation model, a temperature difference/gradient profile was established in accordance with temperatures measured across the hotter/heated side. This profile was based on temperature measurements provided during the test described below. This profile was used in the simulation model for the hotter side. The lamination interlayer was a PVB material.

Under these conditions, the simulation results defined that the distance DIS4 from the centre part 52 of the longer edge 8*b* would be 7.82 mm from the plane PI (DIS4).

Figure 34:
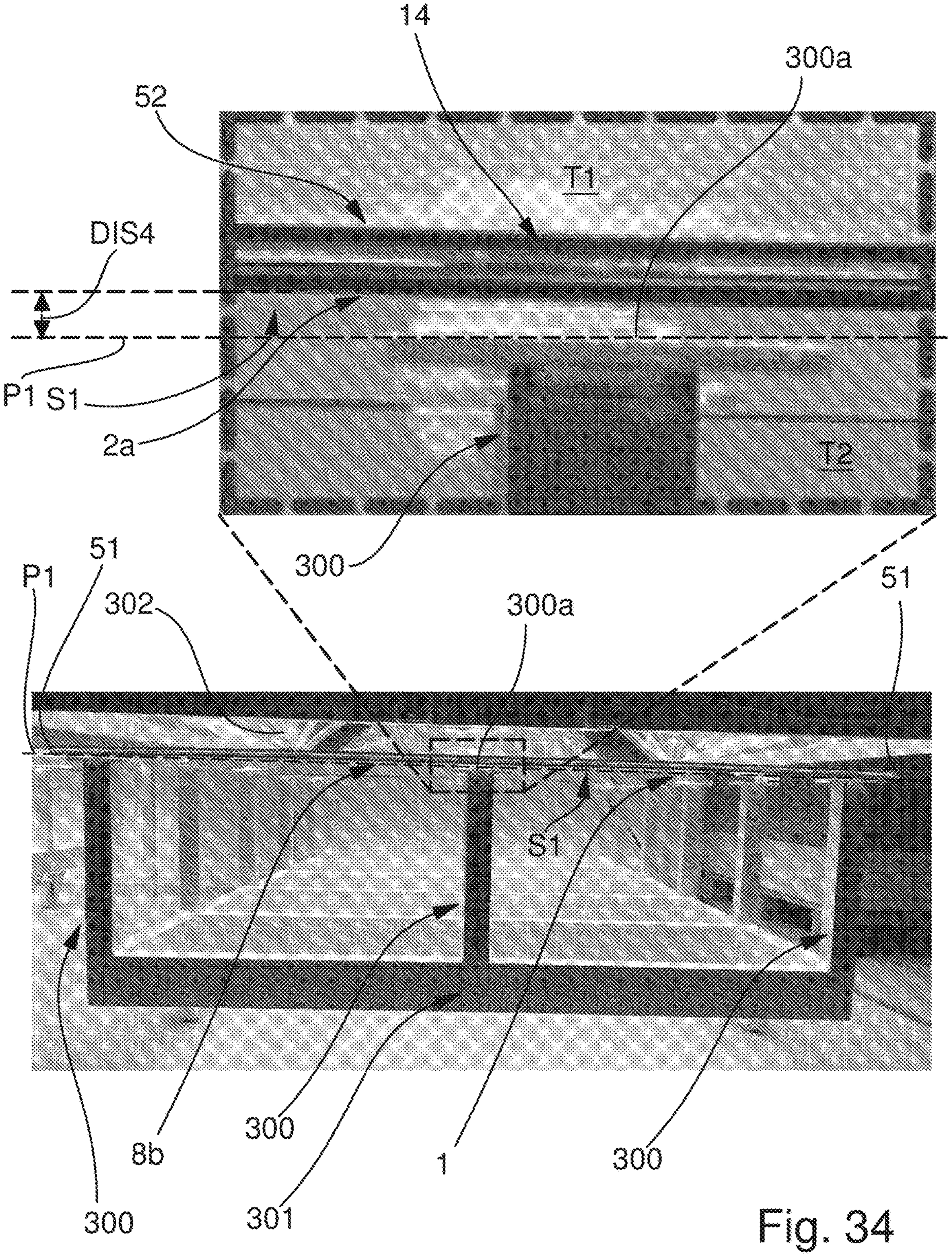
FIGS. 34-35**: illustrates a thermal deflection test of a laminated VIG unit.
Figure 35:
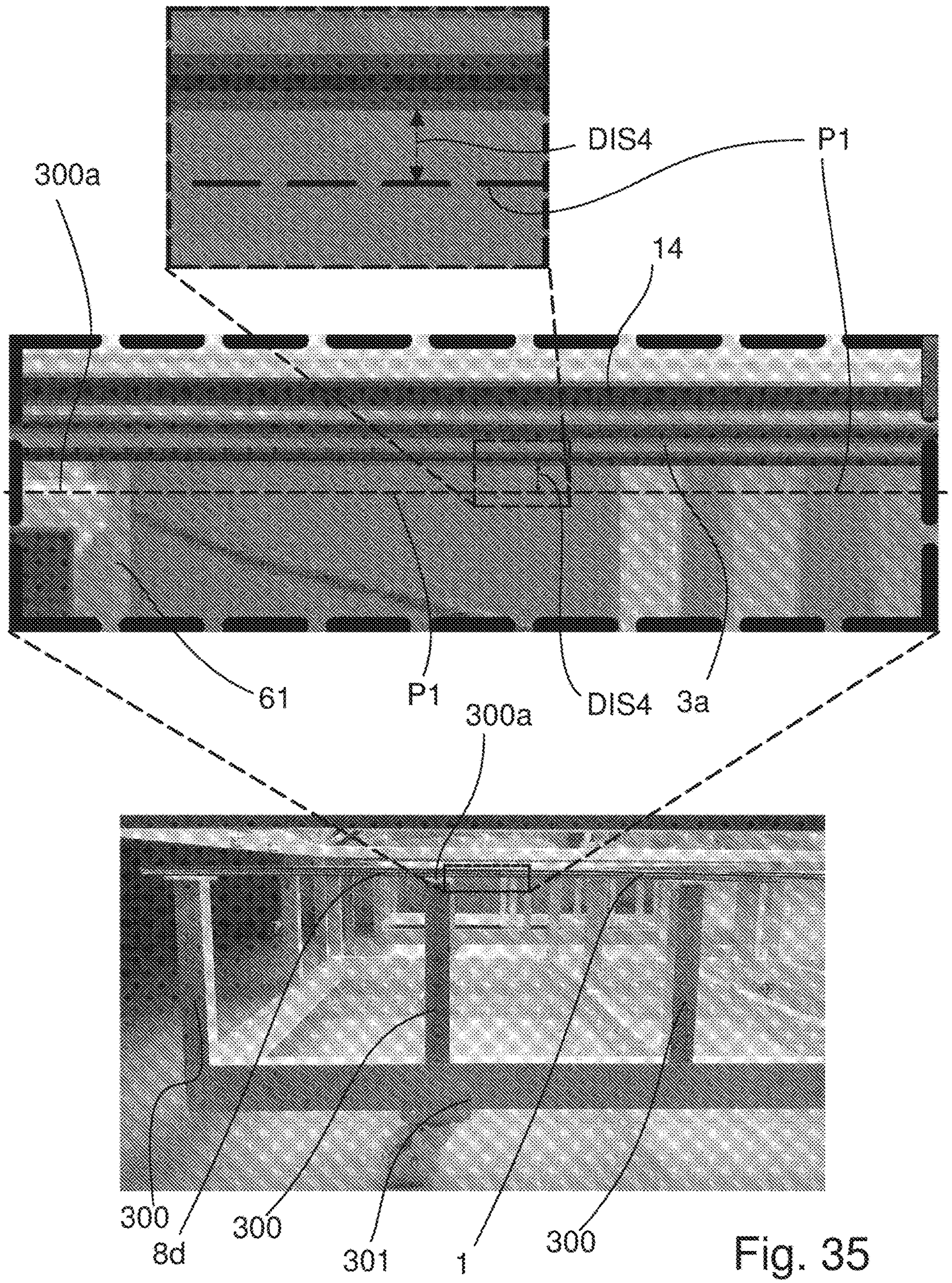

Moreover, under these conditions, the simulation results defined that the distance DIS4 from the centre part 52 of the shorter edge 8*d* would be 5.15 mm from the plane PL FIGS. 34 and 35 are images of a test of a thermal deflection of a laminated VIG unit 1 having substantially the parameters as defined above with regard to FIG. 33. The VIG unit 1 was placed horizontally to support on support surfaces 300*a* of a plurality of support rods 300 of a support frame 301. The VIG unit 1 supported initially, when the temperature difference AT=T1−T2 was substantially 0° C., on substantially all support surfaces of the frame 301 on which the VIG unit was arranged.

An infrared heat radiation arrangement 302 was arranged above the upper glass sheet, i.e. the lamination glass sheet, and covered the upper glass sheet to a bit beyond the side edge surfaces of the VIG unit 1. Then the heating arrangement 302 started to heat the upper glass sheet 14 of the VIG unit 3, so that the upper glass sheet reached a maximum temperature of approx. 100° C., and the lower glass was measured to have a temperature of approximately 35° C. It was expected and validated that the temperature of the heated glass facing the radiation heater varied over the surface due to cold bridges caused by among others the edge seal of the VIG unit. Hence, no completely uniform heating was obtained (as opposed to the simulation results), but the maximum temperature measured at the heated glass sheet was about 100° C., and for the majority of the heated surface, the temperature was determined to be above at least 85° C. and at many locations above 90° C.

The present inventors could after the heating by the infrared heating arrangement visually see and confirm a formation of an edge deflection curve DC between the VIG unit corners 51. This provided a maximum edge deflection DIS4 of the VIG unit due to the forced temperature difference AT=T1−T2, when compared to the temperature difference AT=T1−T2 of substantially 0° C. The distance DIS4 was determined by a first reference point defined by a support surface 300*a* (that was used as a reference for the plane PI), and the lower surface of the VIG unit 1, in a direction substantially perpendicular to the plane PI.

The maximum edge deflection DIS4 of the long edge 8*b* (FIG. 34) was measured to be approximately 7.4 mm, or more precisely 7.43 mm at the forced temperature difference, when compared to the temperature difference AT=T1−T2 of substantially 0° C.

FIG. 35 illustrates the edge deflection of the shorter edge 8*d* of the same VIG unit as tested in FIG. 34. Here, in a similar way, the shorter edge 8*d* described an edge deflection curve DC due to the forced heating and the temperature difference between T1 and T2. Additionally, the maximum edge deflection DIS4 of the shorter edge 8*d* was measured to be approximately 5.3 mm, or more precisely 5.33 mm, at the forced temperature difference, when compared to the temperature difference AT=T1−T2 of substantially 0° C.

Accordingly the maximum tested edge deflection DIS4 vs the simulated edge deflection resulted in the values of table 1 below.

TABLE 1

| | Simulated edge deflection DIS4 | Edge deflection test (FIGS. 34-35) DIS4 |
|---|---|---|
| Longer edge 8b | 7.82 mm | 7.43 mm |
| Shorter edge 8d | 5.15 mm | 5.33 mm |

The inventors concluded that the test illustrated in FIGS. 34-35 validated the computer simulations, and thus confirmed that the VIG unit computer simulations was sufficiently precise and reliable.

Additionally, the test approved that the edges of larger size laminated VIG units having rigid edge seals such as provided by fused edge seal material such as solder glass or a metal solder, when subjected to a larger temperature difference, will tend to provide/describe an edge deflection curve DC (see e.g. FIG. 5) that causes a substantial edge deflection DIS4 in an un-constricted situation where no "outer" mechanical forces constrains the edge deflection. This applies both in laminated VIG units and according to simulations also in VIG units which are not laminated.

It is understood that the vacuum insulated glass unit frame assembly disclosed above in relation to various embodiments of the present disclosure may be used for glazing. For example a building aperture cover such as a window, e.g. a vertical window, a horizontal window or a roof window arranged at an angle between 5° and 85°, or a door. In further embodiments of the present disclosure, the vacuum insulated glass unit frame assembly may be used in or as curtain walls, gates/doors or walls of heating arrangements such as heating ovens such as house hold ovens, and/or it may be used in or as walls or gate/doors cooling appliances such as freezers or refrigerators, such as refrigerators for storing food for human consumption at a temperature below 7° C. such as below 5° C., e.g. below 0° C.

While the present disclosure has been described in detail in connection with only a limited number of embodiments or aspects, it should be readily understood that the present disclosure is not limited to such disclosed embodiments or aspects. Rather, the present disclosure can be modified to incorporate any number of variations, alterations, substitutions or equivalent arrangements not heretofore described, but which are commensurate in scope with the present disclosure. Additionally, while various embodiments or aspects of the present disclosure have been described, it is to be understood that aspects of the present disclosure may include only some of the described embodiments or aspects or combinations of the various embodiments or aspects. Accordingly, the present disclosure is not to be seen as limited by the foregoing description.

The invention claimed is:

1. A vacuum insulated glass unit comprising at least two glass sheets separated by a gap between said glass sheets,
- wherein a plurality of support structures are distributed in said gap and wherein said gap is sealed and evacuated,
- wherein the vacuum insulated glass unit moreover comprises elongated profiles extending along and parallel to each their edge of the vacuum insulated glass unit,
- wherein a fixation system fixates the vacuum insulated glass unit to said elongated profiles,
- wherein the elongated profiles and/or the fixation system, is configured so as to allow edges of said vacuum insulated glass unit to thermally deflect in a deflection direction perpendicular to a vacuum insulated glass unit due to a temperature difference between the two glass sheets, and to provide a restriction of said thermal deflection of the edges, so as to reduce the magnitude of the thermal deflection compared to an unrestricted thermal deflection of the edges at said temperature difference, and
- wherein the largest edge deflection in said deflection direction of any of the edges of the vacuum insulated glass unit at a temperature difference between the two glass sheets of 65° C. as compared to the vacuum insulated glass unit at a temperature difference of 0° C. is at least 1 mm.

2. The vacuum insulated glass unit according to claim 1, wherein the elongated profiles comprises a recess defined between walls of the respective elongated profile, wherein the recess extends in the longitudinal direction of the elongated profile, and wherein an edge of the vacuum insulated glass unit extends into said recess of the respective profile, wherein the fixation system fixates the vacuum insulated glass unit in the recess of the respective profile.

3. The vacuum insulated glass unit according to claim 2, wherein said fixation system comprises a gasket arrangement, arranged in a space between outer surfaces of the vacuum insulated glass unit and the walls of the elongated profiles defining the recess, wherein said gasket arrangement is configured to be pre-compressed when the temperature difference between the glass sheets of the vacuum insulated glass unit enclosing the evacuated gap is 0° C., and wherein said gasket arrangement is configured to be further compressed or expand to allow a thermal deflection of the respective vacuum insulated glass unit edge.

4. The vacuum insulated glass unit according to claim 1, wherein the elongated profiles and/or the fixation system is configured to allow the vacuum insulated glass unit to describe edge deflection curves along the edges of the vacuum insulated glass unit due to a temperature difference between the glass sheets of the vacuum insulated glass unit.

5. The vacuum insulated glass unit according to claim 1, wherein said vacuum insulated glass unit is a rectangular vacuum insulated glass unit.

6. The vacuum insulated glass unit according to claim 1, wherein the length of the longer opposing edges is in the range of 500 to 3000 millimetres.

7. The vacuum insulated glass unit according to claim 1, wherein the length ratio between the shorter opposing edges and the longer opposing edges of the rectangular vacuum insulated glass unit is in the range of 0.3 to 0.9.

8. The vacuum insulated glass unit according to claim 1, wherein the thermal deflection of the edges is a thermal deflection configured to vary along the edge between the corners where the respective edge terminates.

9. The vacuum insulated glass unit according to claim 1, wherein said fixation system is arranged so as to allow a shift in the direction of the thermal deflection of the corners and/or centre parts of the edges of the vacuum insulated glass unit in response to a change in the temperature difference between the two glass sheets of the vacuum insulated glass unit.

10. The vacuum insulated glass unit according to claim 1, wherein said vacuum insulated glass unit is a laminated vacuum insulated glass unit, where a lamination glass sheet is laminated to an outer major surface of a glass sheet of the vacuum insulated glass unit by means of a lamination layer.

11. The vacuum insulated glass unit according to claim 1, wherein said vacuum insulated glass unit is a part of a building aperture cover.

12. The vacuum insulated glass unit according to claim 1, wherein the elongated profiles have walls describing an "L"

shape when seen through a cross section of the elongated profile of the vacuum insulated glass unit.

13. The vacuum insulated glass unit according to claim 12, wherein the vacuum insulated glass unit comprises opposite outwardly facing surfaces, of which only one of the outwardly facing major surfaces of the vacuum insulated glass unit is covered by and fixed to a wall of the elongated profile.

14. The vacuum insulated glass unit according to claim 1, wherein the elongated profiles comprise a wall extending over and along an edge surface of the vacuum insulated glass unit.

15. The vacuum insulated glass unit according to claim 1, wherein the elongated profiles comprise an elongated base member and an elongated glazing member.

16. The vacuum insulated glass unit according to claim 1, wherein the elongated profiles comprise a connection wall part for connecting the elongated profiles to profiles of a frame.

17. The vacuum insulated glass unit according to claim 1, wherein the fixation system comprises C-shaped gaskets having a recess for receiving the vacuum insulated glass unit edges.

18. The vacuum insulated glass unit according to claim 1, wherein the fixation system comprises an elongated spacer placed between a wall of the elongated profiles and a suspension element of the fixation system, which suspension element connects to an outwardly facing surface of the vacuum insulated glass unit.

19. A vacuum insulated glass unit comprising at least two glass sheets separated by a gap between said glass sheets, wherein a plurality of support structures are distributed in said gap and wherein said gap is sealed and evacuated, wherein the vacuum insulated glass unit moreover comprises elongated profiles extending along and parallel to each their edge of the vacuum insulated glass unit, wherein a fixation system fixates the vacuum insulated glass unit to said elongated profiles, wherein the elongated profiles and/or the fixation system, is configured so as to allow edges of said vacuum insulated glass unit to thermally deflect in a deflection direction perpendicular to a vacuum insulated glass unit due to a temperature difference between the two glass sheets, and to provide a restriction of said thermal deflection of the edges, so as to reduce the magnitude of the thermal deflection compared to an unrestricted thermal deflection of the edges at said temperature difference, and wherein a magnitude of the largest total edge deflection due to the restricted thermal deflection of the edges is configured to be at least 10% less than the unrestricted thermal deflection where said temperature difference of is at least 40° C.

20. A vacuum insulated glass unit comprising at least two glass sheets separated by a gap between said glass sheets, wherein a plurality of support structures are distributed in said gap and wherein said gap is sealed and evacuated, wherein the vacuum insulated glass unit moreover comprises elongated profiles extending along and parallel to each their edge of the vacuum insulated glass unit, wherein a fixation system fixates the vacuum insulated glass unit to said elongated profiles, wherein the elongated profiles and/or the fixation system, is configured so as to allow edges of said vacuum insulated glass unit to thermally deflect in a deflection direction perpendicular to a vacuum insulated glass unit due to a temperature difference between the two glass sheets, and to provide a restriction of said thermal deflection of the edges, so as to reduce the magnitude of the thermal deflection compared to an unrestricted thermal deflection of the edges at said temperature difference, and wherein the largest total edge deflection in said deflection direction of any of the edges of the vacuum insulated glass unit at a temperature difference between the two glass sheets of 65° C. as compared to the vacuum insulated glass unit at a temperature difference of 0° C. is at least 0.3% of the length of the deflecting edge.

* * * * *